(12) United States Patent
Camelio et al.

(10) Patent No.: US 12,221,508 B2
(45) Date of Patent: *Feb. 11, 2025

(54) BIARYL PHENOXY GROUP IV TRANSITION METAL CATALYSTS FOR OLEFIN POLYMERIZATION

(71) Applicant: Dow Global Technologies LLC, Midland, MI (US)

(72) Inventors: Andrew M. Camelio, Midland, MI (US); Brad C. Bailey, Midland, MI (US); Robert D J Froese, Midland, MI (US); Sukrit Mukhopadhyay, Midland, MI (US); David D. Devore, Midland, MI (US); Jerzy Klosin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 697 days.

This patent is subject to a terminal disclaimer.

(21) Appl. No.: 17/413,780

(22) PCT Filed: Dec. 12, 2019

(86) PCT No.: PCT/US2019/065966
§ 371 (c)(1),
(2) Date: Jun. 14, 2021

(87) PCT Pub. No.: WO2020/131566
PCT Pub. Date: Jun. 25, 2020

(65) Prior Publication Data
US 2022/0041764 A1  Feb. 10, 2022

Related U.S. Application Data

(60) Provisional application No. 62/782,855, filed on Dec. 20, 2018.

(51) Int. Cl.
C08F 4/659 (2006.01)
C08F 210/02 (2006.01)

(52) U.S. Cl.
CPC ........ C08F 4/65908 (2013.01); C08F 210/02 (2013.01); C08F 2800/10 (2013.01)

(58) Field of Classification Search
CPC ....... C08F 210/16; C08F 4/64058; C07F 7/28
See application file for complete search history.

(56) References Cited

U.S. PATENT DOCUMENTS

| 11,066,488 B2 | 7/2021 | Szuromi et al. |
| 11,104,751 B2 | 8/2021 | Camelio et al. |

(Continued)

FOREIGN PATENT DOCUMENTS

| CN | 106459288 A | 2/2017 |
| WO | 03091262 A1 | 11/2003 |

(Continued)

OTHER PUBLICATIONS

Communication pursuant to Rules 161(1) and 162 EPC, dated Aug. 3, 2021, pertaining to EP application No. 19832812.1.

(Continued)

*Primary Examiner* — Caixia Lu
(74) *Attorney, Agent, or Firm* — Dinsmore & Shohl LLP

(57) ABSTRACT

Catalyst systems for olefin polymerization include a metal-ligand complex of a general formula (I). The metal-ligand complex of formula (I) is a transition metal complex of titanium, zirconium, or hafnium, in which the transition metal is coordinated with a biaryl phenoxy ligand structure. Olefin polymerization processes include contacting ethylene and optionally one or more ($C_3$-$C_{12}$) alpha-olefins in the presence of the catalyst system to produce an ethylene-based polymer or copolymer.

20 Claims, 11 Drawing Sheets

(56) References Cited

U.S. PATENT DOCUMENTS

| 11,168,161 | B2 | 11/2021 | Camelio et al. |
|---|---|---|---|
| 2006/0052554 | A1 | 3/2006 | Boussie et al. |
| 2009/0286944 | A1 | 11/2009 | Ackerman et al. |
| 2020/0131289 | A1 | 4/2020 | Camelio et al. |
| 2020/0157254 | A1 | 5/2020 | Camelio et al. |
| 2020/0190228 | A1 | 6/2020 | Szuromi |
| 2022/0041764 | A1 | 2/2022 | Camelio et al. |
| 2022/0169756 | A1 | 6/2022 | Camelio et al. |

FOREIGN PATENT DOCUMENTS

| WO | 2005108406 | A1 | 11/2005 |
|---|---|---|---|
| WO | 2012004675 | A2 | 1/2012 |
| WO | 2012006230 | A1 | 1/2012 |
| WO | 2013013111 | A1 | 1/2013 |
| WO | 2013036546 | A2 | 3/2013 |
| WO | 2013052585 | A2 | 4/2013 |
| WO | 2016003879 | A1 | 1/2016 |
| WO | 2018022238 | A1 | 2/2018 |
| WO | 2018236996 | A1 | 12/2018 |

OTHER PUBLICATIONS

International Search Report and Written Opinion pertaining to PCT/US2019/065966, dated Mar. 13, 2020.
International Search Report and Written Opinion pertaining to PCT/US2018/038492, dated Sep. 27, 2018.
International Search Report and Written Opinion pertaining to PCT/US2019/067480, dated Mar. 17, 2020.
U.S. Office Action dated Dec. 27, 2023, pertaining to U.S. Appl. No. 17/311,530, 8 pgs.
Japanese Office Action dated Jan. 9, 2024, pertaining to JP Application No. 2021-533723, 6 pgs.
Chinese Office Action dated Dec. 20, 2023, pertaining to CN Patent Application No. 201980089692.2, 14 pgs.
Chinese Office Action dated Nov. 16, 2023, pertaining to CN Patent Application No. 201980088837.7, 10 pgs.
Examination Report dated Feb. 8, 2023, pertaining to EP Application No. 19839581.6, 5 pgs.
Examination Report dated Feb. 23, 2023, petaining to EP Application No. 19832812.2, 6 pgs.
CN Office Action dated Aug. 11, 2023, pertaining to CN Patent Application No. 201980088837.7, 12 pgs.
Chinese Office Action dated Jan. 5, 2023, pertaining to CN Patent Application No. 201980088837.7, 22 pgs.
Korean Office Action dated Feb. 6, 2023, pertaining to Korean patent application No. 10-2020-7000697 8 pages.
Korean Office Action dated Feb. 6, 2023, pertaining to Korean patent application No. 10-2020-7000696 8 pages.
Chinese Office Action dated Jan. 3, 2023, pertaining to Chinese patent application No. 201980089692.2 4 pages.
Chinese Search Report dated Jan. 3, 2023, pertaining to Chinese patent application No. 201980089692.2 2 pages.
US Notice of Allowance dated Jun. 11, 2024, pertaining to U.S. Appl. No. 17/311,530, 7 pgs.
Japanese Office Action dated Jan. 30, 2024, pertaining to JP Patent Application No. 2021-534357, 8 pgs.
Communication pursuant to Article 94(3) EPC, dated Feb. 26, 2024, pertaining to EP Patent Application No. 19832812.2, 7 pgs.
Japanese Office Action dated Jul. 2, 2024, pertaining to JP Patent Application No. 2021-534357, 8 pgs.
Japanese Office Action dated Jul. 16, 2024, pertaining to JP Patent Application No. 2021-533723, 6 pgs.

BIARYL PHENOXY GROUP IV TRANSITION METAL CATALYSTS FOR OLEFIN POLYMERIZATION

CROSS-REFERENCE TO RELATED APPLICATION

This application is a National Stage Entry under 35 U.S.C. § 371 of International Patent Application No. PCT/US2019/065966, filed Dec. 12, 2019, which claims priority to U.S. Provisional Patent Application No. 62/782,855, filed on Dec. 20, 2018, the entire disclosures of which are hereby incorporated by reference.

TECHNICAL FIELD

Embodiments of the present disclosure generally relate to olefin polymerization catalyst systems and processes, and, more specifically, the synthesis of biaryl phenoxy group IV transition metal catalysts for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, or a molecular (either metallocene or non-metallocene) catalyst system. The reactants in the diluent and the catalyst system are circulated at an elevated polymerization temperature around the reactor thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor, e.g. reactor, serially connected to the first reactor where a second polyethylene fraction may be produced.

Despite the research efforts in developing catalyst systems suitable for olefin polymerization, such as polyethylene or polypropylene polymerization, there is still a need for a procatalyst and a catalyst system exhibiting a higher efficiency and high comonomer incorporation than comparative catalyst systems, which produce polymers with high mole percent (mol %) α-olefin incorporation, which varies depending on the reactor. (For example, high mol % α-olefin incorporation for a batch reactor may be between 15 to 20%.) Furthermore, the catalyst and catalyst system should be capable of producing polymer with high molecular weights and a narrow molecular weight distribution.

SUMMARY

According to some embodiments, a catalyst system includes a metal-ligand complex according to formula (I):

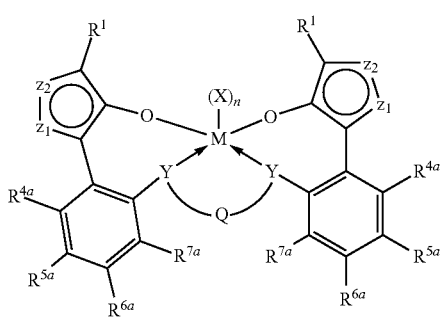

(I)

In formula (I), M is a metal chosen from titanium, zirconium, or hafnium, the metal having a formal oxidation state of +2, +3, or +4; and each X is a monodentate or bidentate ligand independently chosen from unsaturated $(C_2\text{-}C_{20})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$OR^C$, —$N(R^N)_2$, and —$NCOR^C$. Subscript n of $(X)_n$ is 1 or 2. Y is oxygen, sulfur, or —$N(R^N)$—.

In formula (I), each $R^1$ is independently selected from the group consisting of —H, $(C_1\text{-}C_{40})$hydrocarbyl, $(C_1\text{-}C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —$CN$, —$CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen, radicals having formula (II), radicals having formula (III), and radicals having formula (IV):

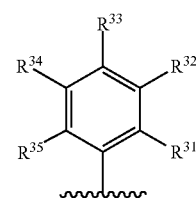

(II)

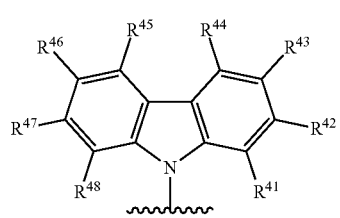

(III)

-continued

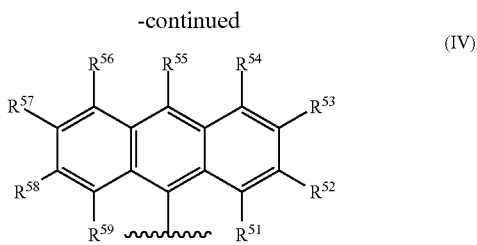

(IV)

In formulas (II), (III), and (IV), each of $R^{31-35}$, $R^{41-48}$, and $R^{51-59}$ is independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N$(R^N)$—, $(R^C)_2$NC(O)—, halogen, or —H, with the proviso that at least one of $R^1$ is a radical having formula (II), a radical having formula (III), or a radical having formula (IV).

In formula (I), Q is $(C_1-C_{12})$alkylene, $(C_1-C_{12})$heteroalkylene, (—CH$_2$Si$(R^C)_2$CH$_2$—), (—CH$_2$CH$_2$Si$(R^C)_2$CH$_2$CH$_2$—), (—CH$_2$Ge$(R^C)_2$CH$_2$—), or (—CH$_2$CH$_2$Ge$(R^C)_2$CH$_2$CH$_2$—), where $R^C$ is $(C_1-C_{20})$hydrocarbyl.

In formula (I), for each individual ring containing groups $z_1$ and $z_2$, each of $z_1$ and $z_2$ is independently selected from the group consisting of sulfur, oxygen, —N$(R^C)$—, and —C$(R^C)$—, provided at least one of $z_1$ and $z_2$ is sulfur. $R^{4a}$, $R^{5a}$, $R^{6a}$, $R^{7a}$, $R^{4b}$, $R^{5b}$, $R^{6b}$, and $R^{7b}$ are independently chosen from $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, —P(O)$(R^P)_2$, R$^C$S(O)$_2$—, $(R^C)_2$C=N—, R$^C$C(O)O—, R$^C$OC(O)—, R$^C$C(O)N(R)—, $(R^C)_2$NC(O)—, halogen, and —H, in which optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{7b}$ may be covalently connected to form an aromatic ring or a non-aromatic ring.

In formula (I), each $R^C$, $R^N$, and $R^P$ in formula (I) is independently selected from the group consisting of $(C_1-C_{20})$hydrocarbyl, $(C_1-C_{20})$heterohydrocarbyl, and —H.

In formula (I), when Q is —CH$_2$CH$_2$CH$_2$CH$_2$— and each $R^1$ is 3,6-di-tert-butylcarbazol-9-yl, and $z_2$ is sulfur and each X is benzyl, $R^{5a}$ and $R^{5b}$ are not —OMe, fluorine, or tert-octyl. Additionally, when Q is —CH$_2$CH$_2$CH$_2$CH$_2$—, at least one of $R^{4a}$, $R^{5a}$, $R^{6a}$, and $R^{7a}$ is halogen, and at least one of $R^{4b}$, $R^{5b}$, $R^{6b}$, and $R^{7b}$ is halogen; or when Q is —CH$_2$CH$_2$CH$_2$CH$_2$—, at least one of $R^{4a}$, $R^{5a}$, $R^{6a}$, $R^{7a}$, $R^{4b}$, $R^{5b}$, $R^{6b}$, and $R^{7b}$ is selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, —P(O)$(R^P)_2$, R$^C$S(O)$_2$—, $(R^C)_2$C=N—, R$^C$C(O)O—, R$^C$OC(O)—, R$^C$C(O)N(R)—, $(R^C)_2$NC(O)—, and halogen.

DETAILED DESCRIPTION

Figure 1A:
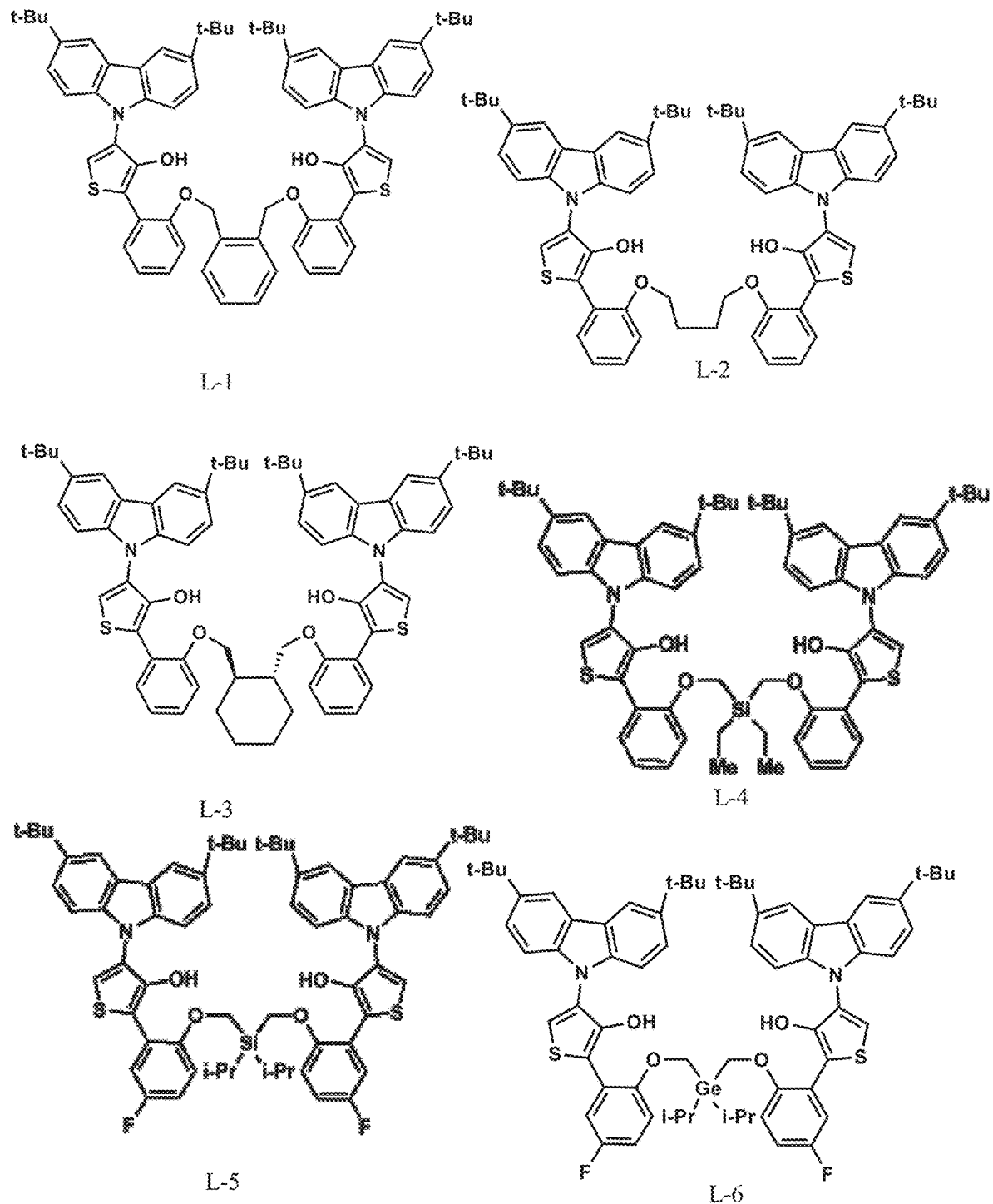
FIG. 1A depicts various ligands that form the metal-ligand complexes of formula (I).

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; Et$_2$O: diethyl ether; CH$_2$Cl$_2$: dichloromethane; CV: column volume (used in column chromatography); EtOAc: ethyl acetate; C$_6$D$_6$: deuterated benzene or benzene-d6: CDCl$_3$: deuterated chloroform; Na$_2$SO$_4$: sodium sulfate; MgSO$_4$: magnesium sulfate; HCl: hydrogen chloride; n-BuLi: butyllithium; t-BuLi: tent-butyllithium; Cu$_2$O: Copper (I) Oxide; N,N'-DMEDA: N,N'-dimethylethylenediamine; K$_3$PO$_4$: Potassium phosphate tribasic; Pd(AmPhos)Cl$_2$: Bis(di-tert-butyl(4-dimethylaminophenyl)phosphine)dichloropalladium(II); Pd(dppf)Cl$_2$: [1,1'-Bis(diphenylphosphino)ferrocene]palladium(II) dichloride; K$_2$CO$_3$: potassium carbonate; Cs$_2$CO$_3$: cesium carbonate; i-PrOBPin: 2-isopropoxy-4,4,5,5-tetramethyl-1,3,2-dioxaborolane; BrCl$_2$CCCl$_2$Br: 1,2-dibromotetrachloroethane; HfCl$_4$: hafnium(IV) chloride; HfBn$_4$: hafnium(IV) tetrabenzyl; ZrCl$_4$: zirconium(IV) chloride; ZrBn$_4$: zirconium(IV) tetrabenzyl; ZrBn$_2$Cl$_2$(OEt$_2$): zirconium (IV) dibenzyl dichloride mono-diethyletherate; HfBn$_2$Cl$_2$(OEt$_2$): hafnium (IV) dibenzyl dichloride mono-diethyletherate; TiBn$_4$: titanium (IV) tetrabenzyl; N$_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; R$_f$: retention fraction; TLC: thin layered chromatography; rpm: revolution per minute.

The term "independently selected" is used herein to indicate that the variable groups, such as, $R^1$, A, $z_{1-5}$, can be identical or different. A chemical name attached to an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; hexahydroindacenyl; indacenyl; dihydroindenyl; naphthyl; tetrahydronaphthyl; and phenanthrenyl. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene and $(C_1-C_{50})$alkylene $(C_1-C_{20})$alkylene. The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$ arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo [2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, —$N=C(R^C)_2$, —$Ge(R^C)_2$—, or —$Si(R^C)$—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the ofther radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-$S(O)_2$—, $(C_1-C_{50})$hydrocarbyl-$Si(R^C)_2$—, $(C_1-C_{50})$hydrocarbyl-$N(R^N)$—, $(C_1-C_{50})$hydrocarbyl-$P(R^P)$—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" leans an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

According to some embodiments, a catalyst system includes a metal-ligand complex according to formula (I):

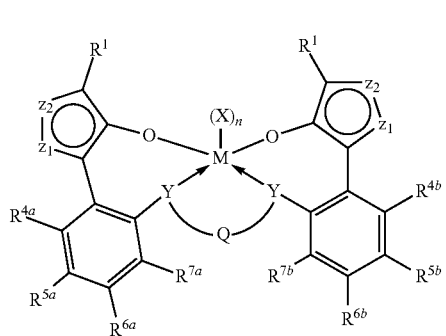

(I)

In formula (I), M is a metal chosen from titanium, zirconium, or hafnium, the metal having a formal oxidation state of +2, +3, or +4; and each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $-OR^C$, $-N(R^N)_2$, and $-NCOR^C$. Subscript n of $(X)_n$ is 1 or 2.

In formula (I), each $R^1$ is independently selected from the group consisting of —H, $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, radicals having formula (II), radicals having formula (III), and radicals having formula (IV):

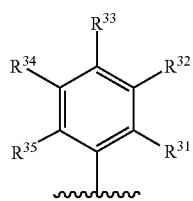

(II)

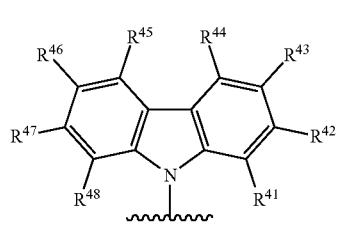

(III)

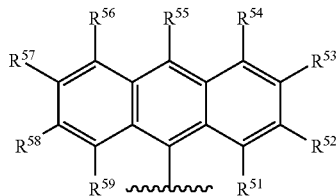

(IV)

In formulas (II), (III), and (IV), each of $R^{31-35}$, $R^{41-48}$, and $R^{51-59}$ is independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^C)_2NC(O)-$, halogen, or —H, with the proviso that at least one of $R^1$ is a radical having formula (II), a radical having formula (III), or a radical having formula (IV).

In formula (I), Q is $(C_1-C_{12})$alkylene, $(C_1-C_{12})$heteroalkylene, $(-CH_2Si(R^C)_2CH_2-)$, $(-CH_2CH_2Si(R^C)_2CH_2CH_2-)$, $(-CH_2Ge(R^C)_2CH_2-)$, or $(-CH_2CH_2Ge(R^C)_2CH_2CH_2-)$, where $R^C$ is $(C_1-C_{20})$hydrocarbyl.

In formula (I), for each individual ring containing groups $z_1$ and $z_2$, each of $z_1$ and $z_2$ is independently selected from the group consisting of sulfur, oxygen, $-N(R^C)-$, and $-C(R^C)-$, provided at least one of $z_1$ and $z_2$ is sulfur. $R^{4a}$, $R^{5a}$, $R^{6a}$, $R^{7a}$, $R^{4b}$, $R^{5b}$, $R^{6b}$, and $R^{7b}$ are independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $-P(O)(R^P)_2$, $R^CS(O)_2-$, $(R^C)_2C=N-$, $R^CC(O)O-$, $R^COC(O)-$, $R^CC(O)N(R)-$, $(R^C)_2NC(O)-$, halogen, and —H, in which optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{7b}$ may be covalently connected to form an aromatic ring or a non-aromatic ring.

In formula (I), each $R^C$, $R^N$, and $R^P$ in formula (I) is independently selected from the group consisting of $(C_1-C_{20})$hydrocarbyl, $(C_1-C_{20})$heterohydrocarbyl, and —H.

In formula (I), when Q is $-CH_2CH_2CH_2CH_2-$ and each $R^1$ is 3,6-di-tert-butylcarbazol-9-yl, and $z_2$ is sulfur and each X is benzyl, $R^{5a}$ and $R^{5b}$ are not —OMe, fluorine, or tert-octyl. Additionally, when Q is $-CH_2CH_2CH_2CH_2-$, at least one of $R^{4a}$, $R^{5a}$, $R^{6a}$, and $R^{7a}$ is halogen, and at least one of $R^{4b}$, $R^{5b}$, $R^{6b}$, and $R^{7b}$ is halogen; or when Q is $-CH_2CH_2CH_2CH_2-$, at least one of $R^{4a}$, $R^{5a}$, $R^{6a}$, $R^{7a}$, $R^{4b}$, $R^{5b}$, $R^{6b}$, and $R^{7b}$ is selected from the group consisting of $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $-P(O)(R^P)_2$, $R^CS(O)_2-$, $(R^C)_2C=N-$, $R^CC(O)O-$, $R^COC(O)-$, $R^CC(O)N(R)-$, $(R^C)_2NC(O)-$, and halogen.

In some embodiments, Y is oxygen, sulfur, or $-N(R^N)-$, wherein $R^N$ is —H or $(C_1-C_{20})$hydrocarbyl.

In various embodiments of formula (I), Y is oxygen and $z_1$ is sulfur. In other embodiments, Y is oxygen $z_2$ is sulfur.

In some embodiments of formula (I), each $R^1$ is a radical having formula (III), in which at least one of $R^{41-48}$ is chosen from $(C_1-C_{40})$hydrocarbyl, $(C_1-C_{40})$heterohydrocarbyl, $-Si(R^C)_3$, $-OR^C$, $-SR^C$, $-NO_2$, $-CN$, $-CF_3$, or halogen.

In one or more embodiments of formula (I), each $R^1$ is a radical having formula (III), in which: (1) $R^{42}$ and $R^{47}$ are selected from the group consisting of $(C_1-C_{20})$alkyl, —Si $(R^C)_3$, —$CF_3$, or halogen and $R^{43}$ and $R^{46}$ are —H; or (2) $R^{43}$ and $R^{46}$ are selected from the group consisting of $(C_1\text{-}C_{20})$alkyl, —Si$(R^C)_3$, —$CF_3$, or halogen and $R^{42}$ and $R^{47}$ are —H.

In various embodiments of formula (I), each $R^1$ is a radical having formula (IV), in which $R^{51\text{-}59}$ are —H. In other embodiments of (I), each $R^1$ is a radical having formula (IV); and at least one of $R^{51\text{-}59}$ is selected from the group consisting of $(C_1\text{-}C_{40})$hydrocarbyl, $(C_1\text{-}C_{40})$heterohydrocarbyl, —Si$(R^C)_3$, —$OR^C$, —$SR^C$, —$NO_2$, —CN, —$CF_3$, or halogen.

In some embodiments of formula (I), each $R^1$ is a radical having formula (II), in which $R^{31}$, $R^{33}$, and $R^{35}$ are selected from $(C_1\text{-}C_{20})$hydrocarbyl. In one or more embodiments, each $R^{31}$, $R^{33}$, and $R^{35}$ is independently chosen from $(C_1\text{-}C_5)$alkyl, $(C_6\text{-}C_{24})$aryl. In other embodiments of formula (I), each $R^1$ is a radical having formula (II), in which $R^{32}$ and $R^{34}$ are selected from $(C_1\text{-}C_{20})$hydrocarbyl. In one or more embodiments, each $R^{32}$ and $R^{34}$ is independently chosen from $(C_1\text{-}C_5)$alkyl or $(C_6\text{-}C_{24})$aryl.

In one or more embodiments of formula (I), Q is $(C_2\text{-}C_{12})$alkylene and $R^{6a}$ and $R^{6b}$ are fluorine. In other embodiments of formula (I), Q is $(C_2\text{-}C_{12})$alkylene and $R^{6a}$ and $R^{6b}$ are chlorine. In various embodiments, Q is $(C_2\text{-}C_{12})$alkylene and $R^{6a}$, $R^{6b}$, $R^{5a}$ and $R^{5b}$ are fluorine. In other embodiments, Q is $(C_2\text{-}C_{12})$alkylene and $R^{6a}$, $R^{6b}$, $R^{5a}$ and $R^{5b}$ are chlorine. In some embodiments, Q is $(C_2\text{-}C_{12})$alkylene and $R^{6a}$, $R^{6b}$, $R^{5a}$, $R^{5b}$, $R^{4a}$, and $R^{4b}$ are fluorine. In other embodiments, Q is $(C_2\text{-}C_{12})$alkylene and $R^{6a}$, $R^{6b}$, $R^{5a}$, $R^{5b}$, $R^{4a}$, and $R^{4b}$ are chlorine. In one or more embodiments, Q is $(C_2\text{-}C_{12})$alkylene and $R^{6a}$, $R^{6b}$, $R^{5a}$, $R^{5b}$, $R^{7a}$, and $R^{7b}$ are fluorine. In some embodiments, Q is $(C_2\text{-}C_{12})$alkylene and $R^{6a}$, $R^{6b}$, $R^{5a}$, $R^{5b}$, $R^{7a}$, and $R^{7b}$ are chlorine.

In some embodiment of the metal-ligand catalyst according to formula (I), $R^1$ is chosen from 3,5-di-tent-butylphenyl; 2,4,6-trimethylphenyl; 2,4,6-triisopropylphenyl; 3,5-diisopropylphenyl; carbazolyl; carbazol-9-yl, 1,2,3,4-tetrahydrocarbazolyl; 1,2,3,4,5,6,7,8-octahydrocarbazolyl; 3,6-bis-(3,5-di-tert-butylphenyl)carbazol-9-yl; 3,6-bis-(2,4,6-trimethylphenyl)carbazol-9-yl); 3,6-bis-(2,4,6-triisopropylphenyl)carbazol-9-yl; 2,7-di(tertiary-butyl)-carbazol-9-yl; 2,7-di(tertiary-octyl)-carbazol-9-yl; 2,7-diphenylcarbazol-9-yl; 2,7-bis(2,4,6-trimethylphenyl)-carbazol-9-yl anthracenyl; 1,2,3,4-tetrahydroanthracenyl; 1,2,3,4,5,6,7,8-octahydroanthracenyl; phenanthrenyl; 1,2,3,4,5,6,7,8-octahydrophenanthrenyl; 1,2,3,4-tetrahydronaphthyl; 2,6-dimethylphenyl; 2,6-diisopropylphenyl; 3,5-diphenylphenyl; 1-naphthyl; 2-methyl-1-naphthyl; 2-naphthyl; 1,2,3,4-tetra-hydronaphth-5-yl; 1,2,3,4-tetrahydronaphth-6-yl; anthracen-9-yl; 1,2,3,4-tetrahydroanthracen-9-yl; 1,2,3,4,5,6,7,8-octahydroanthracen-9-yl; 1,2,3,4,5,6,7,8-octahydrophenanthren-9-yl; indolyl; indolinyl; quinolinyl; 1,2,3,4-tetrahydroquinolinyl; isoquinolinyl; 1,2,3,4-tetrahydroisoquinolinyl.

In some embodiments of formula (I), when Q is $(C_3\text{-}C_4)$alkylene, at least two of $R^{4a}$, $R^{5a}$, $R^{6a}$, $R^{7a}$, $R^{4b}$, $R^{5b}$, $R^{6b}$, and $R^{7b}$ are chosen from $(C_6\text{-}C_{50})$aryl, $(C_4\text{-}C_{50})$heteroaryl, —Si$(R^C)_3$, —Ge$(R^C)_3$, —P$(R^P)_2$, —N$(R^N)_2$, —$OR^C$, —$SR^C$, —$NO_2$, —CN, —$CF_3$, $R^CS(O)$—, —P(O)$(R^P)_2$, $R^CS(O)_2$—, $(R^C)_2C{=}N$—, $R^CC(O)O$—, $R^COC(O)$—, $R^CC(O)N(R^N)$—, $(R^C)_2NC(O)$—, or halogen. In one or more embodiments, when Q is $(C_3\text{-}C_4)$alkylene, at least one of $R^{4a}$, $R^{5a}$, $R^{6a}$, $R^{7a}$ is halogen and at least one of $R^{4b}$, $R^{5b}$, $R^{6b}$, $R^{7b}$ is halogen. In other embodiments, when Q is $(C_3\text{-}C_4)$alkylene, at least two of $R^{4a}$, $R^{5a}$, $R^{6a}$, $R^{7a}$ are halogen and at least two of $R^{4b}$, $R^{5b}$, $R^{6b}$, $R^{7b}$ are halogen; and in other embodiments, when Q is $(C_3\text{-}C_4)$alkylene, at least three of $R^{4a}$, $R^{5a}$, $R^{6a}$, $R^{7a}$ are halogen and at least three of $R^{4b}$, $R^{5b}$, $R^{6b}$, $R^{7b}$ are halogen.

In one or more embodiments of formula (I), Q is (—$CH_2Si(R_Q)_2CH_2$—), (—$CH_2CH_2Si(R_Q)_2CH_2CH_2$—), (—$CH_2Ge(R_Q)_2CH_2$—), or (—$CH_2CH_2Ge(R_Q)_2CH_2CH_2$—), where $R_Q$ is $(C_1\text{-}C_5)$alkyl. In other embodiments, Q is benzene-1,2-diyl or cyclohexane-1,2-diyl.

In various embodiments of formula (I), Q is (—$CH_2Si(R_Q)_2CH_2$—) or (—$CH_2Si(R_Q)_2CH_2$—), wherein $R_Q$ is ethyl or 2-propyl.

In some embodiment of formula (I), Q is benzene-1,2-diyldimethyl

In some embodiments of the catalyst system further includes a chain transfer agent.

One or more embodiments of this disclosure includes processes for polymerizing olefins. The process includes contacting ethylene and optionally one or more $(C_3\text{-}C_{12})\alpha$-olefins in the presence of a catalysts system according to any one embodiment disclosed in this disclosure. In some embodiments, the process further includes a chain transfer agent.

In illustrative embodiments, the catalyst systems may include a metal-ligand complex according to any of formula (I) having the structure of any of Procatalysts 1, 2, 5-34:

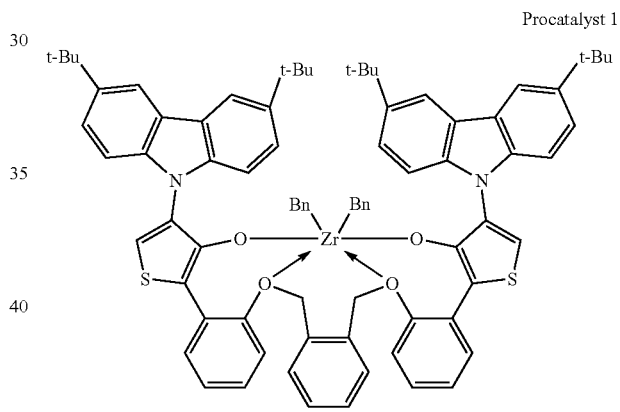

Procatalyst 1

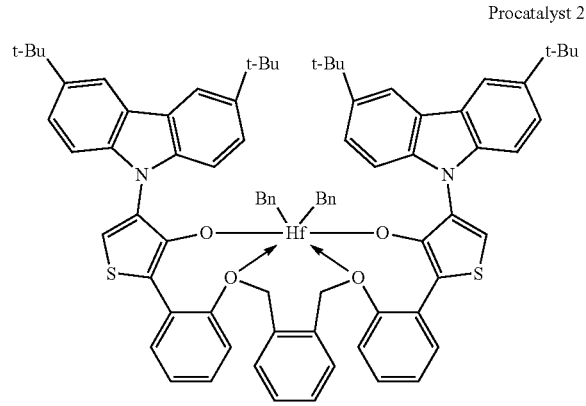

Procatalyst 2

Procatalyst 3
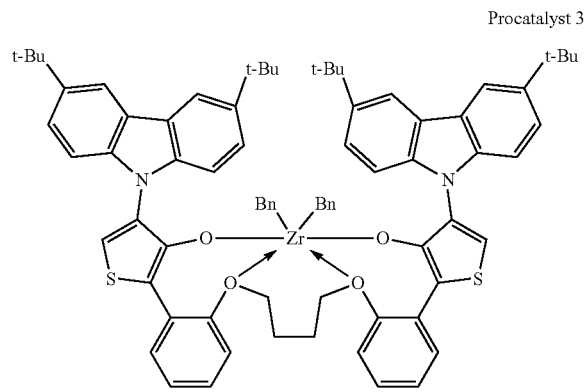
Procatalyst 4
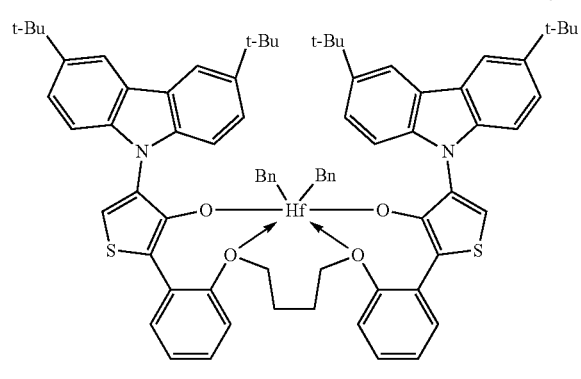
Procatalyst 5
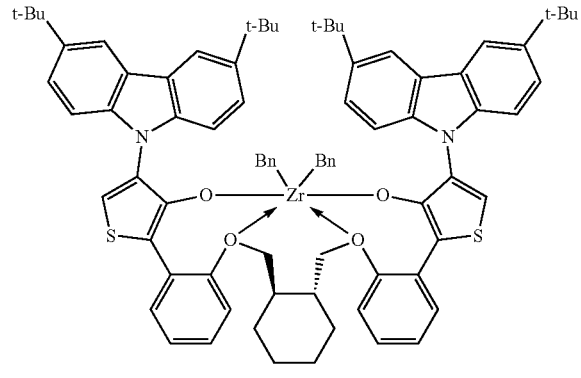
Procatalyst 6
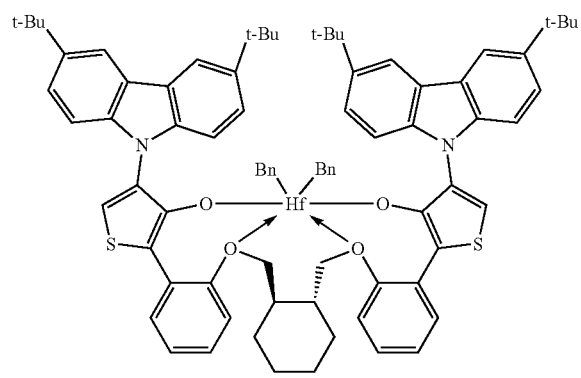
Procatalyst 7
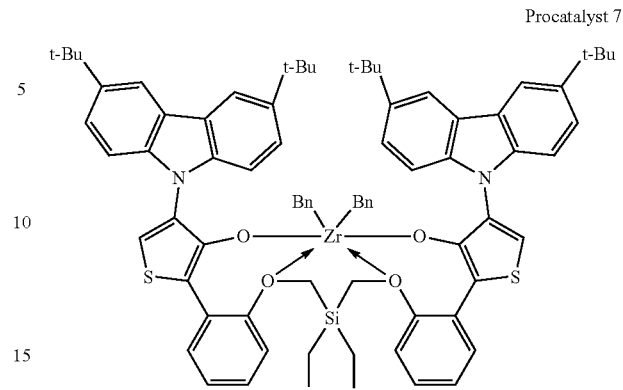
Procatalyst 8
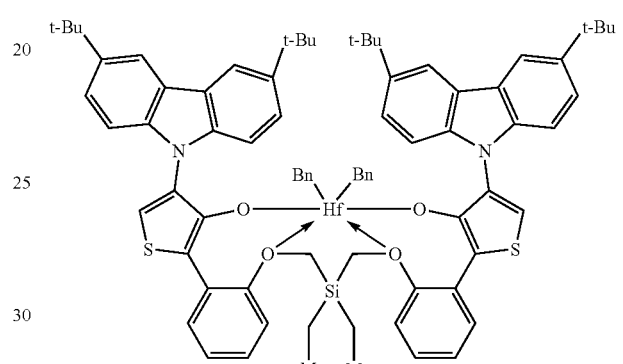
Procatalyst 9
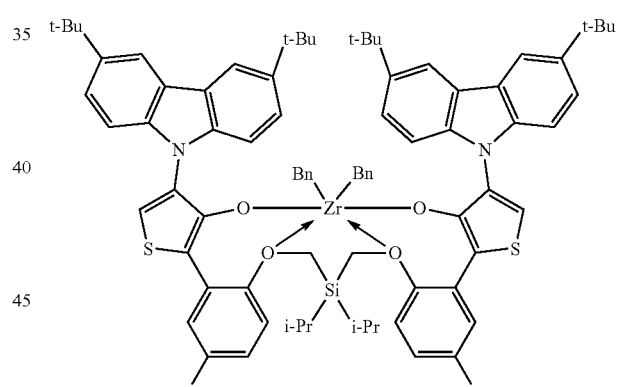
Procatalyst 10
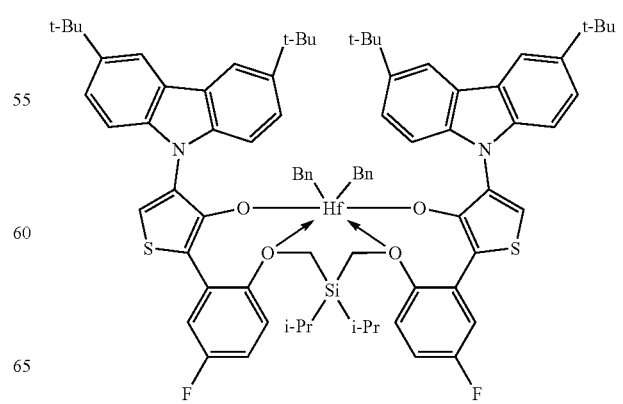

-continued
Procatalyst 11
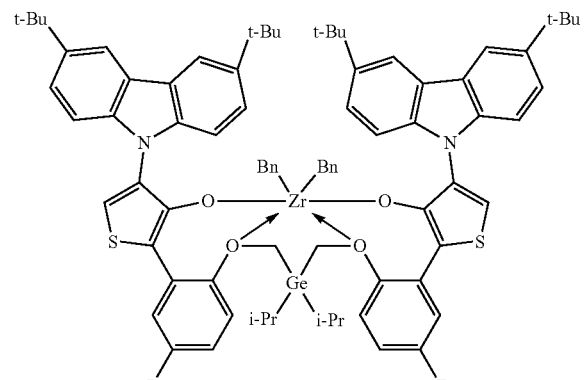
Procatalyst 12
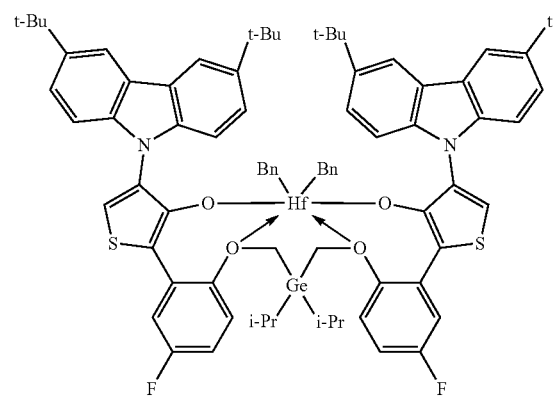
Procatalyst 13
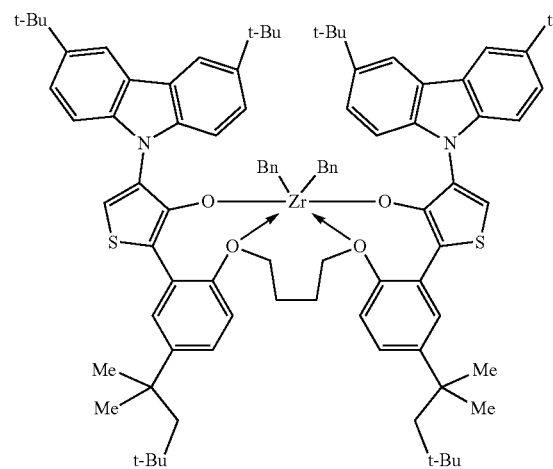
Procatalyst 14
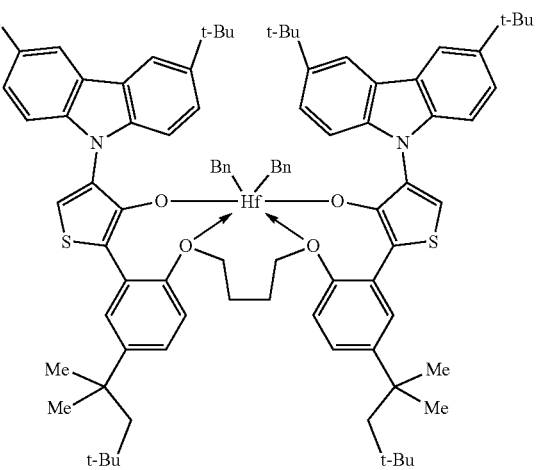
Procatalyst 15
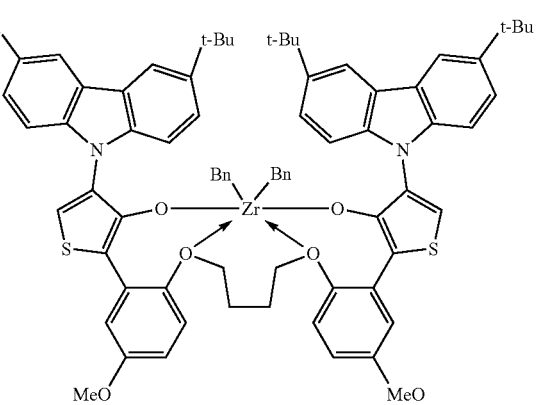
Procatalyst 16
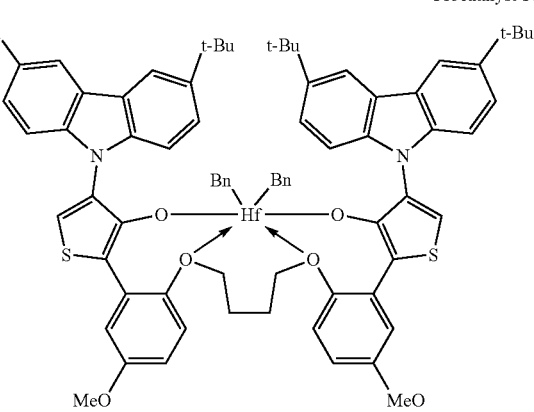

-continued
Procatalyst 17
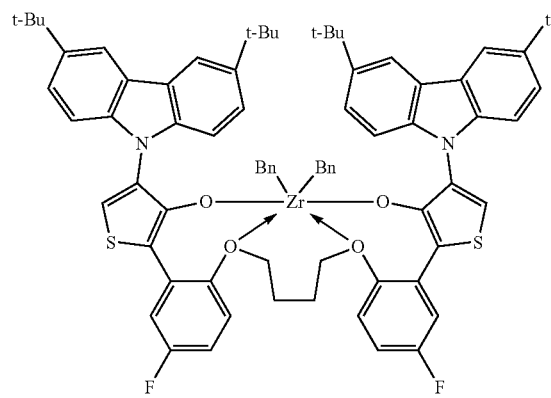
Procatalyst 18
Procatalyst 19
Procatalyst 20
-continued
Procatalyst 21
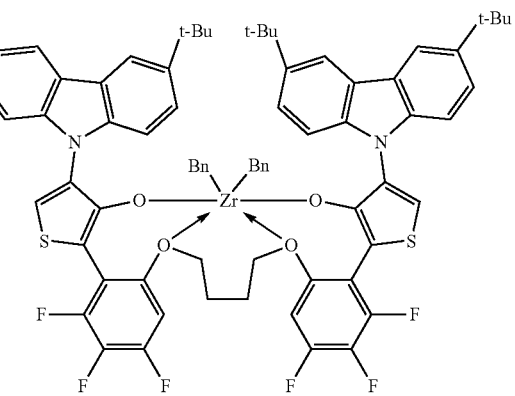
Procatalyst 22
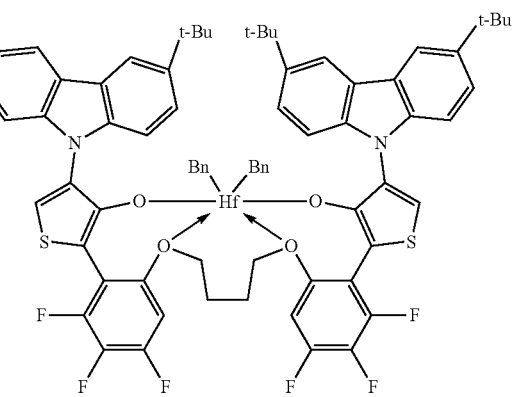
Procatalyst 23
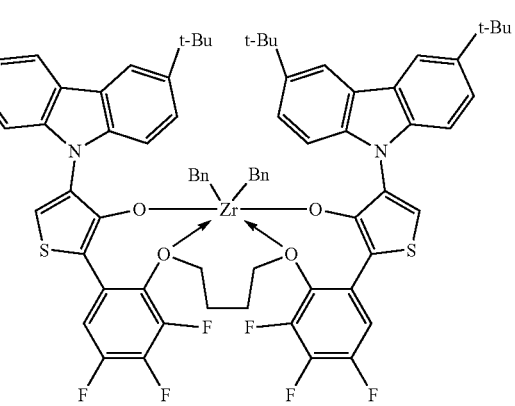
Procatalyst 24
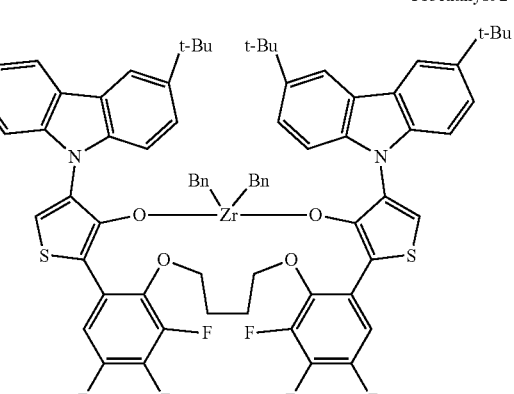

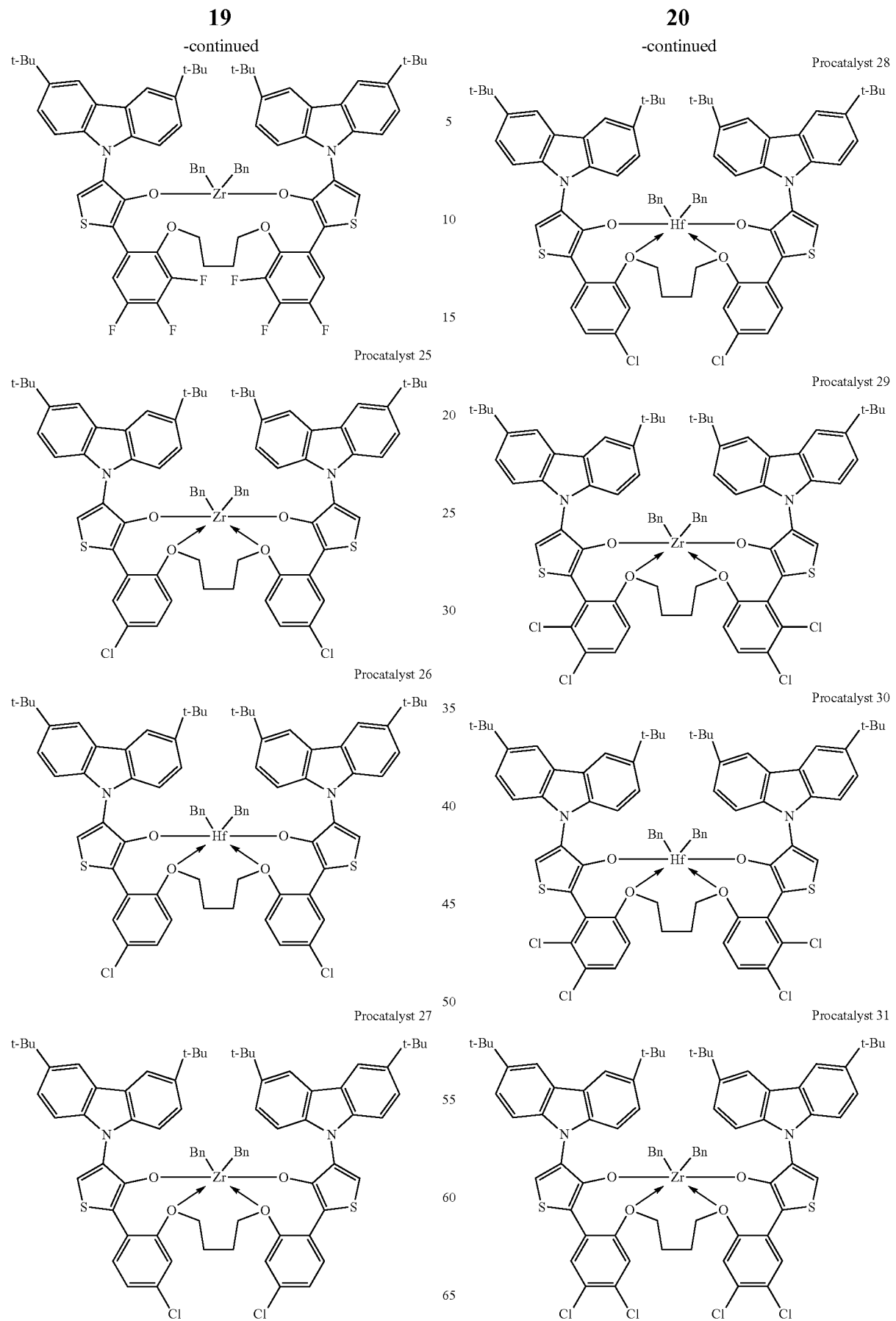

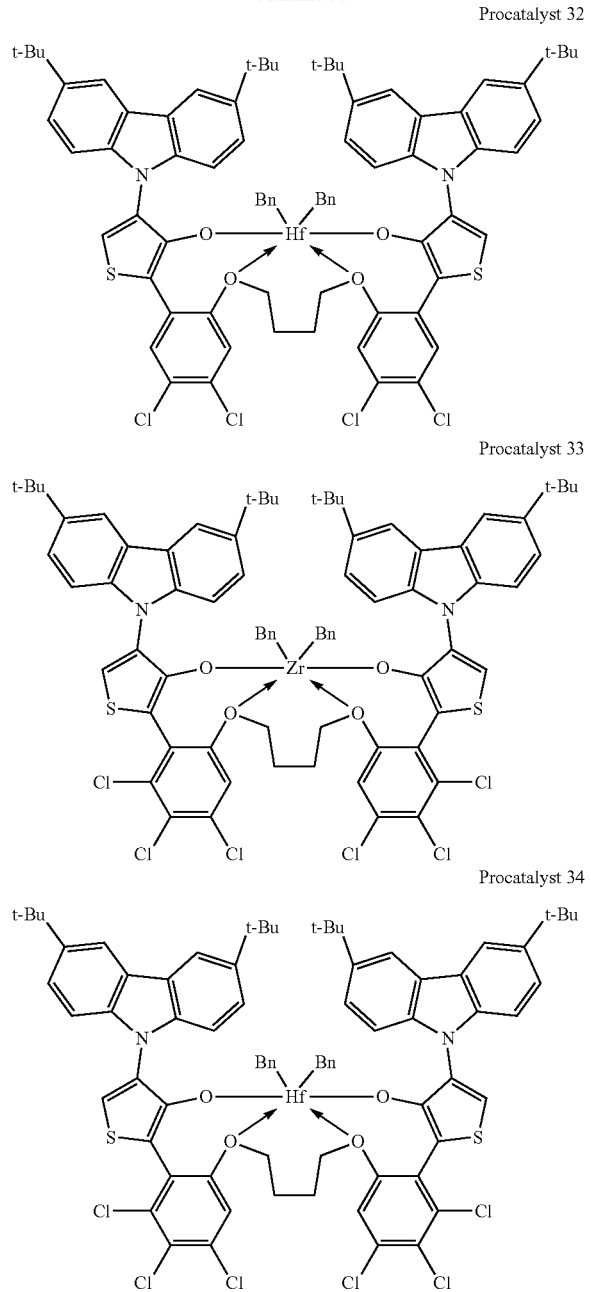

Procatalyst 32

Procatalyst 33

Procatalyst 34

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borate (e.g. bis(octadecyl)methylammonium tetrakis(pentafluorophenyl)borate). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10.000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Chain Shuttling Agents

The term, "shuttling agent" refers to a compound or mixture of compounds employed in the composition of the present disclosure that is capable of causing polymeryl exchange between at least two active catalyst sites of the catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In some emboidments, the shuttling agent has an activity ratio RA-B/RB-A of from 0.01 and 100, from 0.1 to 10, from 0.5 to 2.0, or from 0.8 to 1.2. The activity ratio RA-B is the rate of polymeryl transfer from catalyst A active site to catalyst B active site via the shuttling agent, and RB-A is the rate of reverse polymeryl transfer which is the rate of exchange starting from the catalyst B active site to catalyst A active site via the shuttling agent. The intermediate formed between the shuttling agent and the polymeryl chain is sufficiently stable that chain termination is relatively rare. In one or more embodiments, less than 90 percent, less than 75 percent, less than 50 percent, or than 10 percent of shuttle-polymeryl products are terminated prior to attaining 3 distinguishable polymer segments or blocks. The rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

Polymer products having segments of different tacticity or regio-error, different block lengths, or different numbers of such segments or blocks in each copolymer may be prepared by selecting different combinations of catalysts and various shuttling agents. The catalysts may be selected from metal-ligand complexes of formula (I) having differing polymerization ability and paired various shuttling agents or mixtures of agents with these catalyst combinations. For example, if the activity of the shuttling agent is low relative to the catalyst polymer chain propagation rate of one or more of the catalysts, longer block length multi-block copolymers and polymer blends may be obtained. In contrast, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various homopolymers and/or copolymers can be obtained.

A suitable composition comprising catalyst A, catalyst B, and a chain shuttling agent may be obtained by the following multi-step procedure specially adapted for block differentiation based on tacticity or regio-error content:

I. One or more addition polymerizable C3-30 $\alpha$-olefin monomers are polymerized using a mixture comprising a potential catalyst and a potential chain shuttling agent. This polymerization test is performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (tacticity and optionally regio-error content) are measured.

II. The foregoing polymerization and polymer testing are repeated for several different reaction times, providing a series of polymers having a range of yields and PDI values.

III. Catalyst/shuttling agent pairs demonstrating significant polymer transfer both to and from the shuttling agent are characterized by a polymer series wherein the minimum PDI is less than 2.0, more preferably less than 1.5, and most preferably less than 1.3. Furthermore, if chain shuttling is occurring, the Mn of the polymer will increase linearly as conversion is increased. Catalyst and shuttling agent pairs are those giving polymer Mn as a function of conversion (or polymer yield) fitting a line with a statistical precision (R2) of greater than 0.95, preferably greater than 0.99.

Steps I-III are then carried out for one or more additional pairings of potential catalysts and/or putative shuttling agents.

In one or more embodiments, the polymer composition comprising catalyst A, catalyst B, and one or more chain shuttling agents according to the invention is then selected such that the two catalysts each undergo chain shuttling with one or more of the chain shuttling agents, and catalyst A has a greater capacity of selectively forming stereospecific polymer compared to catalyst B under the reaction conditions chosen. At least one of the chain shuttling agents undergoes polymer transfer in both the forward and reverse directions (as identified in the foregoing test) with both catalyst A and catalyst B. In addition, it is preferable that the chain shuttling agent does not reduce the catalyst efficiency (measured in weight of polymer produced per weight of catalyst per unit time) of either catalyst (compared to activity in the absence of a shuttling agent) by more than 60 percent, more preferably such catalyst efficiency is not reduced by more than 20 percent, and most preferably catalyst efficiency of at least one of the catalysts is increased compared to the catalyst efficiency in the absence of a shuttling agent.

Alternatively, it is also possible to detect catalyst and shuttling agent pairs by performing a series of polymerizations under standard batch reaction conditions and measuring the resulting polymer properties. Suitable shuttling agents are characterized by lowering of the resultant Mn without significant broadening of PDI or loss of activity (reduction in yield or rate) with increasing shuttling agent loading.

The foregoing tests are readily adapted to rapid throughput screening techniques using automated reactors and analytic probes and to formation of polymer blocks having different distinguishing properties (syndiotacticity, isotacticity, and optionally regio-error content). For example, a number of potential shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a minimum PDI of less than 5.0 in variable yield experiments as described above, while not significantly adversely affecting catalyst activity, catalyst efficiency, and preferably improving catalyst activity and efficiency, as above described.

Regardless of the method for identifying, a priori, a shuttling agent, the term is meant to refer to a compound that is capable of preparing the presently identified multi-block copolymers or usefully employed under the polymerization conditions herein disclosed. Highly desirably, multi-block copolymers having an average number of blocks or segments per average chain (as defined as the average number of blocks of different composition divided by the Mn of the polymer) greater than 3.0 more preferably greater than 3.5, even more preferably greater than 4.0, and less than 25, preferably less than 15, more preferably less than 10.0, most preferably less than 8.0 are formed according to the invention.

Suitable shuttling agents for use herein include Group 1, 2, 12 or 13 metal compounds or complexes containing at least one C1-20 hydrocarbyl group, preferably hydrocarbyl substituted aluminum, gallium or zinc compounds containing from 1 to 12 carbons in each hydrocarbyl group, and reaction products thereof with a proton source. Hydrocarbyl groups are alkyl groups, linear or branched, C2-8 alkyl groups. In one or more embodiments of the disclosure, the shuttling agents may be added to the polymerization process. The chain transfer agents may include trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri(C1-8)alkyl aluminum or di(C1-8)alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl) amine, bis(2,3,6,7-dibenzo-1-azacycloheptaneamine), or 2,6-diphenylphenol. In some embodiments, the shuttling agent may be chosen from amine or hydroxyl reagent such that one hydrocarbyl group remains per metal atom. The primary reaction products of the foregoing combinations for use in the present disclosure as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts, and may be excluded for use in the polymerization process of this disclosure. Accordingly, the activity of the chain shuttling agent should be balanced with the catalytic activity of the catalysts to achieve the polymer having a hard segment and a soft segment.

Generally however, shuttling agents possess the highest rates of polymer transfer as well as the highest transfer efficiencies (reduced incidences of chain termination). Such shuttling agents may be used in reduced concentrations and still achieve a degree of shuttling. In addition, such shuttling agents result in production of the shortest possible polymer block lengths. Chain shuttling agents with a single exchange site are employed due to the fact that the effective molecular weight of the polymer in the reactor is lowered.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

In some embodiments, the ethylene based polymers may comprise at least 50 percent by moles of units derived from ethylene. All individual values and subranges from at least 60 mole percent are included herein and disclosed herein as separate embodiments. For example, the ethylene based polymers may comprise at least 63 percent by moles of units derived from ethylene; at least 86 percent by moles of units; at least 90 percent by moles of units derived from ethylene; or in the alternative, from 70 to 100 percent by moles of units derived from ethylene; from 70 to 89.5 percent by moles of units derived from ethylene; or from 69 to 85.5 percent by moles of units derived from ethylene.

In some embodiments of the ethylene based polymer, the amount of additional α-olefin is less than 50 mol %; other embodiments include at least 1 mole percent (mol %) to 40 mol %; and in further embodiments the amount of additional α-olefin includes at least 10 mol % to 20 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The ethylene based polymers may contain from about 0 to about 20 weight percent tillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a polydispersity index (PDI) from 1 to 25, where PDI is defined as $M_w/M_n$ with $M_w$ being a weight-average molecular weight and $M_n$ being a number-average molecular weight. In other embodiments, the polymers resulting from the catalyst system have a PDI from 1 to 6. Another embodiment includes a PDI from 1 to 3; and other embodiments include PDI from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 µm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc.); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-Compositional GPC Analysis

The molecular weight data of samples generated from the PPR experiments are determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250₤ aliquot of the sample. The GPC is equipped with two Polymer Labs PLgel 10 μm MIXED-B columns (300×10 mm) at a flow rate of 2.0 mL/minute at 160° C. Sample detection is performed using a PolymerChar IR5 detector in concentration mode. A conventional calibration of narrow polystyrene (PS) standards is utilized with apparent units adjusted to homo-polyethylene (PE) using known Mark-Houwink coefficients for PS and PE in TCB at this temperature. Octene incorporation was determined by use of a linear calibration developed by analyzing co-polymers at known compositions with the PolymerChar IR 5 detector.

1-Octene Incorporation IR Analysis

The running of samples for the HT-GPC analysis precedes the IR analysis. In some cases the octene incorporation was determined from the compositional GPC analysis, and in other cases this separate IR analysis was conducted. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670γ.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumna, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camille to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

PolymerChar HT-Compositional GPC Analysis

Polymer samples generated from the Batch Polymerization Process were analyzed by high temperature GPC analysis using a PolymerChar GPC with infrared detector (IR5) and Agilent PLgel MIXED-A columns. Decane (10 μL) was added to each sample for use as an internal flow marker. Samples were first diluted in 1,2,4-trichlorobenzene (TCB) stabilized with 300 ppm butylated hydroxyl toluene (BHT) to a concentration of 10 mg/mL and dissolved by stirring at 160° C. for 120 minutes. Prior to injection samples were further diluted with TCB stabilized with BHT to a concentration of 2 mg/mL. Samples (200 μL) were eluted through one PLgel 20 μm (50×7.5 mm) guard column followed by four PLgel 20 μm (300×7.5 mm) MIXED-A columns maintained at 160° C. with TCB stabilized with BHT at a flowrate of 1.0 mL/min. The total run time was 40 minutes. To calibrate for molecular weight (MW) Agilent EasiCal polystyrene standards (PS-1 and PS-2) were diluted with 1.5 mL TCB stabilized with BHT and dissolved by stirring at 160°

C. for 15 minutes. The PS standards were injected into the system without further dilution to create a 3rd order MW calibration curve with apparent units adjusted to homo-polyethylene (PE) using known Mark-Houwink coefficients for PS and PE ($\alpha_{sty}$=0.722, log $K_{sty}$=−3.993, $\alpha_{eth}$=0.725, log $K_{eth}$=−3.391). Octene incorporation was determined by use of a linear calibration developed by analyzing co-polymers at known compositions.

Chain Shuttling Activity

Beyond catalyst efficiency, or $M_w$, comonomer incorporation, and PDI of the corresponding polymer produced from a specific catalyst, understanding the chain transfer capability of a new catalyst is one critical aspect for development of new polyolefin catalyst families at Dow. A catalyst's chain transfer ability is initially evaluated by running a campaign in which the level of chain transfer or shuttling agent (CSA) is varied to observe the depression in molecular weight and narrowing of the PDI expected for a shuttling catalyst. The molecular weight of the polymer generated by catalysts with potential to be good chain transfer agents will be more sensitive to the addition of CSA than the polymer molecular weight generated by poorer shuttling catalysts. The Mayo equation (Equation 1) describes how a chain transfer agent decreases the number average chain length ($\overline{X}_n$) from the native number average chain length ($\overline{X}_{n0}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected $M_n$ of a polymerization. $M_{no}$ is the native molecular weight of the catalyst in the absence of chain shuttling agent and $M_n$ is the molecular weight that is observed with chain shuttling agent ($M_n = M_{no}$ with no chain shuttling agent.

$$\frac{1}{\overline{x}_n} = \frac{1}{\overline{x}_{n_0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{monomer}] \times 28} \quad \text{Equation 3}$$

[Monomer] = (Mol % C2) × [ethylene] + (Mol % C8) × [octene]  Equation 4

Figure 5:
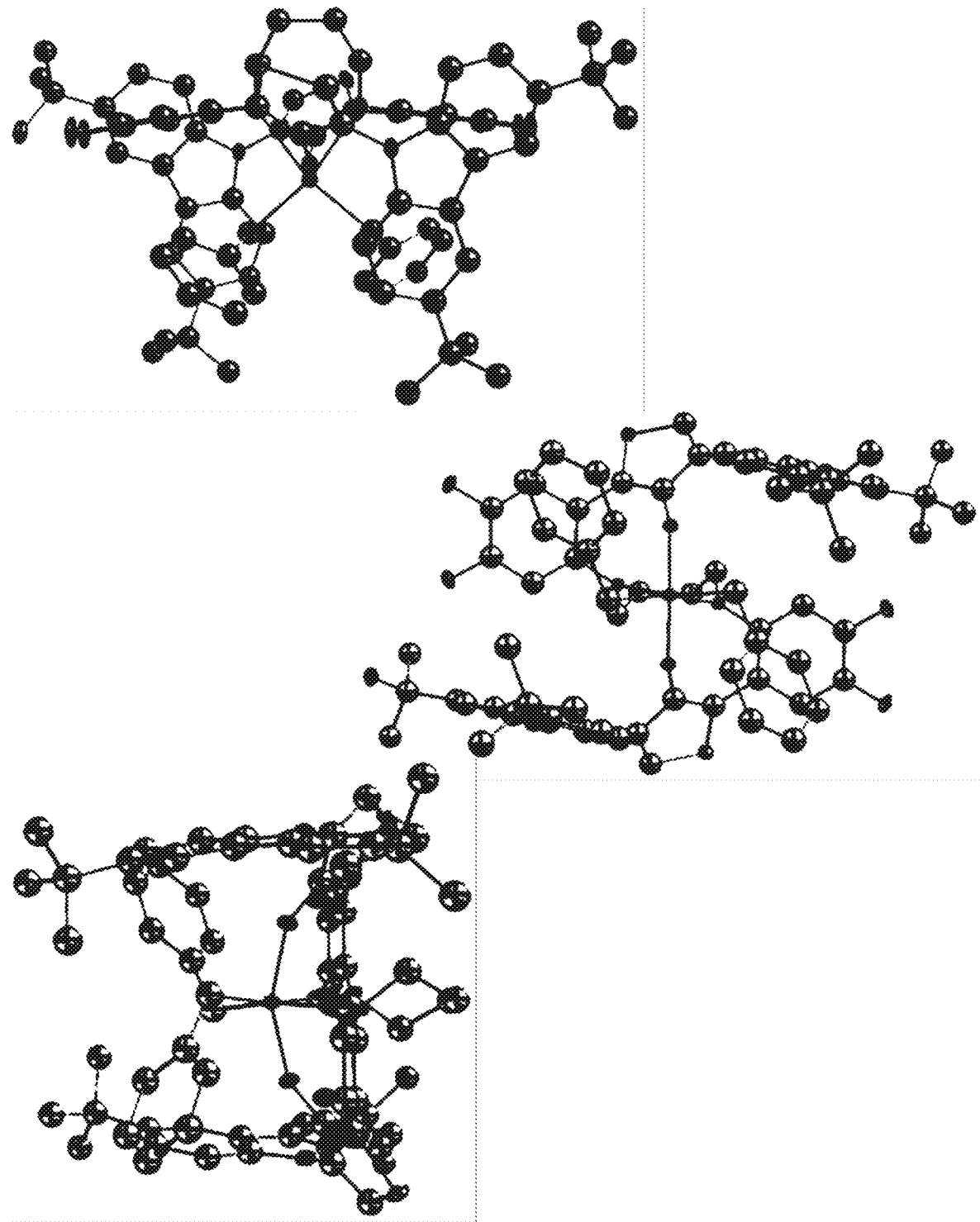
FIG. 5 is three images generated by the x-ray diffraction of procatalyst 20
Figure 6:
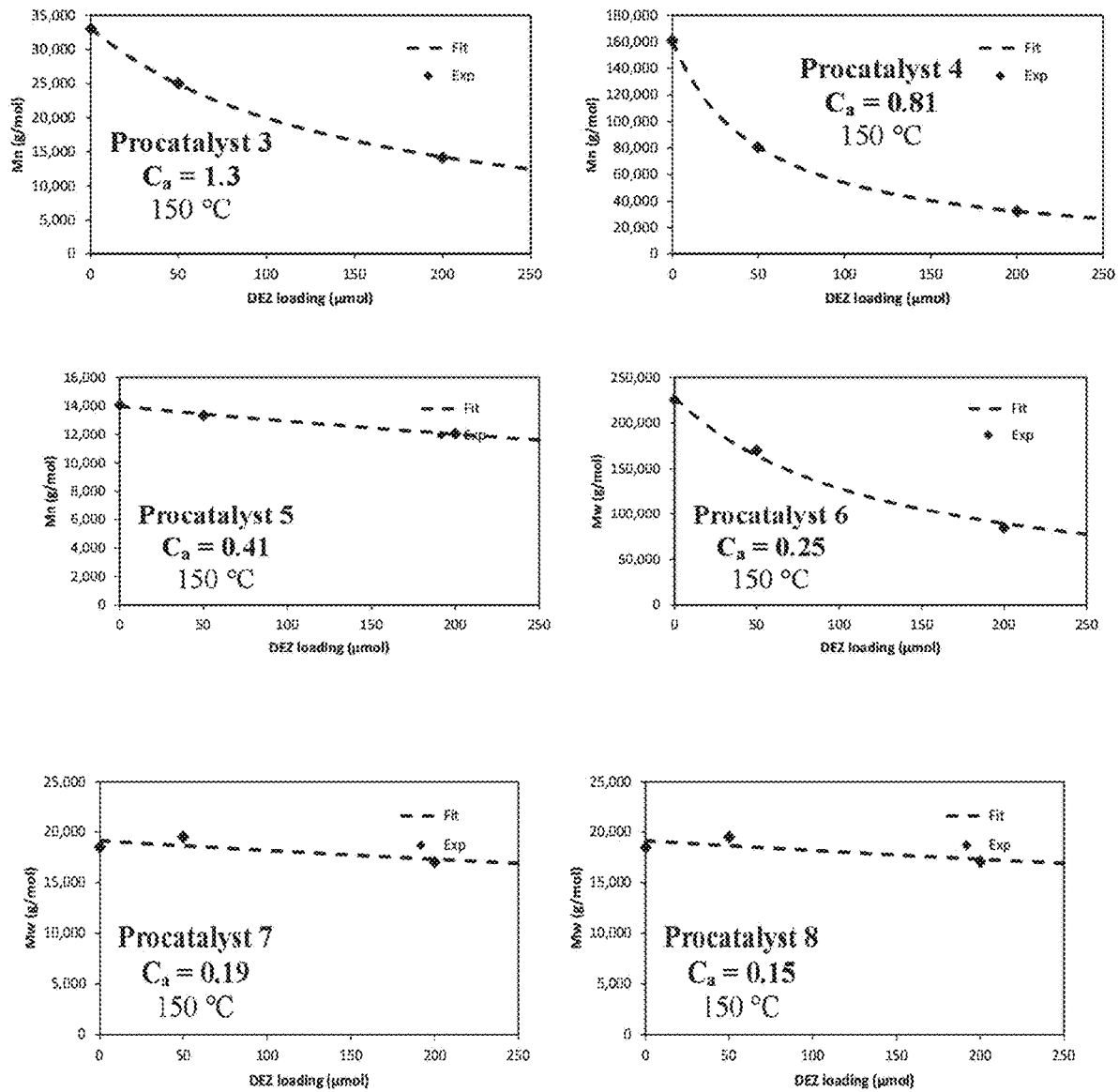
FIG. 6 is a graph of the change of molecular weight of a polymer as a function of the amount of chain shuttling agents for procatalysts 3-8.
Figure 7:
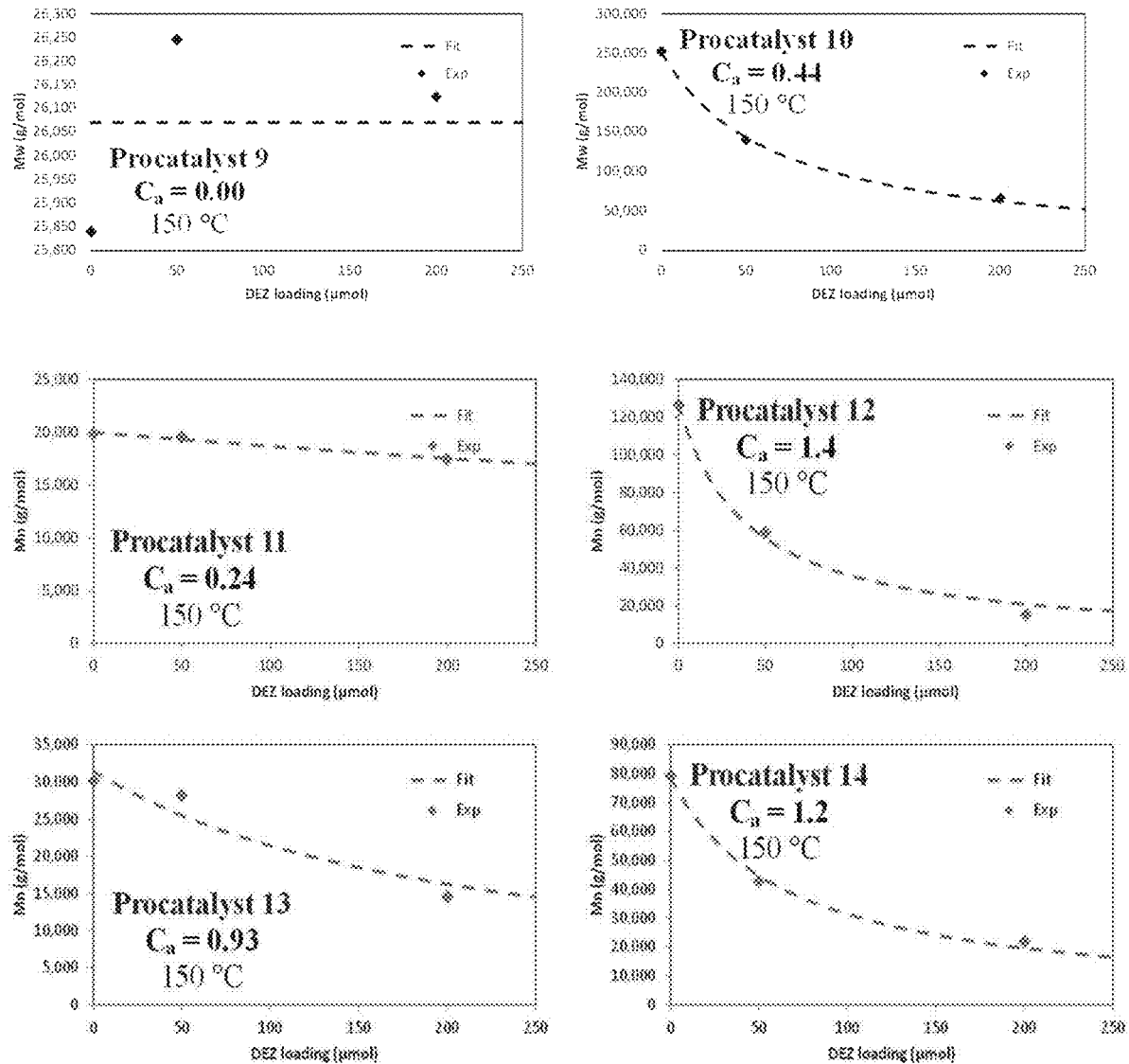
FIG. 7 is a graph of the change of molecular weight of a polymer as a function of the amount of chain shuttling agents for procatalysts 9-14.
Figure 8:
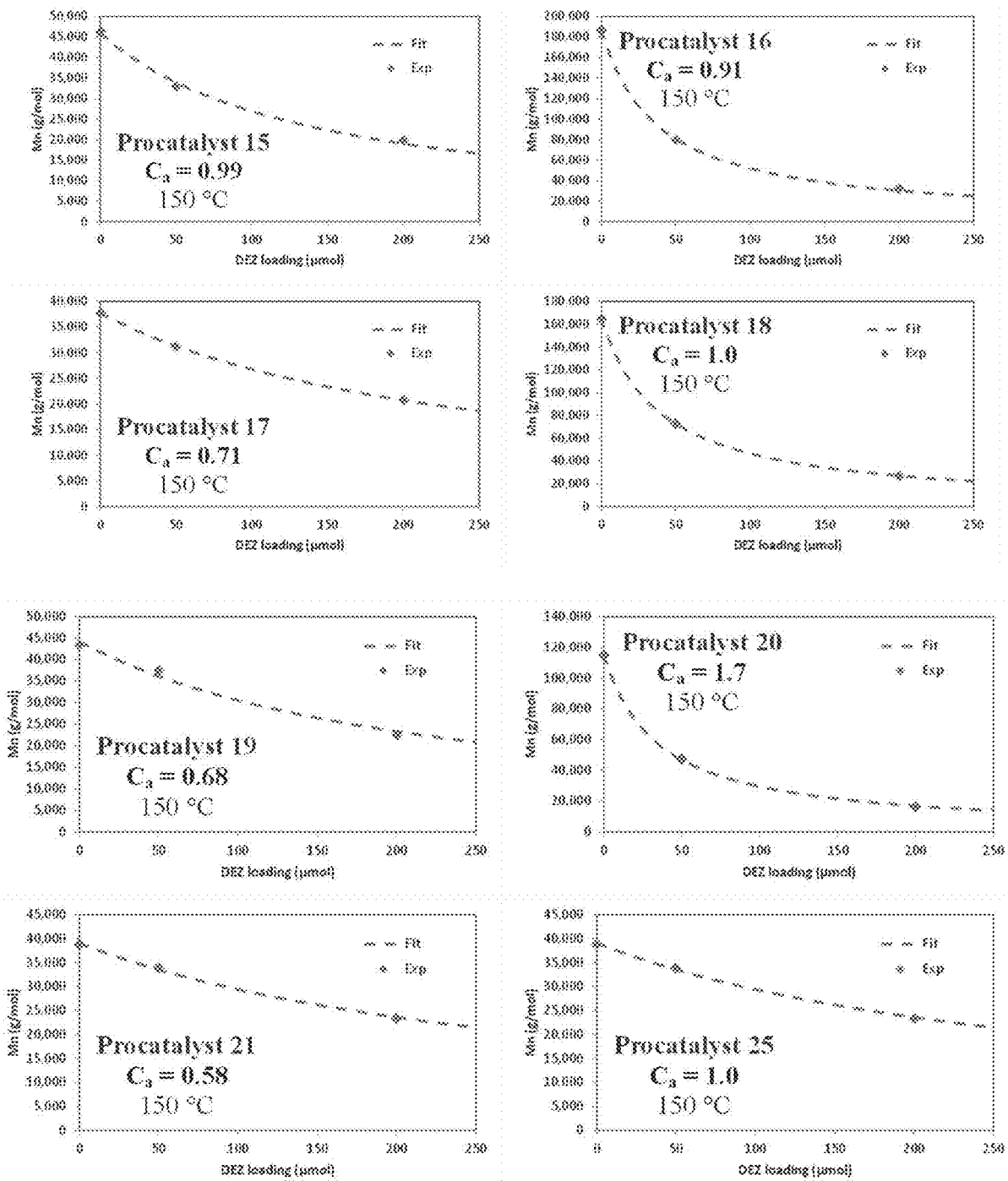
FIG. 8 is a graph of the change of molecular weight of a polymer as a function of the amount of chain shuttling agents for procatalysts 15-21 and 25.
Figure 9:
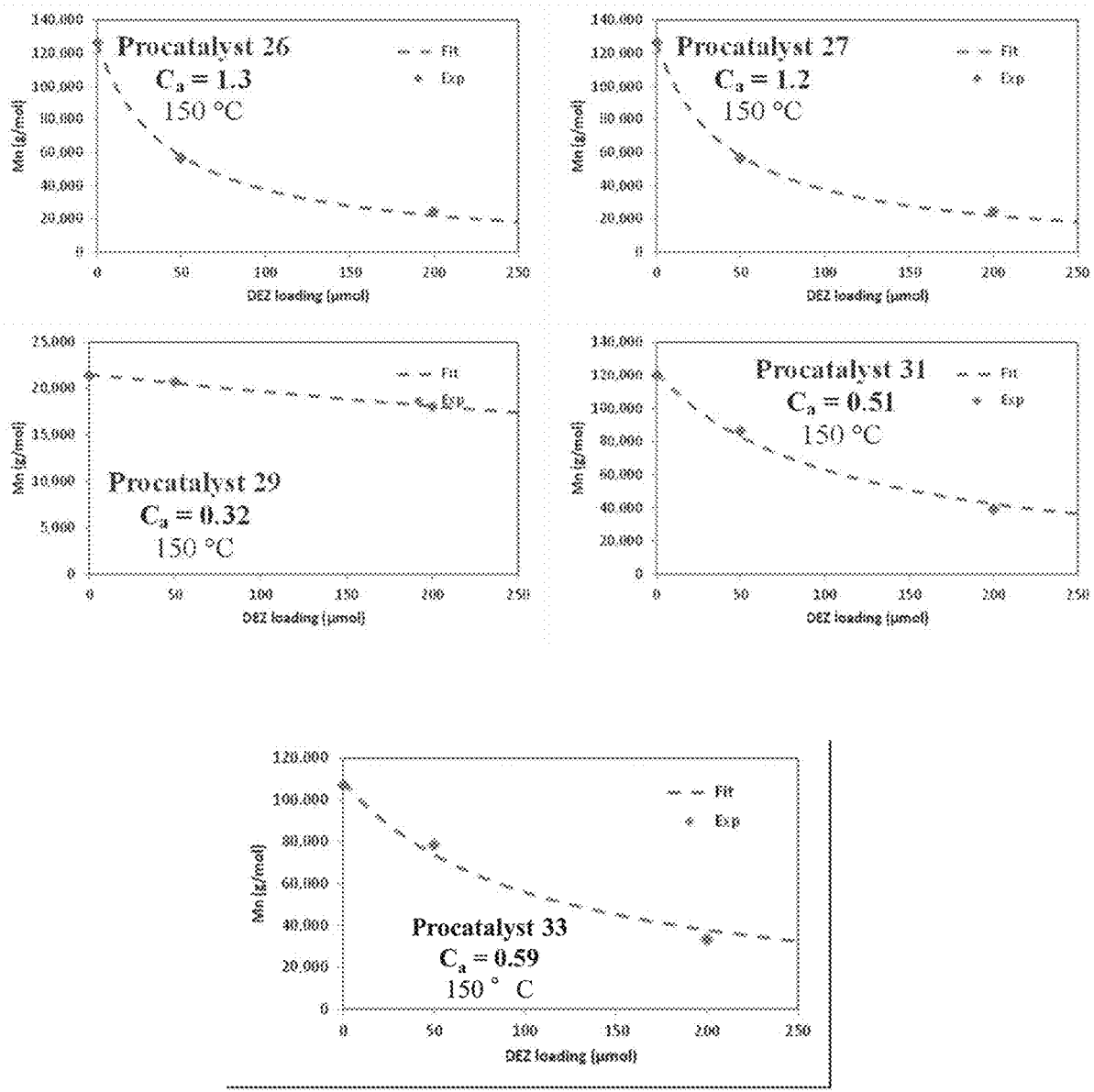
FIG. 9 is a graph of the change of molecular weight of a polymer as a function of the amount of chain shuttling agents for procatalysts 26, 27, 29, 31, and 33.

To determine the chain transfer rate for procatalysts 1-7 and 9-52, a semi-batch campaign was conducted using varying amounts of the chain transfer agent, $Et_2Zn$ (0, 50, and 200 µmoles). All reactions employed 1.2 equivalents of [HNMe($C_{18}H_{37}$)$_2$][B($C_6F_5$)$_4$] as the activator at 120 or 150° C., and procatalysts 7, 8, 11, and 12 were premixed in a 0.005 M solution with excess MMAO-3A (10.0 eq) for 10 mins prior to subjection to the polymerization experiment. The batch campaign was conducted at 120° C. and 150° C. with 11.1 or 12.1 g of ethylene under a pressure of 76-136 psi, 56 g or 57 g of 1-octene, and 528 g or 555 g of IsoparE. The catalyst efficiency as well as the $M_w$, PDI and comonomer incorporation of the corresponding produced polymers is presented in Table 2. The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst. Plots of $M_n$ versus [CSA] for procatalysts 1-52 are shown in FIG. 5 including a line showing the expected dependence of $M_n$ on [CSA] from the best fit value for Ca, and the calculated Ca values are presented in Table 3.

EXAMPLES

Figure 1B:
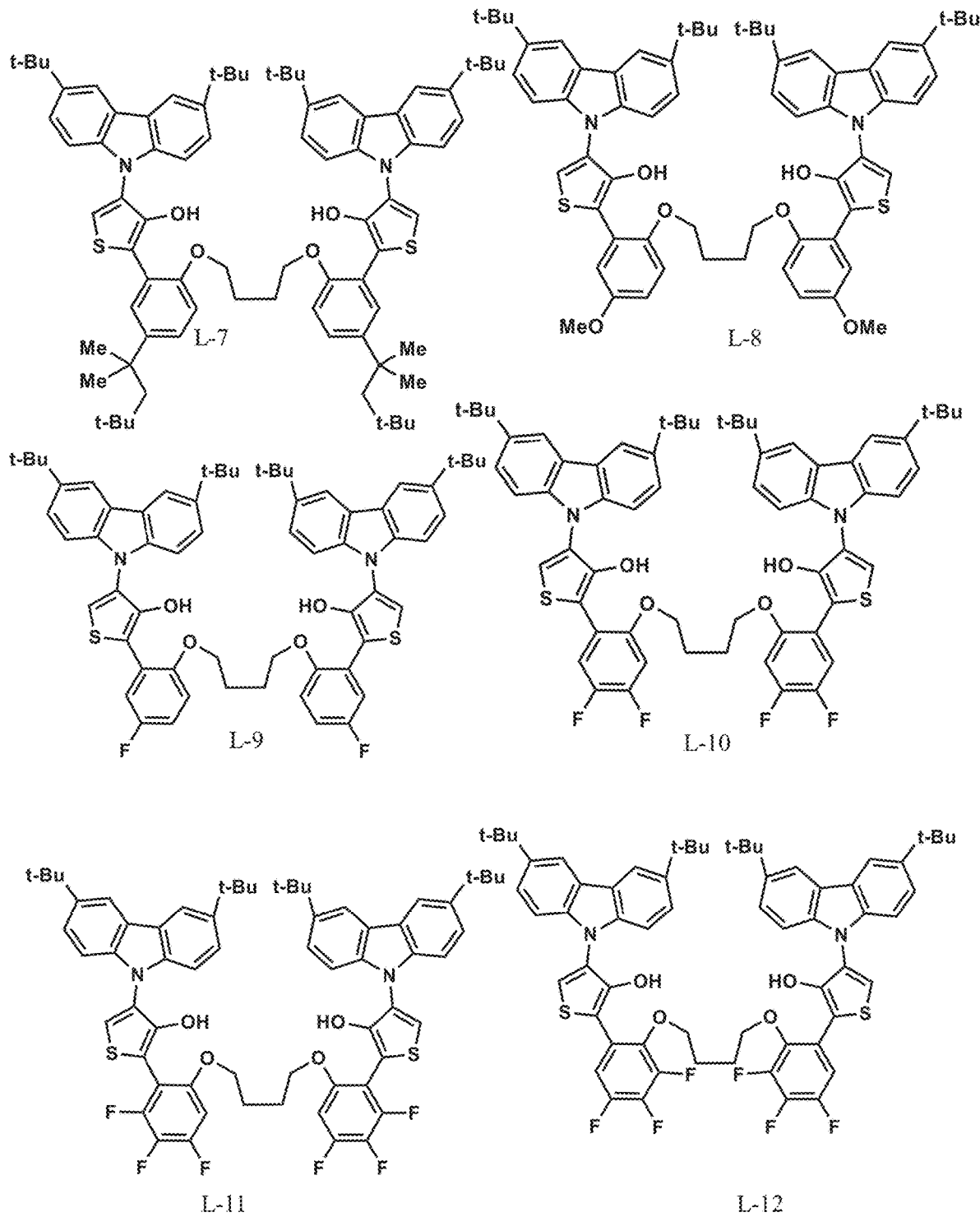
FIG. 1B depicts various ligands that form the metal-ligand complexes of formula (I).
Figure 1C:
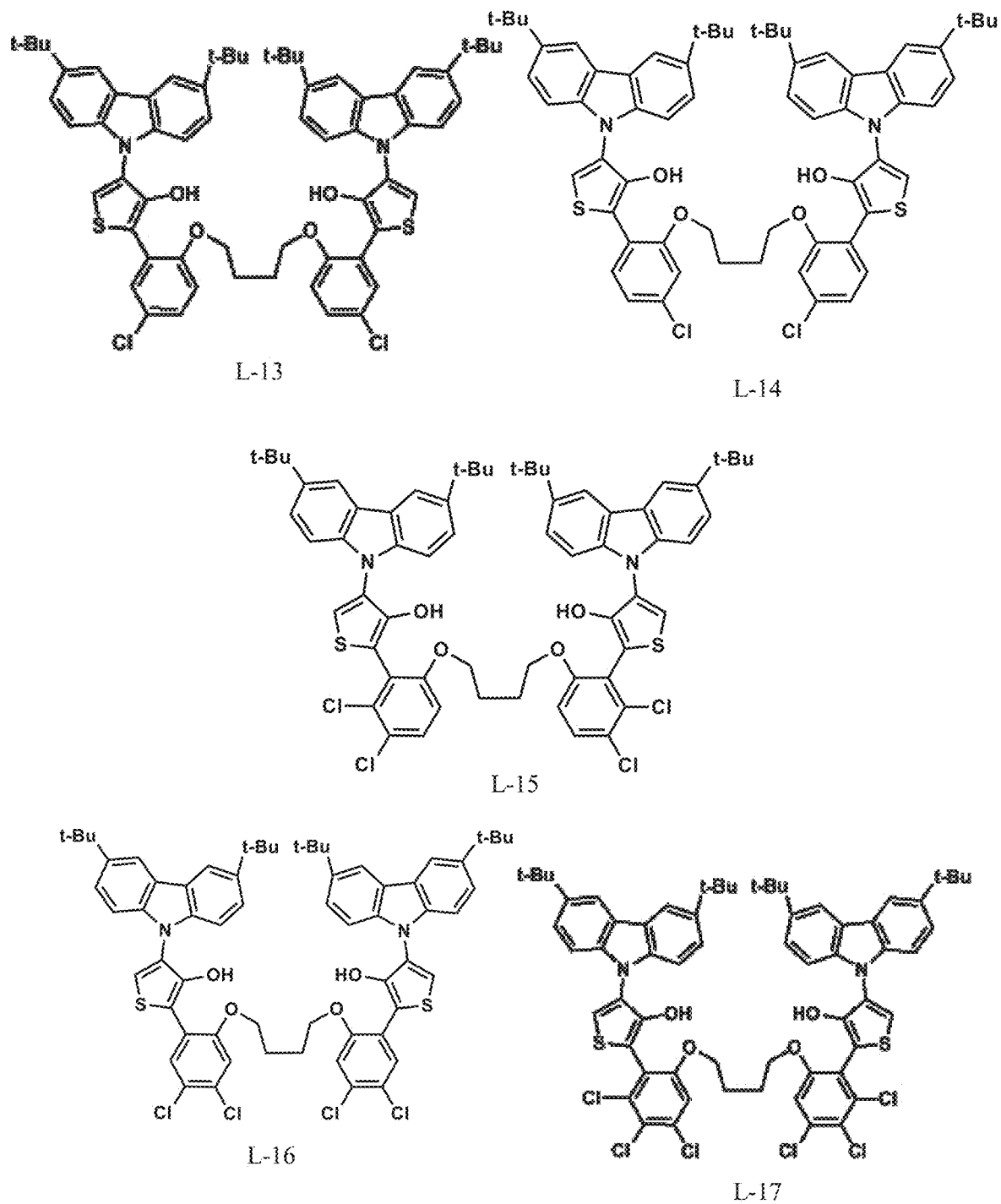
FIG. 1C depicts various ligands that form the metal-ligand complexes of formula (I).
Figure 2:
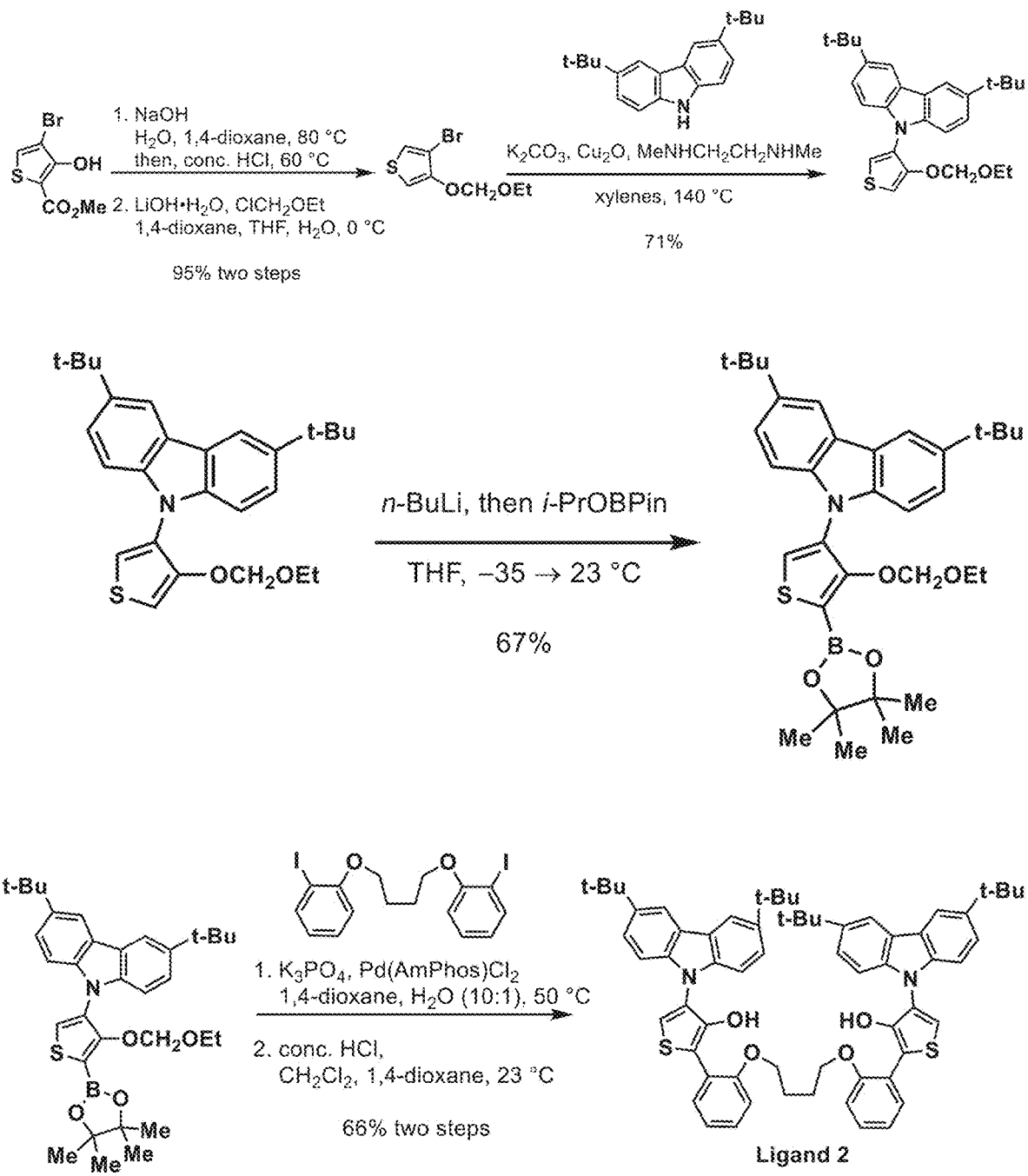
FIG. 2 depicts a four step synthetic scheme to synthesize ligand 2 (L-2).
Figure 3:
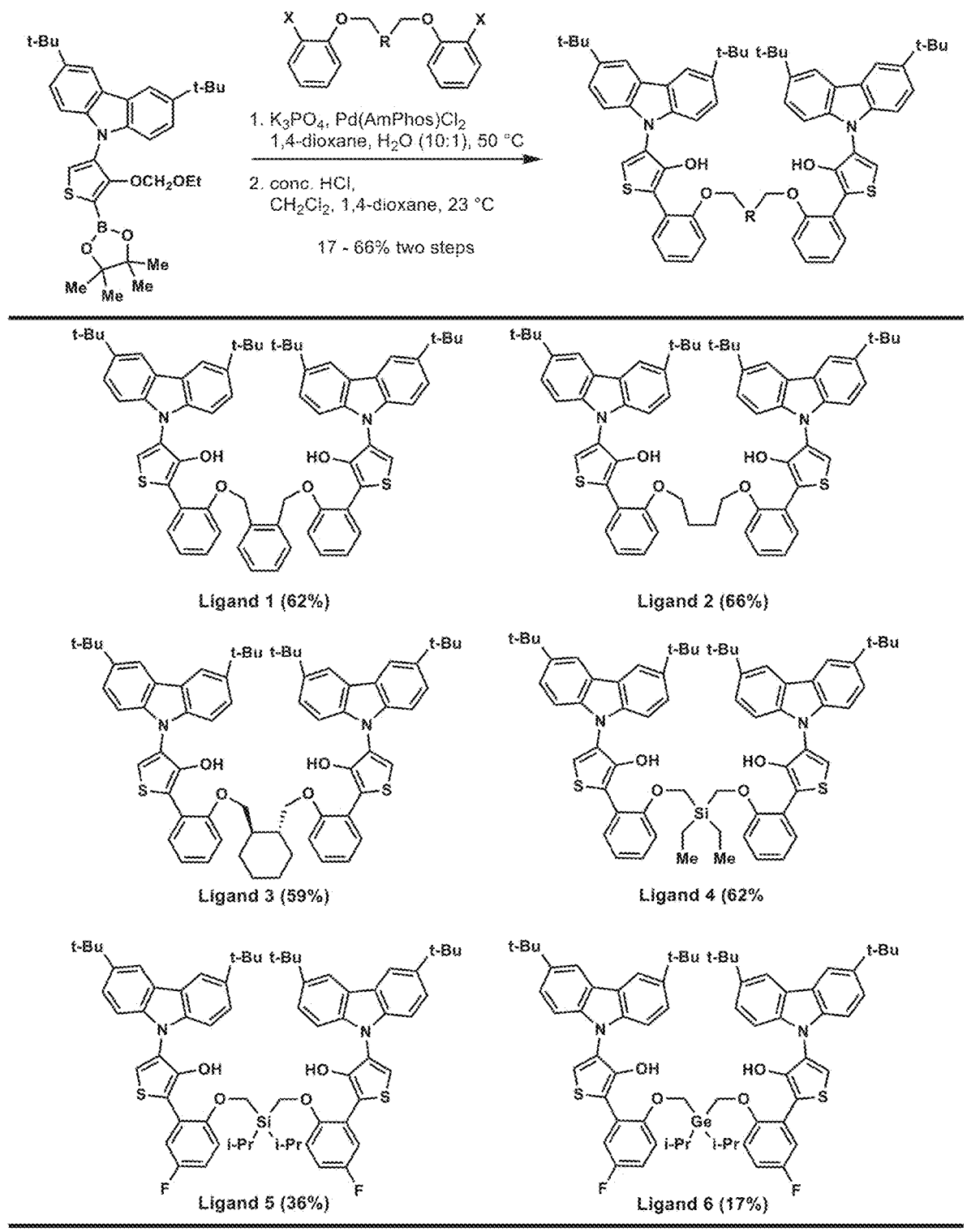
FIG. 3 depicts a two-step synthetic scheme to synthesize ligands 1-6 (L-2 to L-3), in which the reagent in the first step is altered depending on the ligand.
Figure 4:
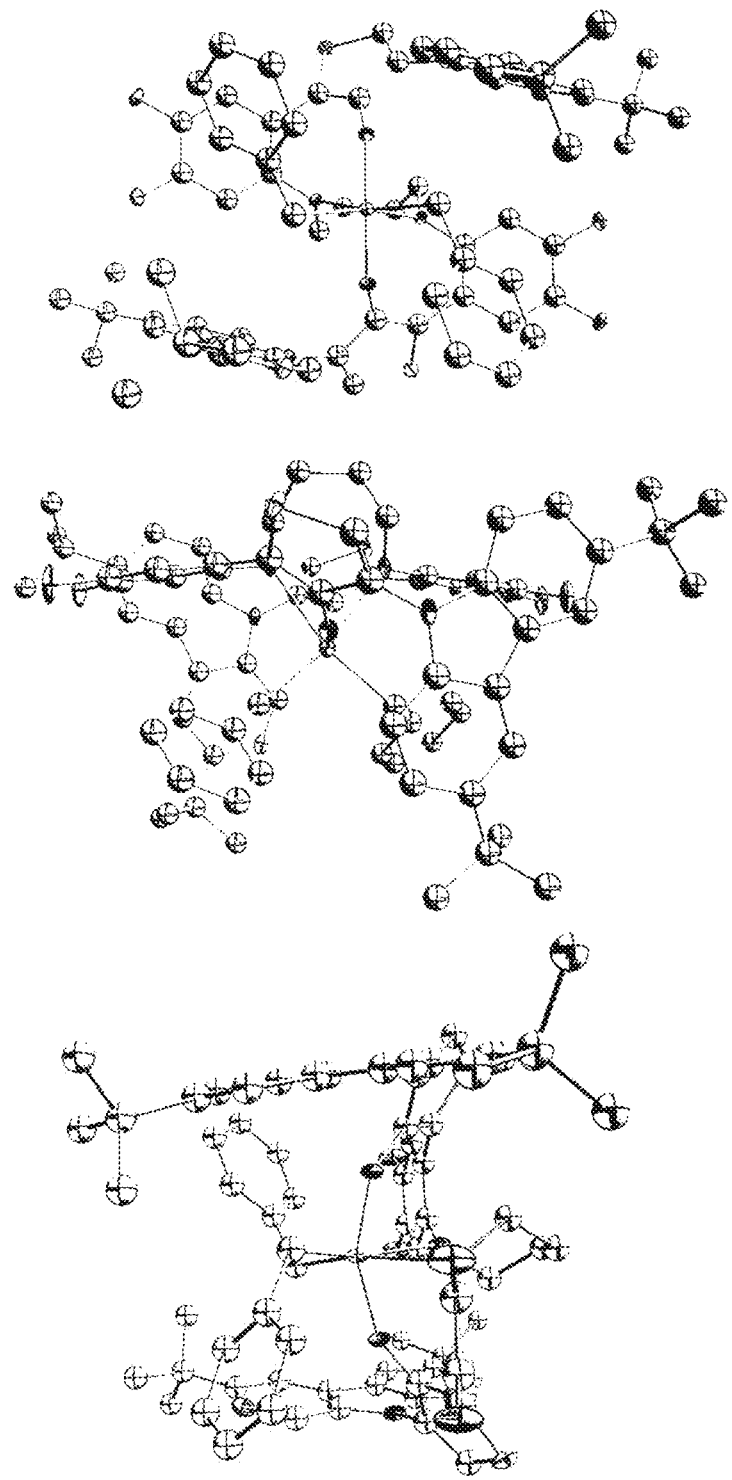
FIG. 4 is three images generated by the x-ray diffraction of procatalyst 19.

Examples 1 to 79 are synthetic procedure for intermediates of the ligands, ligands, and the isolated procatalysts, and refer to FIGS. 1-4. One or more features of the present disclosure are illustrated in view of the examples as follows:

Procatalysts 1 to 34 were synthesized from Ligands 1 to 17 which are presented in FIG. 1A, FIG. 1B, and FIG. 1C. Ligands 1-17 were synthesized by representative synthetic schemes shown in FIGS. 2 and 3.

All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Solvents used for experiments performed in a nitrogen-filled glovebox were further dried by storage over activated 4 Å molecular sieves. Glassware for moisture-sensitive reactions was dried in an oven overnight prior to use. NMR spectra were recorded on Varian 400-MR and VNMRS-500 spectrometers. LC-MS analyses were performed using a Waters e2695 Separations Module coupled with a Waters 2424 ELS detector, a Waters 2998 PDA detector, and a Waters 3100 ESI mass detector. LC-MS separations were performed on an XBridge C18 3.5 µm 2.1×50 mm column using a 5:95 to 100:0 acetonitrile to water gradient with 0.1% formic acid as the ionizing agent. HRMS analyses were performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data were determined with $^1$H decoupling, and the chemical shifts are reported downfield from tetramethylsilane (TMS, δ scale) in ppm versus the using residual carbons in the deuterated solvent as references.

Example 1: Synthesis of Hydroxy-Thiophene Intermediate Steps—1 and 2 in FIG. 2

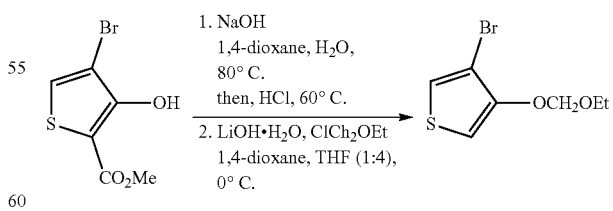

To a suspension of the hydroxythiopene (10.020 grams, 42.267 mmol, 1.00 eq) in 1,4-dioxane (100 mL) and $H_2O$ (450 mL) under nitrogen was added NaOH (50.000 g, 1.250 mol, 29.6 eq) all at once. The now pale yellow mixture was equipped with a reflux condenser and placed in a mantle heated to 80° C. After stirring (500 rpm) for 2.5 hrs TLC of the now golden yellow solution indicated complete conversion of the starting thiophene to a lower $R_f$ spot. The mixture was removed the mantle, allowed to gradually cool to 23° C., placed in an ice water bath for 60 mins, and concentrated HCl (125 mL, 37%) was added over 10 mins. The now white heterogeneous mixture was removed from the ice water bath, placed in a mantle heated to 60° C., stirred vigorously (1000 rpm) for 5 hrs, the now pale golden yellow solution was removed from the mantle, allowed to cool gradually to 23° C., diluted with Et$_2$O (100 mL), stirred vigorously for 2 mins, poured into a separatory funnel, partitioned, organics were washed with aqueous HCl (2×100 mL, 1 N), residual organics were extracted from the aqueous layer using Et$_2$O (2×50 mL), dried over solid Na$_2$SO$_4$, decanted, and the Et$_2$O was removed via rotary evaporation to afford the crude bromo-hydroxythiophene as a solution in 1,4-dioxane (100 mL). An aliquot was removed, fully concentrated in vacuo, and NMR indicated pure product which exists as a mixture of tautomers. The material is used in the subsequent experiment without concentration or purification.

The clear pale yellow solution of the hydroxythiophene in 1,4-dioxane (100 mL, from above) was diluted with non-anhydrous, non-deoxygenated THF (400 mL), H$_2$O (6 mL) was added, the solution was placed in an ice water bath, sparged with nitrogen for 1 hr, placed under a positive flow of nitrogen upon which solid lithium hydroxide-monohydrate (3.544 g, 84.453 mmol, 2.00 eq) was added. The mixture changed to a dark red-brown solution, stirred vigorously (1000 rpm) for 1 hr upon which neat chloromethylmethyl ether (11.8 mL, 126.80 mmol, 3.00 eq) was added via syringe in a quick dropwise manner. After stirring for 2 hrs at 0° C. the dark brown solution was diluted aqueous NaOH (200 mL, 1 N), stirred for 2 mins, THF was removed in vacuo, the biphasic mixture was diluted with CH$_2$Cl$_2$ (100 mL), suction filtered over a pad of celite, rinsed with CH$_2$Cl$_2$ (4×50 mL), the dark brown filtrate mixture was poured into a separatory funnel, partitioned, organics were washed with aqueous NaOH (2×100 mL, 1 N), residual organics were extracted from the aqueous using CH$_2$Cl$_2$ (2×50 mL), combined, dried over solid Na$_2$SO$_4$, decanted, and carefully concentrated to afford a golden brown oil which was diluted with CH$_2$Cl$_2$ (25 mL), suction filtered over a pad of silica gel, rinsed with CH$_2$Cl$_2$ (4×50 mL), and the filtrate was concentrated to afford the thiophene-ether as a golden yellow oil (9.534 g, 40.209 mmol, 95% two steps). NMR indicated product.

Hydroxythiophene exists as a mixture of tautomers: * denotes keto-tautomer $^1$H NMR (400 MHz, Chloroform-d) δ (8.34 (s, 1H))*, 7.12 (d, J=3.7 Hz, 1H), 6.43 (d, J=3.7 Hz, 1H), 5.49 (s, 1H), (3.72 (s, 2H))*. $^{13}$C NMR (101 MHz, Chloroform-d) δ (210.23)*, 195.46, 160.19, (149.69)*, 121.43, (111.65)*, 100.24, (37.05)*.

Characterization of the Protected Hydroxythiophene:

$^1$H NMR (400 MHz, Chloroform-d) δ 7.15 (d, J=3.6 Hz, 1H), 6.61 (d, J=3.5 Hz, 1H), 5.19 (s, 2H), 3.73 (q, J=7.1 Hz, 2H), 1.22 (t, J=7.1 Hz, 3H). $^{13}$C NMR (101 MHz, Chloroform-d) δ 151.51, 121.50, 103.84, 101.55, 95.07, 64.53, 15.05.

Example 2: Synthesis of Hydroxythiophene Carbazole Intermediate—Step 3 in FIG. 2

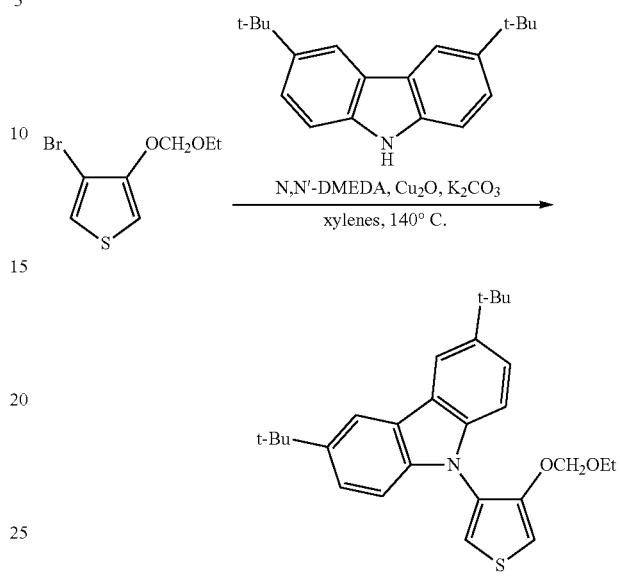

In a nitrogen filled continuous purge glovebox, a mixture of the bromothiophene (5.883 g, 24.811 mmol, 1.00 eq), 3,6-di-t-butylcarbazole (15.252 g, 54.585 mmol, 2.20 eq), Cu$_2$O (7.100 g, 49.622 mmol, 2.00 eq), and K$_2$CO$_3$ (34.290 g, 248.11 mmol, 10.00 eq) was suspended in deoxygenated anhydrous xylenes (200 mL), N,N'-DMEDA (21.5 mL, 199.84 mmol, 4.00 eq) was added, the mixture was equipped with a reflux condenser and a rubber septa, removed from the glovebox, placed under nitrogen, placed in a mantle heated to 140° C., stirred vigorously (1000 rpm) for 72 hrs, removed from the mantle, the now deep red-black mixture was allowed to cool gradually to 23° C., CH$_2$Cl$_2$ (100 mL) was added, the mixture was stirred for 5 mins, suction filtered over a pad of silica gel, rinsed with CH$_2$Cl$_2$ (4×75 mL), the golden brown filtrate was concentrated onto celite, and purified several times via silica gel chromatography using an ISCO chromatography purification system; 15% CH$_2$Cl$_2$ in hexanes to afford the thiophene-carbazole product as a white amorphous foam (7.699 g, 17.673 mmol, 71%). NMR indicated pure product.

$^1$H NMR (500 MHz, Chloroform-d) δ 8.12 (d, J=1.9 Hz, 2H), 7.45 (dd, J=8.6, 2.0 Hz, 2H), 7.32 (d, J=3.6 Hz, 1H), 7.20 (d, J=8.6 Hz, 2H), 6.89 (d, J=3.6 Hz, 1H), 3.56 (q, J=7.1 Hz, 2H), 1.47 (s, 18H), 1.16 (t, J=7.1 Hz, 3H). $^{13}$C NMR (126 MHz, Chloroform-d) δ 150.87, 142.60, 139.70, 127.62, 123.44, 123.08, 120.21, 116.07, 109.57, 102.36, 94.78, 64.37, 34.70, 32.03, 15.01.

Example 3: Synthesis of Hydroxythiophene Boropinacolate Intermediate—Step 4 in FIG. 2

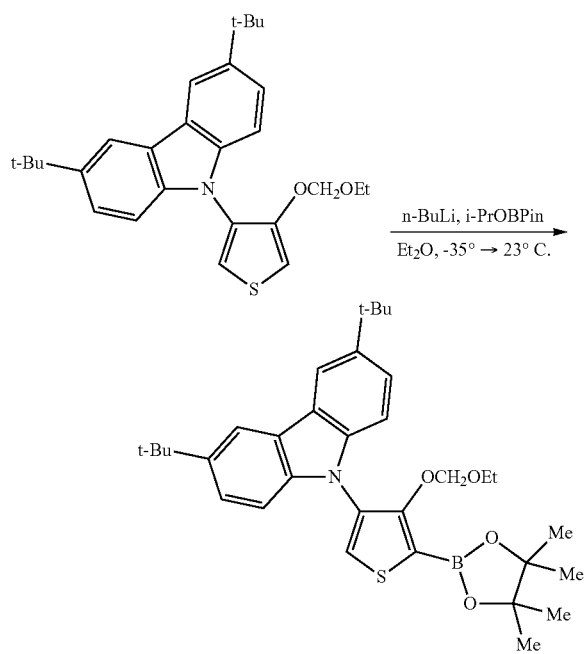

A golden yellow solution of the thiophene (3.000 g, 6.887 mmol, 1.00 eq) in anhydrous deoxygenated Et$_2$O (75 mL) in a nitrogen filled continuous purge glovebox was placed in the freezer (−35° C.), and allowed to precool for 14 hrs upon which a precooled solution of n-BuLi (3.50 mL, 8.608 mmol, 1.25 eq, titrated 2.5 M in hexanes) was added in a quick dropwise manner. The pale orange solution was allowed to sit in the freezer for 4 hrs upon which the isopropoxyboropinacolate ester (2.81 mL, 13.774 mmol, 2.00 eq) was added neat. The now golden yellow solution was allowed to stir at 23° C. for 2 hrs, the now white heterogeneous mixture was diluted with an aqueous phosphate buffer (20 mL, pH=8, 0.05 M), concentrated via rotary evaporation, the mixture was diluted with CH$_2$Cl$_2$ (25 mL) and water (25 mL), poured into a separatory funnel, partitioned, organics were washed with water (1×25 mL), residual organics were extracted with CH$_2$Cl$_2$ (2×25 mL), combined, dried over solid Na$_2$SO$_4$, decanted, concentrated, the resultant golden yellow foam was dissolved in CH$_2$Cl$_2$ (10 mL), suction filtered through a short pad of silica gel, rinsed with CH$_2$Cl$_2$ (4×20 mL), and the golden yellow filtrate solution was concentrated to afford the thiophene-boropinacolate ester as a pale golden yellow foam (2.581 g, 4.596 mmol, 67%, 72% pure by NMR). The impure product is used in the subsequent reaction without further purification.

$^1$H NMR (500 MHz, Chloroform-d) δ 8.11-8.08 (m, 2H), 7.62 (d, J=0.9 Hz, 1H), 7.45 (dt, J=8.6, 1.4 Hz, 2H), 7.23 (dd, J=8.7, 0.7 Hz, 2H), 4.88 (d, J=0.8 Hz, 2H), 2.96-2.88 (m, 2H), 1.46 (s, 18H), 1.38 (s, 12H), 0.58 (t, J=7.1 Hz, 3H). $^{13}$C NMR (126 MHz, Chloroform-d) δ 158.93, 142.70, 139.53, 130.88, 127.58, 123.65, 123.00, 115.86, 109.77, 98.24, 84.20, 64.53, 34.71, 32.03, 24.80, 14.14.

Example 4: Synthesis of Linked Iodophenyl Ether Intermediate

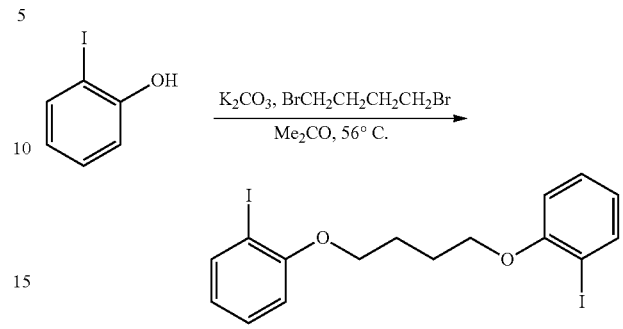

A white heterogeneous mixture of 2-iodophenol (2.000 g, 9.091 mmol, 2.00 eq), K$_2$CO$_3$ (2.513 g, 18.180 mmol, 4.00 eq), and 1,4-dibromobutane (0.54 mL, 4.545 mmol, 1.00 eq) in acetone (25 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred for 2 mins, suction filtered over a pad of celite, rinsed with CH$_2$Cl$_2$ (4×20 mL), the resultant pale yellow filtrate was concentrated onto celite, and purified via silica gel chromatography using an ISCO chromatography purification system; 25% CH$_2$Cl$_2$ in hexanes to afford the iodophenyl ether as a white solid (2.024 g, 4.096 mmol, 90%). NMR indicated pure product.

$^1$H NMR (500 MHz, Chloroform-d) δ 7.77 (dd, J=7.8, 1.8 Hz, 2H), 7.34-7.22 (m, 2H), 6.83 (d, J=8.2 Hz, 2H), 6.70 (t, J=7.6 Hz, 2H), 4.14 (d, J=5.3 Hz, 4H), 2.17-2.06 (m, 4H). $^{13}$C NMR (126 MHz, Chloroform-d) δ 157.42, 139.39, 129.44, 129.43, 122.42, 112.11, 112.09, 86.68, 68.61, 26.04.

Example 5: Synthesis of Linked Diethylsilyl Bridged Iodophenyl Ether Intermediate

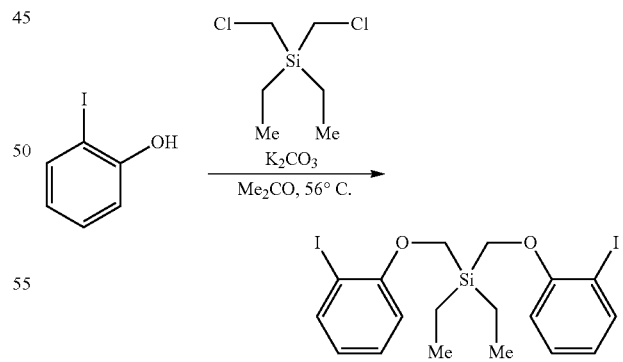

A white heterogeneous mixture of 2-iodophenol (3.671 g, 16.686 mmol, 2.50 eq), K$_2$CO$_3$ (6.918 g, 50.055 mmol, 7.50 eq), and bischloromethyldiethylsilane (1.236 g, 6.674 mmol, 1.00 eq) in acetone (60 mL) equipped with a reflux condenser under nitrogen was placed in a mantle heated to 60° C., after stirring (500 rpm) for 72 hrs the white heterogeneous mixture was removed from the mantle, allowed to cool to 23° C., diluted with CH$_2$Cl$_2$ (50 mL), stirred for 2 mins, suction filtered over a pad of celite, rinsed with $CH_2Cl_2$ (4×20 mL), the resultant pale yellow filtrate was diluted with aqueous NaOH (50 mL, 1 N), the biphasic mixture was poured into a separatory funnel, partitioned, organics were washed with aqueous NaOH (2×30 mL, 1 N) to remove residual starting phenol, residual organics were extracted with $CH_2Cl_2$ (2×20 mL), combined, dried over solid $Na_2SO_4$, decanted, concentrated onto celite, and purified via silica gel chromatography using an ISCO chromatography purification system; 5%-15% $CH_2Cl_2$ in hexanes to afford the desired bisalkylated phenol as a clear colorless viscous oil (3.551 g, 6.430 mmol, 96%). NMR indicated pure product.

$^1$H NMR (500 MHz, Chloroform-d) δ 7.74 (dd, J=7.7, 1.6 Hz, 2H), 7.30 (ddd, J=8.6, 7.6, 1.6 Hz, 2H), 6.98 (dd, J=8.1, 1.3 Hz, 2H), 6.69 (td, J=7.6, 1.4 Hz, 2H), 3.95 (s, 4H), 1.16 (t, J=7.8 Hz, 6H), 0.99 (qd, J=7.8, 1.1 Hz, 4H). $^{13}$C NMR (126 MHz, Chloroform-d) δ 159.46, 139.14, 129.41, 122.23, 111.16, 86.44, 57.91, 7.44, 1.74.

Example 6: Synthesis of 1,2-Dibenzyl Bridged Iodophenyl Ether Intermediate

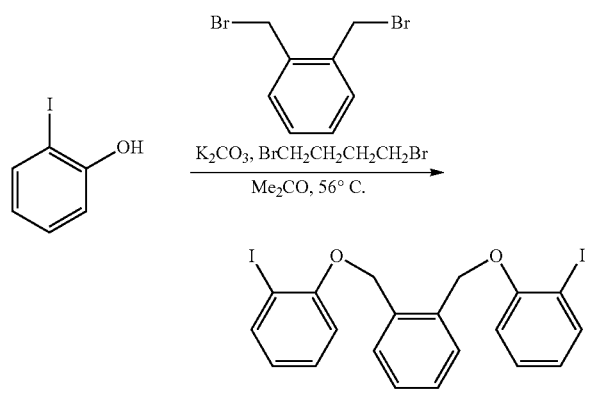

A white heterogeneous mixture of the iodophenol (2.580 g, 11.727 mmol, 2.00 eq), $K_2CO_3$ (4.862 g, 35.178 mmol, 6.00 eq), and the dibromide (1.548 g, 5.863 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (3.138 g, 5.788 mmol, 99%). NMR indicated product.

$^1$H NMR (500 MHz, Chloroform-d) δ 7.81 (dd, J=7.7, 1.6 Hz, 2H), 7.71-7.64 (m, 2H), 7.46-7.39 (m, 2H), 7.30 (ddd, J=8.3, 7.4, 1.6 Hz, 2H), 6.97 (dd, J=8.3, 1.3 Hz, 2H), 6.74 (td, J=7.6, 1.4 Hz, 2H), 5.31 (s, 4H). $^{13}$C NMR (126 MHz, Chloroform-d) δ 156.94, 139.60, 134.42, 129.60, 128.75, 128.45, 112.55, 86.46, 69.21.

Example 7: Synthesis of the Trans-Methylenecyclohexyl Bisiodophenylether Bridge Intermediate

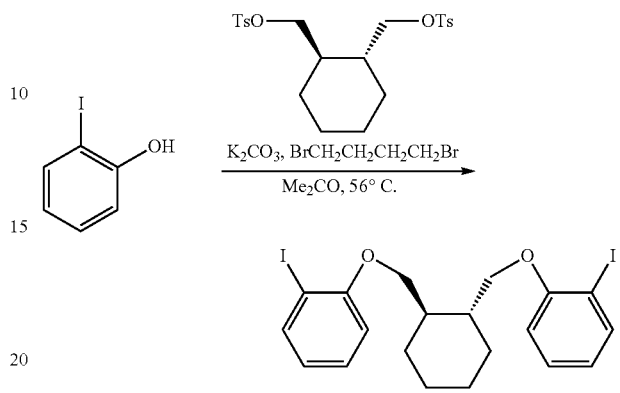

A white heterogeneous mixture of the iodophenol (2.194 g, 9.972 mmol, 2.00 eq), $K_2CO_3$ (2.257 g, 29.916 mmol, 6.00 eq), and the bistosylate (2.257 g, 4.986 mmol, 1.00 eq) in acetone (50 mL) equipped with a reflux condenser under nitrogen was placed in a mantle heated to 60° C., after stirring (500 rpm) for 40 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (1.420 g, 2.590 mmol, 52%) and the mixed monotosylate monoiodphenyl ether (0.992 g, 1.982 mmol, 40%). NMR of each indicated pure product.

$^1$H NMR (500 MHz, Chloroform-d) δ 7.76 (dd, J=7.9, 1.6 Hz, 2H), 7.26 (td, J=7.8, 1.6 Hz, 2H), 6.82 (dd, J=8.2, 1.3 Hz, 2H), 6.69 (td, J=7.6, 1.4 Hz, 2H), 4.10-3.98 (m, 4H), 2.01 (ddt, J=25.4, 13.2, 2.9 Hz, 4H), 1.86 (dq, J=8.4, 2.9 Hz, 2H), 1.52 (dd, J=17.3, 7.8 Hz, 2H), 1.41 (ddt, J=12.0, 8.9, 4.9 Hz, 2H). $^{13}$C NMR (126 MHz, Chloroform-d) δ 157.47, 139.27, 129.46, 122.24, 111.89, 86.52, 72.02, 39.71, 30.29, 26.16.

NMR Characterization of the Mono-Tosylate-Monoiodophenyl Ether:

$^1$H NMR (500 MHz, Chloroform-d) δ 7.76-7.71 (m, 3H), 7.28-7.23 (m, 3H), 6.69 (td, J=7.6, 1.3 Hz, 1H), 6.62 (dd, J=8.3, 1.4 Hz, 1H), 4.09-4.03 (m, 2H), 3.81 (dd, J=9.3, 4.4 Hz, 1H), 3.74 (dd, J=9.3, 3.6 Hz, 1H), 2.38 (s, 3H), 1.93-1.64 (m, 6H), 1.46 (qd, J=12.1, 3.0 Hz, 1H), 1.28 (dd, J=11.3, 8.4 Hz, 3H). $^{13}$C NMR (126 MHz, Chloroform-d) δ 157.17, 144.65, 139.25, 132.77, 129.80, 129.40, 127.94, 122.43, 111.72, 86.52, 73.15, 71.16, 38.97, 38.61, 30.02, 29.41, 25.81, 25.64, 21.62.

Example 8: Synthesis of the Trans-Methylenecyclohexyl Bisiodophenylether Bridge Intermediate

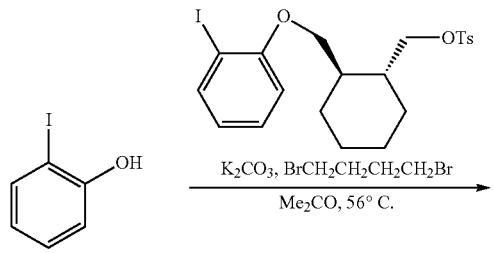

was concentrated onto celite, and purified via silica gel chromatography; 10% CH$_2$Cl$_2$ in hexanes-75% CH$_2$Cl$_2$ in hexanes to afford the bisiodophenyl ether as a white solid (0.677 g, 1.235 mmol, 62%). NMR of each indicated pure product.

$^1$H NMR (500 MHz, Chloroform-d) δ 7.76 (dd, J=7.9, 1.6 Hz, 2H), 7.26 (td, J=7.8, 1.6 Hz, 2H), 6.82 (dd, J=8.2, 1.3 Hz, 2H), 6.69 (td, J=7.6, 1.4 Hz, 2H), 4.10-3.98 (m, 4H), 2.01 (ddt, J=25.4, 13.2, 2.9 Hz, 4H), 1.86 (dq, J=8.4, 2.9 Hz, 2H), 1.52 (dd, J=17.3, 7.8 Hz, 2H), 1.41 (ddt, J=12.0, 8.9, 4.9 Hz, 2H). $^{13}$C NMR (126 MHz, Chloroform-d) δ 157.47, 139.27, 129.46, 122.24, 111.89, 86.52, 72.02, 39.71, 30.29, 26.16.

Example 9: Synthesis of Ligand 2—Steps 5 & 6 in FIG. 2

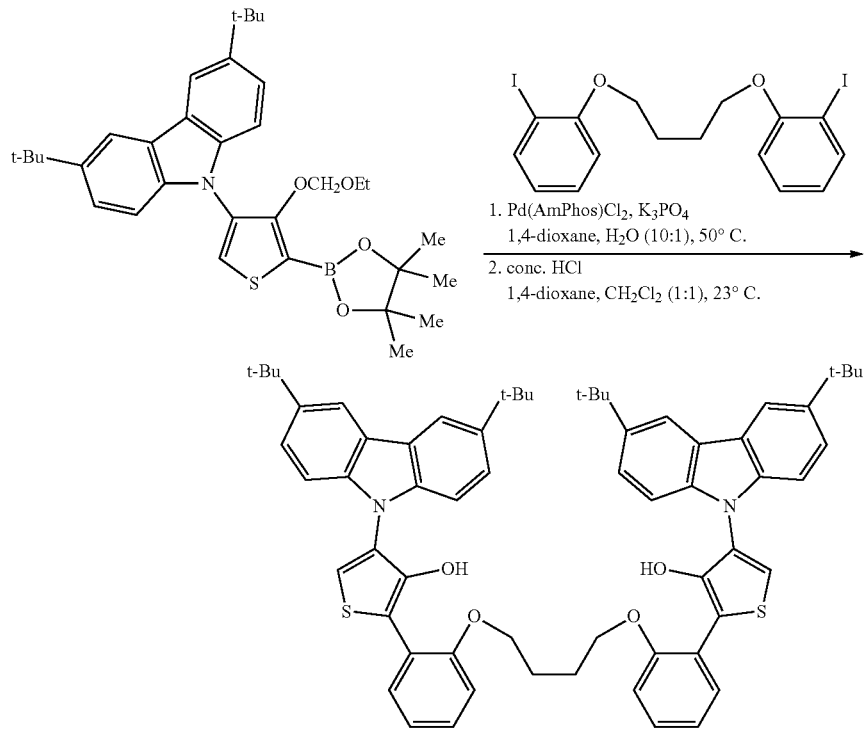

-continued

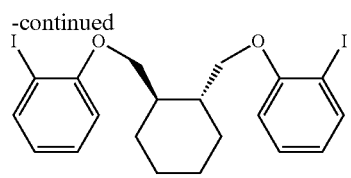

A white heterogeneous mixture of the iodophenol (0.458 g, 2.082 mmol, 1.05 eq), K$_2$CO$_3$ (0.863 g, 6.246 mmol, 3.15 eq), and the monotosylate (0.992 g, 1.982 mmol, 1.00 eq) in acetone (25 mL) equipped with a reflux condenser under nitrogen was placed in a mantle heated to 60° C., after stirring (500 rpm) for 48 hrs the white heterogeneous mixture was removed from the mantle, allowed to cool to 23° C., diluted with CH$_2$Cl$_2$ (50 mL), stirred vigorously (1000 rpm) for 5 mins, suction filtered over a pad of celite, rinsed with CH$_2$Cl$_2$ (3×25 mL), the resultant filtrate solution A mixture of the thiophene boropinacolate ester (2.017 g, 2.586 mmol, 3.00 eq, 72% pure by NMR), K$_3$PO$_4$ (1.647 g, 7.758 mmol, 9.00 eq), Pd(AmPhos)Cl$_2$ (122.0 mg, 0.1724 mmol, 0.20 eq), and the bisphenyliodide (0.426 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.837 g, 0.7544 mmol, 88%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (0.563 g, 0.5668 mmol, 75%, 66% two steps). NMR indicated pure product.

$^1$H NMR (500 MHz, Chloroform-d) δ 8.11 (d, J=2.0 Hz, 4H), 7.61 (dd, J=7.7, 1.7 Hz, 2H), 7.40 (dd, J=8.6, 1.9 Hz, 4H), 7.32 (s, 2H), 7.30-7.20 (m, 6H), 7.12 (t, J=7.5 Hz, 2H), 6.90 (d, J=8.2 Hz, 2H), 4.11-4.04 (m, 4H), 1.95-1.87 (m, 4H), 1.43 (s, 36H). $^{13}$C NMR (126 MHz, Chloroform-d) δ 153.71, 146.43, 142.65, 139.63, 130.50, 128.74, 127.55, 123.42, 123.16, 123.08, 122.96, 120.13, 116.18, 115.28, 114.09, 109.57, 69.98, 34.68, 32.02, 25.86.

Characterization of the Protected Coupled Product:

$^1$H NMR (500 MHz, Chloroform-d) δ 8.13 (h, J=1.9 Hz, 4H), 7.94 (ddd, J=7.6, 4.1, 2.3 Hz, 2H), 7.49-7.44 (m, 4H), 7.38-7.34 (m, 6H), 7.34-7.28 (m, 2H), 7.08-7.01 (m, 4H), 4.46 (t, J=3.0 Hz, 4H), 4.30-4.19 (m, 4H), 2.79 (qt, J=7.2, 2.7 Hz, 4H), 2.29-2.20 (m, 4H), 1.48 (s, 36H), 0.52 (tt, J=7.1, 2.9 Hz, 6H). $^{13}$C NMR (126 MHz, Chloroform-d) δ 155.83, 147.29, 142.72, 139.49, 131.10, 129.37, 129.13, 124.29, 123.66, 123.07, 121.52, 120.61, 119.19, 115.96, 112.07, 109.85, 96.97, 68.36, 64.61, 34.73, 32.06, 26.37, 14.17.

Example 10: Synthesis of Procatalyst 3

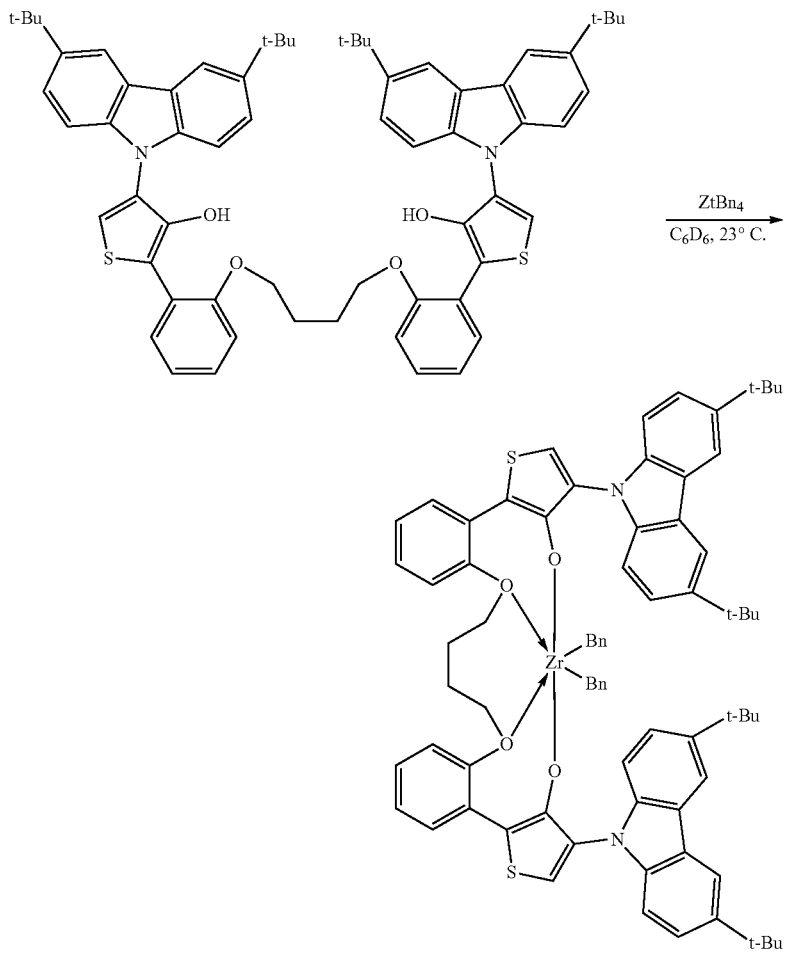

The thiophene ligand was azeotropically dried using PhMe (4×10 mL) prior to use. To a clear colorless solution of the thiophene (7.4 mg, 7.45 μmol, 1.00 eq) in anhydrous $C_6D_6$ (1.34 mL) in a nitrogen filled glovebox at 23° C. was added a solution of $ZrBn_4$ (3.8 mg, 8.20 μmol, 1.10 eq) in $C_6D_6$ (0.15 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-d$_6$) δ 8.48 (dd, J=2.0, 0.6 Hz, 2H), 8.22 (dd, J=1.9, 0.7 Hz, 2H), 7.50-7.46 (m, 4H), 7.31-7.24 (m, 6H), 6.98-6.96 (m, 4H), 6.86 (s, 2H), 6.83-6.75 (m, 4H), 6.70 (td, J=7.5, 1.2 Hz, 2H), 6.23-6.17 (m, 4H), 5.12 (dd, J=8.2, 1.2 Hz, 2H), 3.97-3.88 (m, 2H), 3.28-3.21 (m, 2H), 1.49 (s, 18H), 1.28 (s, 18H), 1.06 (d, J=12.4 Hz, 2H), 0.77-0.67 (m, 2H), 0.52-0.44 (m, 4H). $^{13}$C NMR (126 MHz, Benzene-d$_6$) δ 156.11, 152.23, 147.06, 143.09, 142.73, 139.24, 139.14, 130.95, 129.75, 126.42, 126.17, 125.92, 125.20, 124.55, 123.48, 122.65, 122.35, 120.75, 117.04, 116.94, 116.27, 115.52, 112.51, 108.85, 80.97, 75.18, 34.57, 34.41, 32.01, 31.71, 26.01.

Example 11: Synthesis of Procatalyst 4

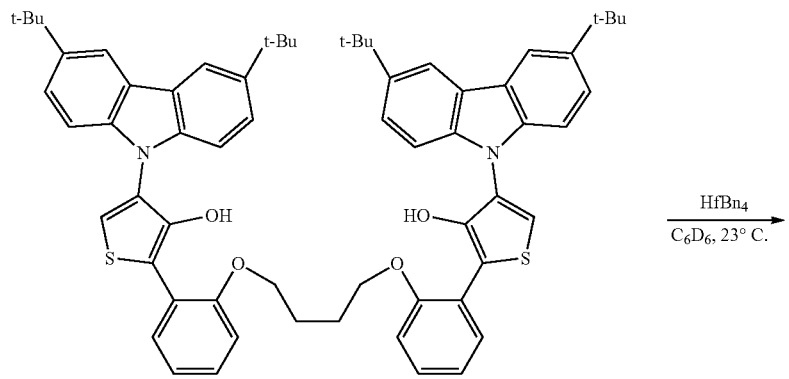

The thiophene ligand was azeotropically dried using PhMe (4×10 mL) prior to use. To a clear colorless solution of the thiophene (14.0 mg, 14.09 μmol, 1.00 eq) in anhydrous C$_6$D$_6$ (2.49 mL) in a nitrogen filled glovebox at 23° C. was added a solution of HfBn$_4$ (8.4 mg, 15.50 μmol, 1.10 eq) in C$_6$D$_6$ (0.33 mL) in a dropwise manner. After stirring (500 rpm) for 30 mins the pale golden yellow solution was filtered using a 0.20 μm PTFE submicron filter to afford the hafnium complex as a 0.0025 M solution in C$_6$D$_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-d$_6$) δ 8.49 (dd, J=2.0, 0.6 Hz, 2H), 8.23 (dd, J=2.0, 0.6 Hz, 2H), 7.47 (ddd, J=8.8, 5.0, 1.9 Hz, 4H), 7.27 (ddd, J=8.5, 4.4, 1.2 Hz, 4H), 7.17 (dd, J=8.7, 0.6 Hz, 2H), 6.99-6.95 (m, 4H), 6.86 (s, 2H), 6.78 (dddd, J=8.6, 7.3, 3.6, 1.5 Hz, 4H), 6.71 (td, J=7.6, 1.2 Hz, 2H), 6.22-6.16 (m, 4H), 5.15 (dd, J=8.2, 1.2 Hz, 2H), 4.02-3.93 (m, 2H), 3.35-3.26 (m, 2H), 1.50 (s, 18H), 1.28 (s, 18H), 0.89 (d, J=13.3 Hz, 2H), 0.78-0.68 (m, 2H), 0.47-0.36 (m, 2H), 0.22 (d, J=13.3 Hz, 2H). $^{13}$C NMR (126 MHz, Benzene-d$_6$) δ 155.80, 152.29, 147.74, 143.15, 142.74, 139.23, 139.09, 130.95, 129.74, 128.54, 127.06, 126.75, 126.10, 125.28, 124.59, 123.68, 122.60, 122.28, 120.78, 117.11, 116.38, 116.26, 115.45, 112.56, 108.84, 81.81, 78.35, 34.57, 34.42, 32.01, 31.72, 26.11.

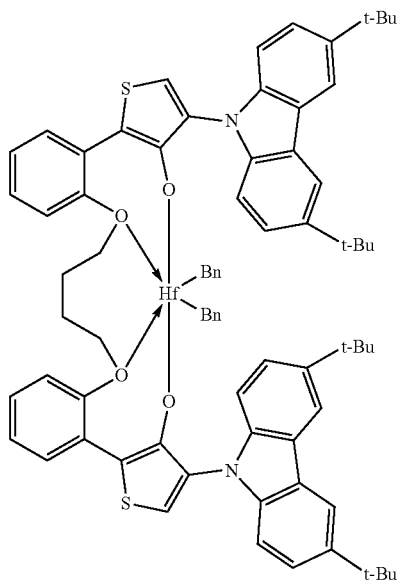

60

Example 12: Synthesis of Ligand 1

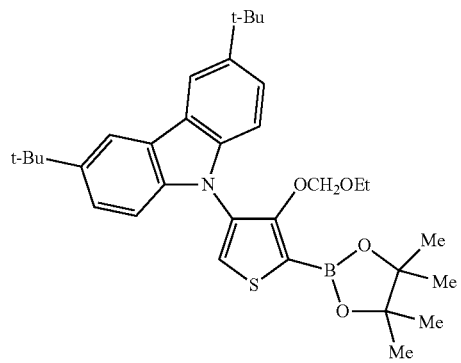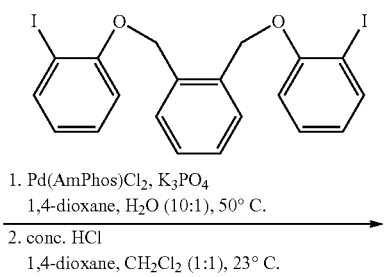

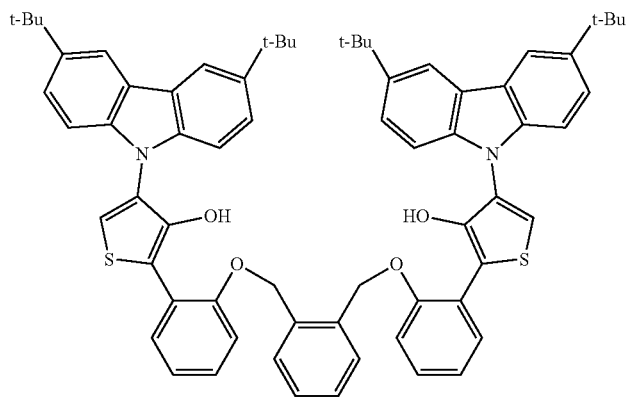

A mixture of the thiophene boropinacolate ester (2.017 g, 2.586 mmol, 3.00 eq, 72% pure by NMR), K₃PO₄ (1.647 g, 7.758 mmol, 9.00 eq), Pd(AmPhos)Cl₂ (122.0 mg, 0.1724 mmol, 0.20 eq), and the bisphenyliodide (0.467 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-50% CH₂Cl₂ in hexanes to afford the bisthiophene as a red amorphous oil (0.810 g, 0.6997 mmol, 81%). NMR indicated pure product.

To a solution of the impure coupled product in CH₂Cl₂-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a light tan solid (0.559 g, 0.5368 mmol, 77%, 62% two steps). NMR indicated pure product.

$^1$H NMR (500 MHz, Chloroform-d) δ 8.08 (d, J=1.9 Hz, 4H), 7.60 (dd, J=7.6, 1.7 Hz, 2H), 7.41 (dd, J=5.6, 3.5 Hz, 2H), 7.36-7.30 (m, 8H), 7.25-7.20 (m, 2H), 7.13 (t, J=7.5 Hz, 2H), 7.07 (d, J=8.5 Hz, 4H), 6.95 (d, J=8.2 Hz, 2H), 6.91 (s, 2H), 5.20 (s, 4H), 1.46 (s, 36H). $^{13}$C NMR (126 MHz, Chloroform-d) δ 153.64, 146.41, 142.61, 139.45, 133.72, 130.67, 129.89, 129.34, 128.95, 127.80, 123.54, 123.37, 123.19, 123.18, 119.90, 116.09, 115.35, 114.78, 109.55, 70.58, 34.69, 32.04.

Characterization of the Protected Coupled Thiophene:

$^1$H NMR (500 MHz, Chloroform-d) δ 8.12 (d, J=1.8 Hz, 4H), 7.84 (dd, J=7.7, 1.7 Hz, 2H), 7.69 (dd, J=5.5, 3.4 Hz, 2H), 7.50 (dd, J=5.6, 3.4 Hz, 2H), 7.41 (dd, J=8.6, 1.9 Hz, 4H), 7.32 (d, J=1.2 Hz, 2H), 7.27-7.22 (m, 6H), 7.09-7.02 (m, 4H), 5.33 (s, 4H), 4.42 (s, 4H), 2.76 (q, J=7.0 Hz, 4H), 1.49 (s, 36H), 0.51 (t, J=7.0 Hz, 6H). $^{13}$C NMR (126 MHz, Chloroform-d) δ 155.75, 147.38, 142.71, 139.42, 135.12, 131.45, 129.50, 129.40, 129.28, 128.45, 124.21, 123.75, 123.07, 121.89, 121.06, 119.10, 115.91, 112.86, 109.84, 96.87, 68.89, 64.52, 34.74, 32.07, 14.19.

Example 13: Synthesis of Procatalyst 1

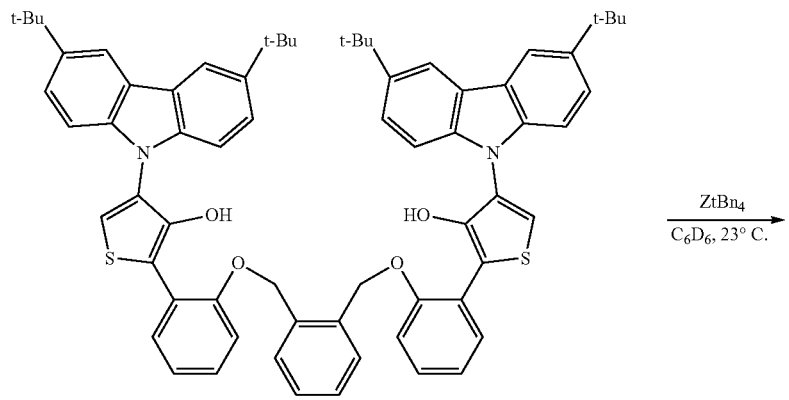

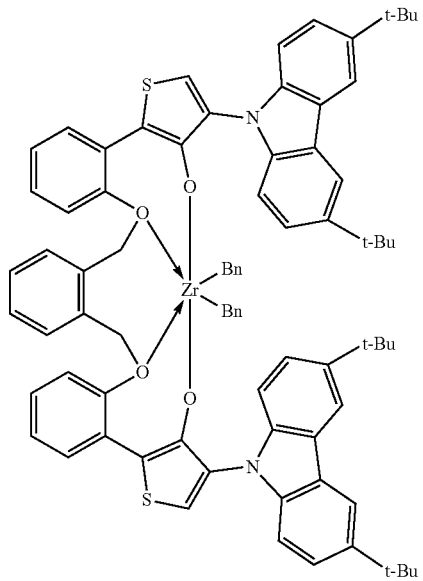

The thiophene ligand was azeotropically dried using PhMe (4×10 mL) prior to use. To a clear colorless solution of the thiophene (13.0 mg, 12.48 μmol, 1.00 eq) in anhydrous $C_6D_6$ (2.24 mL) in a nitrogen filled glovebox at 23° C. was added a solution of $ZrBn_4$ (6.3 mg, 13.73 μmol, 1.10 eq) in $C_6D_6$ (0.26 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (400 MHz, Benzene-$d_6$) δ 8.49 (d, J=1.9 Hz, 2H), 8.22 (d, J=1.9 Hz, 2H), 7.53 (dd, J=8.6, 1.9 Hz, 2H), 7.44 (dd, J=8.7, 1.9 Hz, 2H), 7.36 (d, J=8.5 Hz, 2H), 7.24 (d, J=8.7 Hz, 2H), 7.17 (dd, J=7.7, 1.7 Hz, 2H), 6.98-6.94 (m, 4H), 6.79 (td, J=7.7, 1.8 Hz, 2H), 6.75 (s, 2H), 6.66 (ddd, J=10.5, 6.6, 2.2 Hz, 2H), 6.58 (t, J=7.1 Hz, 2H), 6.29 (dd, J=5.5, 3.4 Hz, 2H), 6.25-6.20 (m, 2H), 5.40 (d, J=13.0 Hz, 2H), 5.35 (dd, J=8.4, 1.1 Hz, 2H), 4.18 (d, J=13.0 Hz, 2H), 1.53 (s, 18H), 1.27 (s, 18H), 0.94 (d, J=12.0 Hz, 2H), 0.46 (d, J=12.0 Hz, 2H). $^{13}$C NMR (101 MHz, Benzene-$d_6$) δ 155.22, 151.79, 145.67, 142.96, 142.78, 139.33, 139.29, 133.07, 131.03, 129.54, 128.17, 127.00, 125.46, 125.05, 124.45, 122.85, 122.43, 121.17, 117.52, 117.10, 116.33, 115.63, 112.32, 109.12, 79.48, 73.48, 34.62, 34.39, 32.04, 31.72.

Example 14: Synthesis of Procatalyst 2

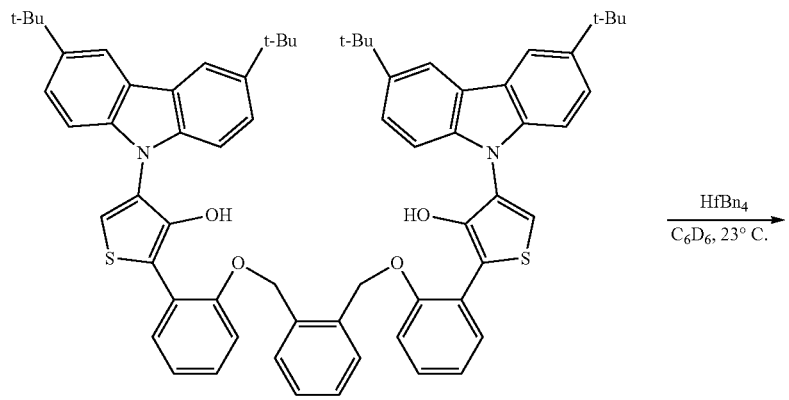

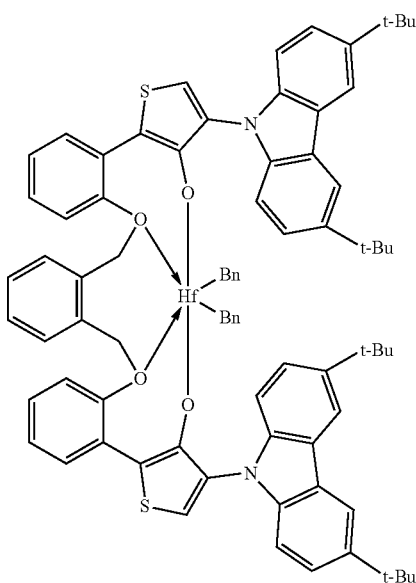

The thiophene ligand was azeotropically dried using PhMe (4×10 mL) prior to use. To a clear colorless solution of the thiophene (15.8 mg, 15.17 μmol, 1.00 eq) in anhydrous $C_6D_6$ (2.66 mL) in a nitrogen filled glovebox at 23° C. was added a solution of $HfBn_4$ (9.1 mg, 16.69 μmol, 1.10 eq) in $C_6D_6$ (0.37 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.52 (dd, J=2.0, 0.6 Hz, 2H), 8.24 (dd, J=2.0, 0.6 Hz, 2H), 7.53 (dd, J=8.5, 1.9 Hz, 2H), 7.44 (dd, J=8.7, 1.9 Hz, 2H), 7.36 (dd, J=8.5, 0.6 Hz, 2H), 7.18 (dd, J=7.7, 1.7 Hz, 2H), 7.16 (dd, J=8.7, 0.6 Hz, 2H), 6.99-6.95 (m, 4H), 6.82 (ddd, J=8.2, 7.4, 1.7 Hz, 2H), 6.76 (s, 2H), 6.68 (dd, J=7.6, 1.1 Hz, 2H), 6.64 (dd, J=5.6, 3.3 Hz, 2H), 6.29-6.23 (m, 4H), 5.37 (d, J=13.1 Hz, 2H), 5.35 (dd, J=8.3, 1.2 Hz, 2H), 4.17 (d, J=13.2 Hz, 2H), 1.54 (s, 18H), 1.29 (s, 18H), 0.90 (d, J=13.2 Hz, 2H), 0.21 (d, J=13.2 Hz, 2H). $^{13}$C NMR (126 MHz, Benzene-$d_6$) δ 154.89, 151.88, 146.91, 143.06, 142.81, 139.32, 139.30, 132.85, 131.02, 129.53, 129.21, 128.24, 128.18, 127.20, 127.17, 126.97, 125.88, 125.21, 124.54, 122.81, 122.35, 121.90, 121.04, 117.18, 117.02, 116.31, 115.53, 112.45, 109.11, 80.12, 78.51, 34.63, 34.41, 32.05, 31.73.

Example 15: Synthesis of Ligand 4

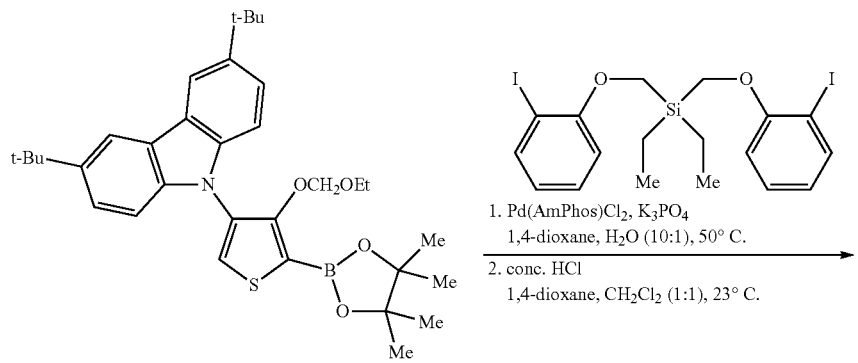

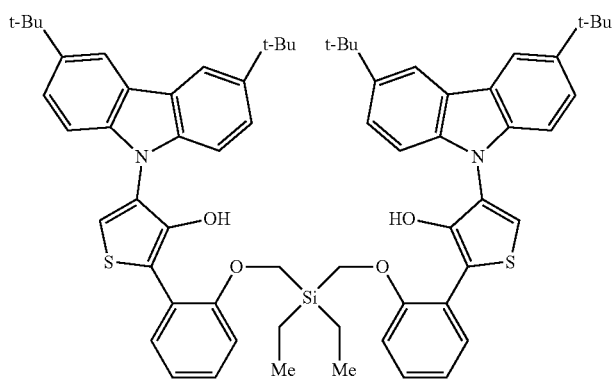

A mixture of the thiophene boropinacolate ester (1.931 g, 2.476 mmol, 3.00 eq, 72% pure by NMR), K$_3$PO$_4$ (1.577 g, 7.428 mmol, 9.00 eq), Pd(AmPhos)Cl$_2$ (117.0 mg, 0.1650 mmol, 0.20 eq), and the bisphenyliodide (0.456 g, 0.8252 mmol, 1.00 eq). The mixture was evacuated, then back-filled with nitrogen, this process was repeated 3× more, then deoxygenated 1,4-dioxane (15.0 mL) and deoxygenated water (1.5 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-50% CH$_2$Cl$_2$ in hexanes to afford the bisthiophene as a red amorphous oil (0.822 g, 0.7040 mmol, 85%). NMR indicated pure product.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a light tan solid (0.541 g, 0.5145 mmol, 73%, 62% two steps). NMR indicated pure product.

$^1$H NMR (500 MHz, Chloroform-d) δ 8.18 (d, J=1.9 Hz, 4H), 7.51 (dd, J=7.5, 1.9 Hz, 2H), 7.45 (dd, J=8.6, 1.9 Hz, 4H), 7.37 (s, 2H), 7.23 (d, J=8.6 Hz, 4H), 7.04 (dtd, J=20.2, 7.5, 1.6 Hz, 4H), 6.78 (s, 2H), 6.69 (dd, J=8.1, 1.4 Hz, 2H), 3.88 (s, 4H), 1.50 (s, 36H), 0.85 (t, J=7.9 Hz, 6H), 0.67 (q, J=7.9 Hz, 4H). $^{13}$C NMR (126 MHz, Chloroform-d) δ 156.35, 146.38, 142.68, 139.95, 130.38, 129.03, 127.25, 123.52, 123.23, 122.36, 122.20, 120.34, 116.12, 115.34, 113.40, 109.62, 59.41, 34.75, 32.10, 6.95, 1.15.

Example 16: Synthesis of Procatalyst 7

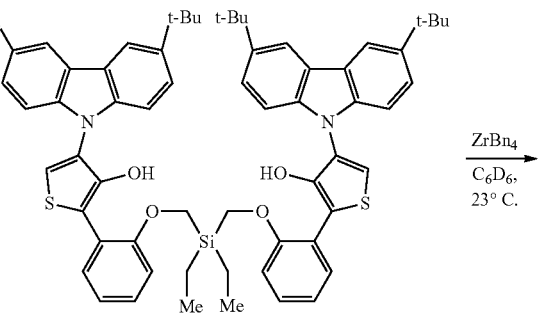

53

-continued

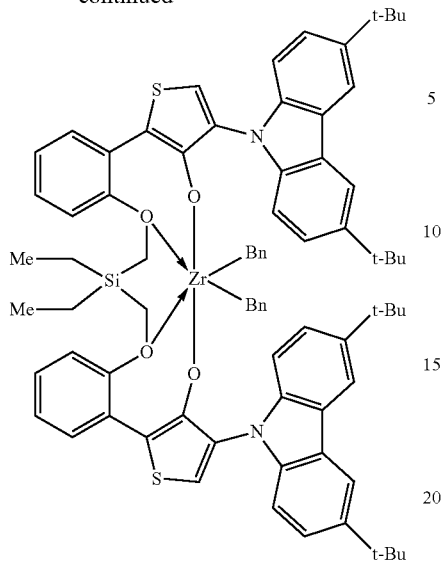

The thiophene ligand was azeotropically dried using PhMe (4×10 mL) prior to use. To a clear colorless solution of the thiophene (16.5 mg, 15.69 μmol, 1.00 eq) in anhydrous $C_6D_6$ (2.82 mL) in a nitrogen filled glovebox at 23° C. was added a solution of ZrBn$_4$ (7.9 mg, 17.26 μmol, 1.10 eq) in $C_6D_6$ (0.32 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-d$_6$) δ 8.51 (dd, J=1.9, 0.6 Hz, 2H), 8.25 (dd, J=1.9, 0.6 Hz, 2H), 7.54-7.49 (m, 4H), 7.37 (dd, J=8.5, 0.6 Hz, 2H), 7.31 (dd, J=8.7, 0.6 Hz, 2H), 7.26 (dd, J=7.8, 1.7 Hz, 2H), 6.98-6.96 (m, 4H), 6.89 (s, 2H), 6.84-6.78 (m, 2H), 6.69 (td, J=7.6, 1.2 Hz, 2H), 6.64-6.52 (m, 2H), 6.30-6.26 (m, 4H), 5.40 (dd, J=8.2, 1.1 Hz, 2H), 4.23 (d, J=14.8 Hz, 2H), 3.15 (d, J=14.8 Hz, 2H), 1.48 (s, 18H), 1.27 (s, 18H), 1.15 (d, J=12.5 Hz, 2H), 0.87 (t, J=7.9 Hz, 2H), 0.52 (d, J=12.5 Hz, 2H), 0.36 (t, J=8.0 Hz, 6H), 0.01--0.10 (m, 1H), −0.24 (dq, J=14.9, 8.0 Hz, 1H). $^{13}$C NMR (126 MHz, Benzene-d$_6$) δ 158.69, 152.42, 147.10, 143.14, 142.73, 140.21, 139.56, 139.39, 130.37, 129.00, 128.32, 128.17, 126.35, 125.98, 125.45, 125.19, 124.64, 122.76, 122.43, 120.81, 117.66, 117.18, 116.33, 115.52, 112.52, 108.88, 75.73, 71.46, 34.59, 34.41, 31.99, 31.71, 6.60, 0.73.

Example 17: Synthesis of Procatalyst 8

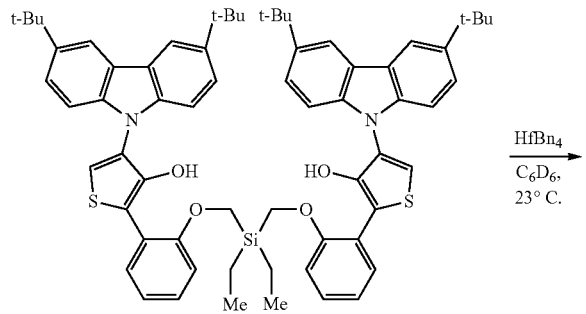

54

-continued

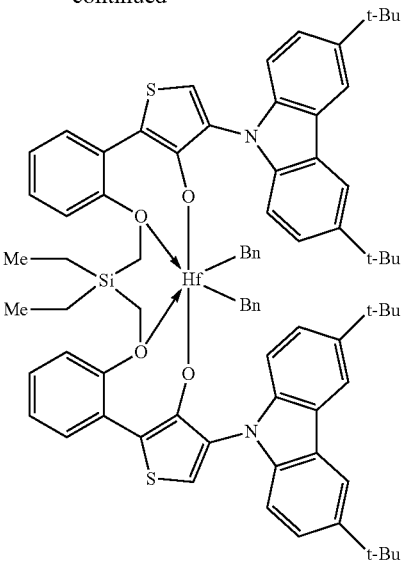

The thiophene ligand was azeotropically dried using PhMe (4×10 mL) prior to use. To a clear colorless solution of the thiophene (13.0 mg, 12.36 μmol, 1.00 eq) in anhydrous $C_6D_6$ (2.17 mL) in a nitrogen filled glovebox at 23° C. was added a solution of HfBn$_4$ (7.4 mg, 13.60 μmol, 1.10 eq) in $C_6D_6$ (0.30 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-d$_6$) δ 8.52 (dd, J=2.0, 0.6 Hz, 2H), 8.26 (dd, J=1.9, 0.6 Hz, 2H), 7.51 (ddd, J=8.7, 1.9, 1.3 Hz, 4H), 7.35 (dd, J=8.5, 0.6 Hz, 2H), 7.26 (dd, J=7.8, 1.7 Hz, 2H), 7.23 (dd, J=8.7, 0.6 Hz, 2H), 6.98-6.95 (m, 4H), 6.89 (s, 2H), 6.84 (ddd, J=8.2, 7.4, 1.8 Hz, 2H), 6.79-6.73 (m, 2H), 6.70 (td, J=7.6, 1.1 Hz, 2H), 6.31-6.26 (m, 4H), 5.42 (dd, J=8.2, 1.2 Hz, 2H), 4.28 (d, J=14.9 Hz, 2H), 3.16 (d, J=14.9 Hz, 2H), 1.48 (s, 18H), 1.28 (s, 18H), 0.98 (d, J=13.4 Hz, 2H), 0.35 (t, J=8.0 Hz, 6H), 0.26-0.21 (m, 2H), −0.06 (dq, J=15.9, 8.0 Hz, 2H), −0.27 (dq, J=15.0, 8.0 Hz, 2H). $^{13}$C NMR (126 MHz, Benzene-d$_6$) δ 158.36, 152.51, 147.68, 143.20, 142.73, 139.56, 139.36, 130.37, 129.54, 128.73, 127.07, 126.75, 126.16, 125.70, 125.26, 124.68, 122.72, 122.37, 121.72, 120.87, 117.78, 116.49, 116.32, 115.45, 112.55, 108.84, 78.79, 71.96, 34.59, 34.41, 32.00, 31.71, 6.55, 0.77.

Example 18: Synthesis of Ligand 3

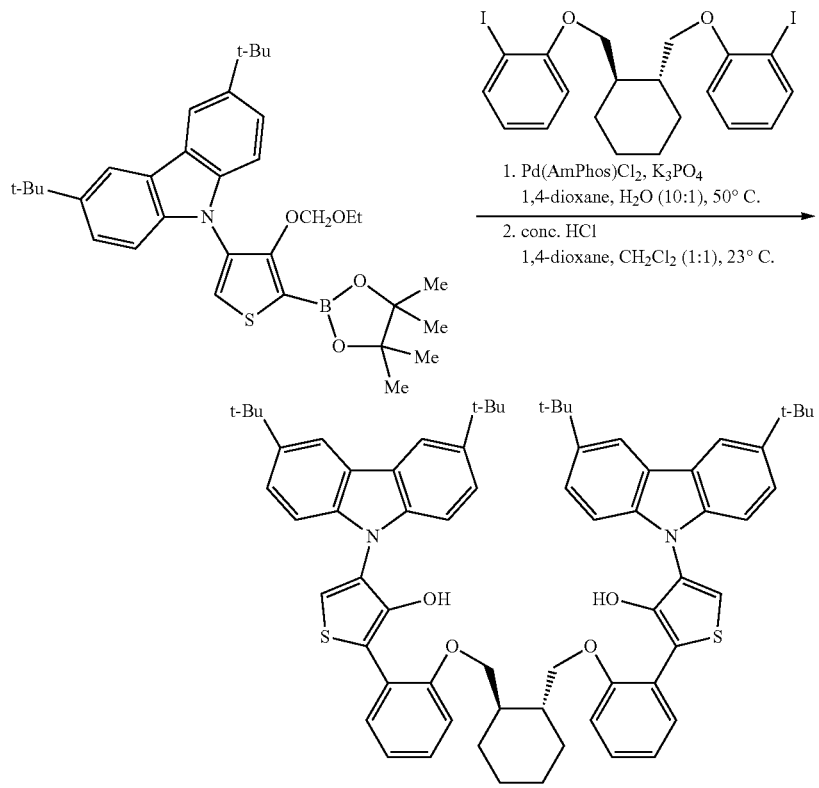

A mixture of the thiophene boropinacolate ester (1.352 g, 1.806 mmol, 3.00 eq, 72% pure by NMR), $K_3PO_4$ (1.150 g, 5.418 mmol, 9.00 eq), Pd(AmPhos)Cl$_2$ (85.0 mg, 0.1204 mmol, 0.20 eq), and the bisphenyliodide (0.330 g, 0.6020 mmol, 1.00 eq). The mixture was evacuated, then back-filled with nitrogen, this process was repeated 3× more, then deoxygenated 1,4-dioxane (15.0 mL) and deoxygenated water (1.5 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.550 g, 0.4727 mmol, 79%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a pale yellow foam (0.368 g, 0.3513 mmol, 74%, 59% two steps). NMR indicated pure product.

$^1$H NMR (400 MHz, Chloroform-d) δ 8.10 (d, J=1.9 Hz, 4H), 7.59 (dd, J=7.7, 1.7 Hz, 2H), 7.43-7.35 (m, 6H), 7.28-7.21 (m, 2H), 7.16 (d, J=8.6 Hz, 4H), 7.13-7.06 (m, 4H), 6.82 (dd, J=8.3, 1.1 Hz, 2H), 4.11 (dd, J=9.8, 3.3 Hz, 2H), 3.93 (dd, J=9.9, 4.3 Hz, 2H), 1.83-1.77 (m, 2H), 1.72-1.65 (m, 2H), 1.63-1.54 (m, 2H), 1.43 (s, 36H), 1.15-1.00 (m, 4H). $^{13}$C NMR (101 MHz, Chloroform-d) δ 153.90, 146.54, 142.61, 139.83, 130.67, 128.93, 127.60, 123.51, 123.12, 122.70, 122.60, 120.56, 116.14, 115.34, 113.45, 109.42, 73.64, 40.37, 34.68, 32.01, 29.91, 25.43.

Example 19: Synthesis of Procatalyst 5

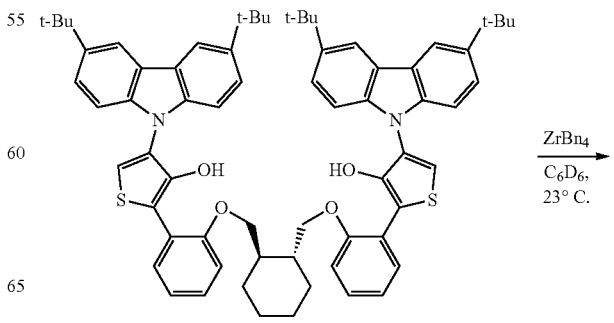

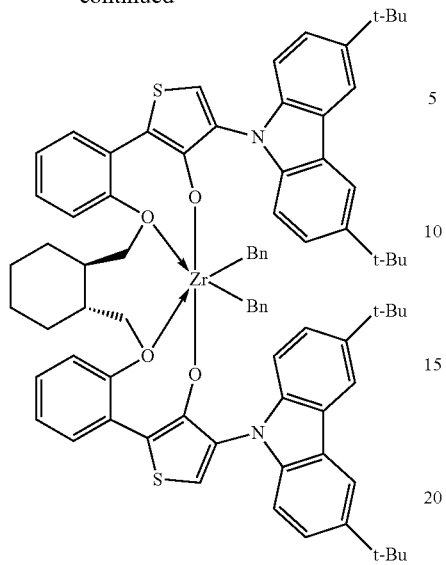

The thiophene ligand was azeotropically dried using PhMe (4×10 mL) prior to use. To a clear colorless solution of the thiophene (9.0 mg, 8.59 µmol, 1.00 eq) in anhydrous $C_6D_6$ (1.55 mL) in a nitrogen filled glovebox at 23° C. was added a solution of $ZrBn_4$ (4.3 mg, 9.45 µmol, 1.10 eq) in $C_6D_6$ (0.17 mL) in a dropwise manner. After stirring (500 rpm) for 30 mins the pale golden yellow solution was filtered using a 0.20 µm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.49 (dd, J=2.0, 0.6 Hz, 2H), 8.24 (dd, J=1.9, 0.6 Hz, 2H), 7.54-7.50 (m, 2H), 7.48 (dd, J=8.6, 2.0 Hz, 2H), 7.31 (ddd, J=8.7, 2.0, 0.6 Hz, 2H), 7.28 (d, J=1.8 Hz, 2H), 6.98-6.96 (m, 4H), 6.89 (s, 2H), 6.81 (tt, J=7.4, 1.2 Hz, 2H), 6.77 (ddd, J=8.2, 7.4, 1.8 Hz, 2H), 6.67 (td, J=7.6, 1.1 Hz, 2H), 6.63-6.59 (m, 2H), 6.26-6.22 (m, 4H), 5.18 (dd, J=8.3, 1.1 Hz, 2H), 4.17 (dd, J=12.6, 8.3 Hz, 2H), 3.20 (d, J=12.6 Hz, 2H), 1.51 (s, 18H), 1.42-1.35 (m, 2H) 1.30 (s, 18H), 1.13-1.06 (m, 4H), 0.76-0.69 (m, 2H), 0.65-0.58 (m, 2H), 0.54 (d, J=12.4 Hz, 2H), 0.52-0.44 (m, 2H). $^{13}$C NMR (126 MHz, Benzene-$d_6$) δ 156.40, 152.24, 147.22, 143.15, 142.86, 139.15, 138.97, 131.05, 129.79, 128.30, 128.17, 127.36, 126.40, 125.92, 125.23, 124.64, 123.12, 122.71, 122.38, 120.71, 116.84, 116.72, 116.23, 115.50, 112.72, 109.26, 86.21, 75.13, 42.35, 34.59, 34.43, 32.00, 31.80, 31.72, 29.67, 25.35.

Example 20: Synthesis of Procatalyst 6

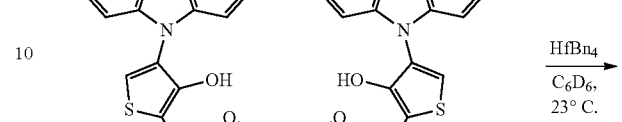

The thiophene ligand was azeotropically dried using PhMe (4×10 mL) prior to use. To a clear colorless solution of the thiophene (9.3 mg, 8.88 µmol, 1.00 eq) in anhydrous $C_6D_6$ (1.56 mL) in a nitrogen filled glovebox at 23° C. was added a solution of $HfBn_4$ (5.3 mg, 9.77 µmol, 1.10 eq) in $C_6D_6$ (0.22 mL) in a dropwise manner. After stirring (500 rpm) for 30 mins the pale golden yellow solution was filtered using a 0.20 µm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.50 (dd, J=2.0, 0.6 Hz, 2H), 8.25 (dd, J=2.0, 0.6 Hz, 2H), 7.48 (ddd, J=15.6, 8.6, 1.9 Hz, 4H), 7.29 (dd, J=8.5, 0.6 Hz, 2H), 7.26 (dd, J=7.7, 1.8 Hz, 2H), 7.22 (dd, J=8.7, 0.6 Hz, 2H), 6.99-6.96 (m, 4H), 6.89 (s, 2H), 6.81-6.76 (m, 4H), 6.68 (td, J=7.6, 1.1 Hz, 2H), 6.25-6.18 (m, 4H), 5.21 (dd, J=8.3, 1.1 Hz, 2H), 4.21 (dd, J=12.6, 8.4 Hz, 2H), 3.22 (d, J=12.7 Hz, 2H), 1.51 (s, 18H), 1.30 (s, 18H), 1.14-1.04 (m, 4H), 0.91 (d, J=13.4 Hz, 2H), 0.74 (t, J=8.5 Hz, 2H), 0.59 (d, J=12.7 Hz, 2H), 0.46 (t, J=10.0 Hz, 2H), 0.25 (d, J=13.3 Hz, 2H). $^{13}$C NMR (126 MHz, Benzene-$d_6$) δ 155.98, 152.30, 147.83, 143.20, 142.86, 139.16, 138.96, 131.06, 129.76, 128.67, 128.57, 128.18, 127.07, 126.75, 126.12, 124.66, 123.30, 122.68, 122.32, 120.76, 116.87, 116.25, 116.21, 115.44, 112.73, 109.23, 86.74, 78.29, 42.23, 34.60, 34.43, 32.01, 31.73, 29.56, 25.30.

Example 21: Synthesis of Ligand 5

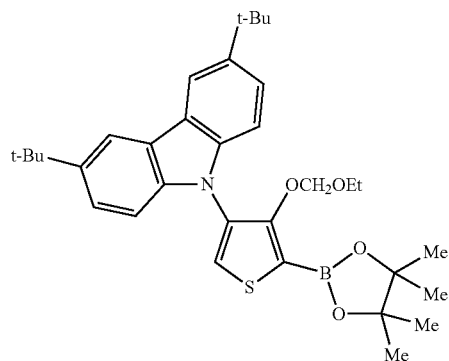
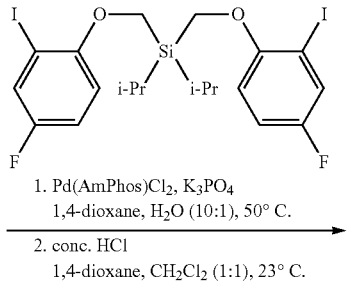
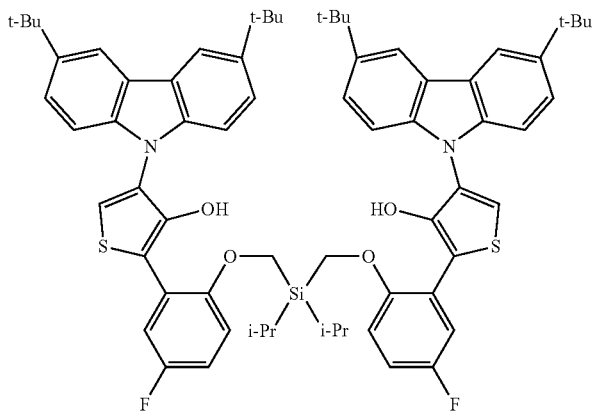

A mixture of the thiophene boropinacolate ester (1.644 g, 2.108 mmol, 3.00 eq, 72% pure by NMR), K$_3$PO$_4$ (1.342 g, 6.323 mmol, 9.00 eq), Pd(AmPhos)Cl$_2$ (99.0 mg, 0.1405 mmol, 0.20 eq), and the bisphenyliodide (0.433 g, 0.7026 mmol, 1.00 eq). The mixture was evacuated, then back-filled with nitrogen, this process was repeated 3× more, then deoxygenated 1,4-dioxane (15.0 mL) and deoxygenated water (1.5 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-55% CH$_2$Cl$_2$ in hexanes to afford the bisthiophene as a red amorphous oil (0.452 g, 0.3670 mmol, 52%). NMR indicated pure product.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a clear amorphous foam (0.280 g, 0.2510 mmol, 68%, 36% two steps). NMR indicated pure product.

$^1$H NMR (400 MHz, Chloroform-d) δ 8.18-8.12 (m, 4H), 7.41 (dd, J=8.6, 1.9 Hz, 4H), 7.33 (s, 2H), 7.14 (dd, J=8.5, 0.6 Hz, 4H), 7.07 (dd, J=9.2, 3.1 Hz, 2H), 6.55-6.45 (m, 4H), 6.21 (dd, J=9.2, 4.6 Hz, 2H), 3.72 (s, 4H), 1.46 (s, 36H), 1.08-0.95 (m, 2H), 0.88 (d, J=7.3 Hz, 12H). $^{19}$F NMR (376 MHz, Chloroform-d) δ -121.90 (td, J=8.5, 4.7 Hz). $^{13}$C NMR (101 MHz, Chloroform-d) δ 157.34 (d, J=240.5 Hz), 152.56 (d, J=2.2 Hz), 146.63, 142.86, 139.79, 127.10, 123.54, 123.20, 122.96 (d, J=8.5 Hz), 120.74, 116.56 (d, J=24.4 Hz), 116.07, 115.07 (d, J=23.2 Hz), 114.22 (d, J=1.9 Hz), 114.08 (d, J=8.8 Hz), 109.53, 58.54, 34.72, 32.03, 17.90, 9.71.

Example 22: Synthesis of Procatalyst 9

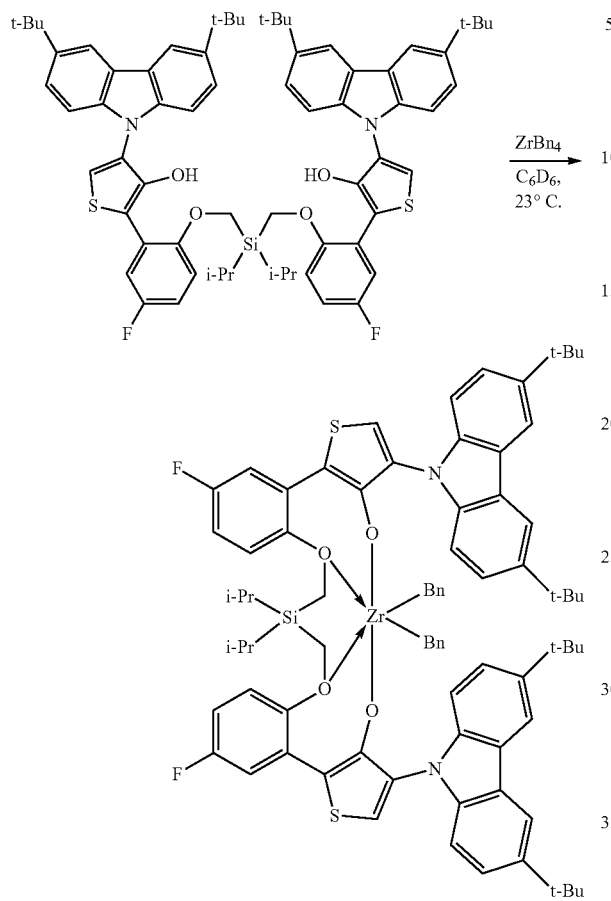

The thiophene ligand was azeotropically dried using PhMe (4×10 mL) prior to use. To a clear colorless solution of the thiophene (9.2 mg, 8.25 μmol, 1.00 eq) in anhydrous $C_6D_6$ (2.97 mL) in a nitrogen filled glovebox at 23° C. was added a solution of $ZrBn_4$ (4.1 mg, 9.07 μmol, 1.10 eq) in $C_6D_6$ (0.33 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.45 (dd, J=1.9, 0.6 Hz, 2H), 8.30 (dd, J=1.9, 0.6 Hz, 2H), 7.55 (dd, J=8.7, 1.9 Hz, 2H), 7.50 (dd, J=8.5, 1.9 Hz, 2H), 7.40 (dd, J=8.7, 0.7 Hz, 2H), 7.33 (dd, J=8.5, 0.6 Hz, 2H), 7.06-7.02 (m, 2H), 6.99-6.92 (m, 4H), 6.84 (s, 2H), 6.80-6.74 (m, 2H), 6.62 (ddd, J=9.0, 7.3, 3.1 Hz, 2H), 6.37-6.34 (m, 4H), 5.37 (dd, J=9.0, 4.8 Hz, 2H), 4.17 (d, J=14.7 Hz, 2H), 3.15 (d, J=14.8 Hz, 2H), 1.40 (s, 18H), 1.28 (s, 18H), 1.12 (d, J=12.5 Hz, 2H), 0.58 (d, J=12.5 Hz, 2H), 0.52 (d, J=7.1 Hz, 6H), 0.42 (d, J=6.5 Hz, 6H), 0.37 (tt, J=8.0, 6.0 Hz, 2H). $^{19}$F NMR (470 MHz, Benzene-$d_6$) δ −115.88 (td, J=7.8, 4.5 Hz). $^{13}$C NMR (126 MHz, Benzene-$d_6$) δ 159.41 (d, J=245.7 Hz), 154.25, 154.23, 152.87, 146.47, 143.27 (d, J=52.4 Hz), 139.70 (d, J=31.6 Hz), 130.56, 128.33, 128.16, 126.41, 125.21, 124.60, 124.12, 122.82, 122.52, 122.29 (d, J=9.1 Hz), 121.24, 119.11, 116.65, 116.35, 116.19 (d, J=13.2 Hz), 116.00 (d, J=13.5 Hz), 115.64, 112.22, 108.99, 75.76, 70.55, 34.54, 34.45, 31.89, 31.69, 17.55, 17.51, 9.44.

Example 23: Synthesis of Procatalyst 10

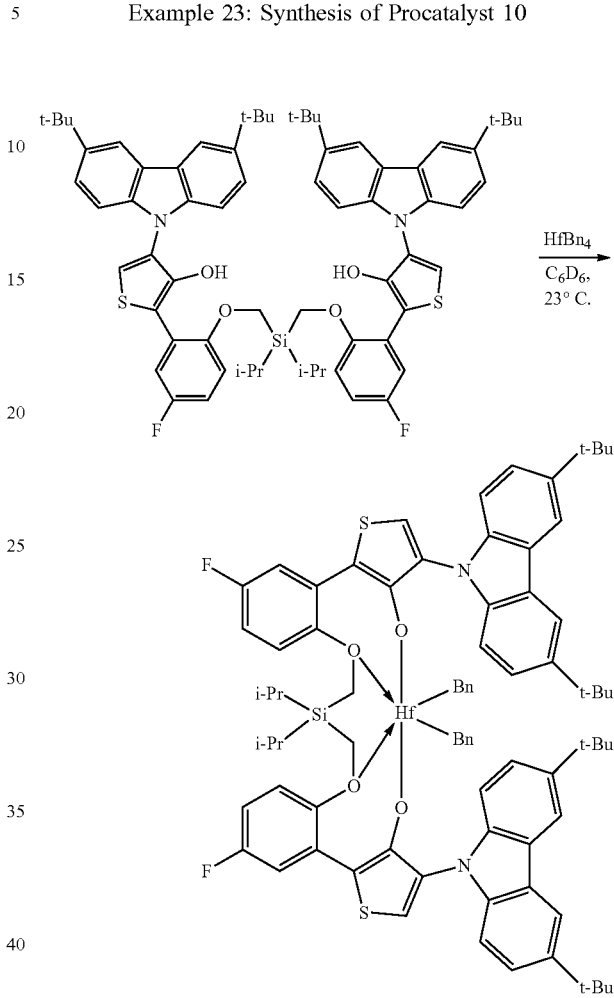

The thiophene ligand was azeotropically dried using PhMe (4×10 mL) prior to use. To a clear colorless solution of the thiophene (8.9 mg, 7.98 μmol, 1.00 eq) in anhydrous $C_6D_6$ (2.81 mL) in a nitrogen filled glovebox at 23° C. was added a solution of $HfBn_4$ (4.8 mg, 8.78 μmol, 1.10 eq) in $C_6D_6$ (0.39 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.46 (dd, J=1.9, 0.6 Hz, 2H), 8.31 (dd, J=1.9, 0.6 Hz, 2H), 7.54 (dd, J=8.7, 1.9 Hz, 2H), 7.49 (dd, J=8.5, 1.9 Hz, 2H), 7.32 (ddd, J=10.9, 8.6, 0.6 Hz, 4H), 6.99-6.89 (m, 6H), 6.84 (s, 2H), 6.78-6.71 (m, 2H), 6.65 (ddd, J=9.0, 7.3, 3.1 Hz, 2H), 6.40-6.35 (m, 4H), 5.39 (dd, J=9.0, 4.7 Hz, 2H), 4.20 (d, J=14.8 Hz, 2H), 3.15 (d, J=14.8 Hz, 2H), 1.40 (s, 18H), 1.28 (s, 18H), 1.01 (d, J=13.6 Hz, 2H), 0.50 (d, J=7.1 Hz, 6H), 0.40 (d, J=7.1 Hz, 6H), 0.39-0.30 (m, 2H), 0.27 (d, J=13.6 Hz, 2H). $^{19}$F NMR (470 MHz, Benzene-$d_6$) δ −115.48 (td, J=8.1, 4.8 Hz). $^{13}$C NMR (126 MHz, Benzene-$d_6$) δ 159.61 (d, J=246.2 Hz), 153.86 (d, J=2.7 Hz), 152.98, 147.22, 143.32 (d, J=61.0 Hz), 139.69 (d, J=36.3 Hz), 138.52, 129.89, 128.61, 127.17, 126.71, 124.65, 124.35, 122.78, 122.71 (d, J=8.9 Hz), 122.46, 121.25, 119.23, 116.32, 116.17 (d, J=10.2 Hz), 115.98 (d, J=9.8 Hz), 115.95, 115.55, 112.30, 108.98, 83.00, 71.02, 34.54, 34.45, 31.89, 31.69, 17.49, 17.45, 9.50.

Example 24: Synthesis of Ligand 6 the impure bisthiophene as a pale yellow foam (0.220 g). NMR indicated product which contained impurities. The impure material was used in the subsequent reaction.

To a solution of the impure coupled product in $CH_2Cl_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and $CH_2Cl_2$ (10 mL), poured into separatory funnel, partitioned,

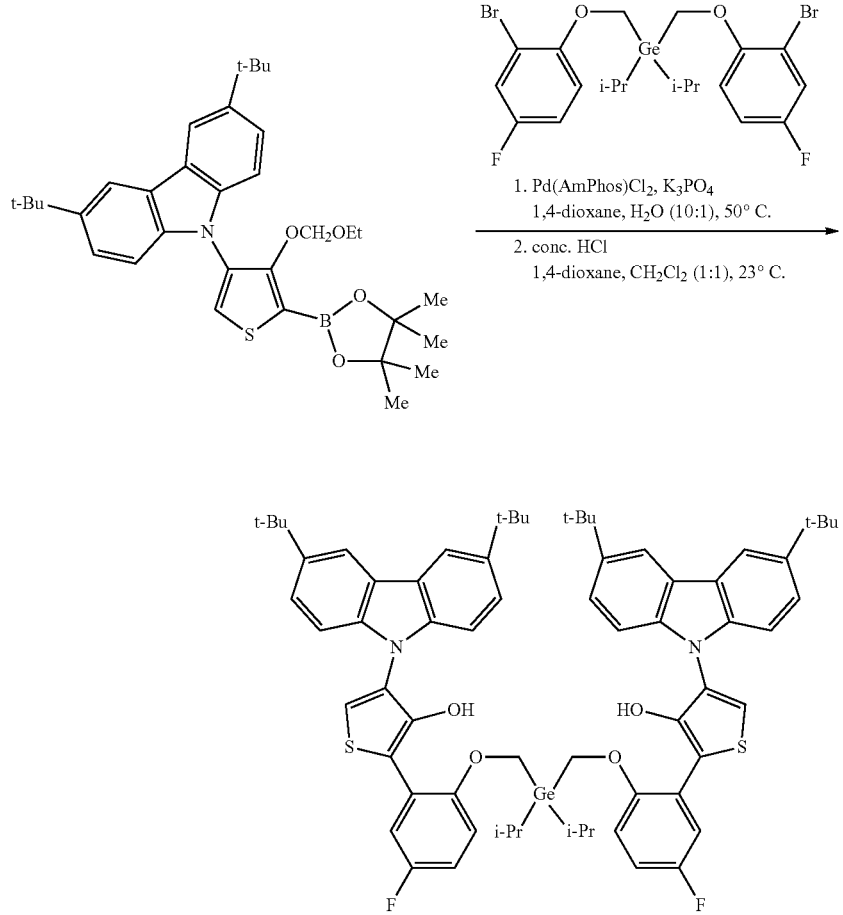

A mixture of the thiophene boropinacolate ester (1.602 g, 2.077 mmol, 4.00 eq, 72% pure by NMR), $K_3PO_4$ (1.323 g, 6.230 mmol, 12.0 eq), Pd(AmPhos)Cl$_2$ (74.0 mg, 0.1038 mmol, 0.20 eq), and the bisphenyliodide (0.294 g, 0.5192 mmol, 1.00 eq). The mixture was evacuated, then back-filled with nitrogen, this process was repeated 3× more, then deoxygenated 1,4-dioxane (10.0 mL) and deoxygenated water (1.0 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-55% $CH_2Cl_2$ in hexanes to afford organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a clear amorphous foam (0.100 g, 0.08617 mmol, 17% two steps). NMR indicated pure product.

$^1$H NMR (500 MHz, Chloroform-d) δ 8.16 (dd, J=1.9, 0.6 Hz, 4H), 7.42 (dd, J=8.6, 1.9 Hz, 4H), 7.35 (s, 2H), 7.17 (dd, J=8.6, 0.7 Hz, 4H), 7.12 (dd, J=9.2, 3.1 Hz, 2H), 6.71 (s, 2H), 6.56 (ddd, J=9.0, 7.7, 3.1 Hz, 2H), 6.34 (dd, J=9.2, 4.6 Hz, 2H), 3.94 (s, 4H), 1.47 (s, 36H), 1.39-1.29 (m, 2H), 0.94 (d, J=7.5 Hz, 12H). $^{19}$F NMR (470 MHz, Chloroform-d) δ −121.59 (td, J=8.4, 4.6 Hz). $^{13}$C NMR (126 MHz, Chloroform-d) δ 157.50 (d, J=240.5 Hz), 152.50, 146.74, 142.85, 139.78, 127.26, 123.55, 123.25 (d, J=9.3 Hz), 123.21, 120.73, 116.49 (d, J=24.6 Hz), 116.08, 115.02 (d, J=22.9 Hz), 114.50 (d, J=8.9 Hz), 114.22 (m), 109.59, 60.00, 34.73, 32.04, 19.34, 13.91.

Example 25: Synthesis of Procatalyst 11

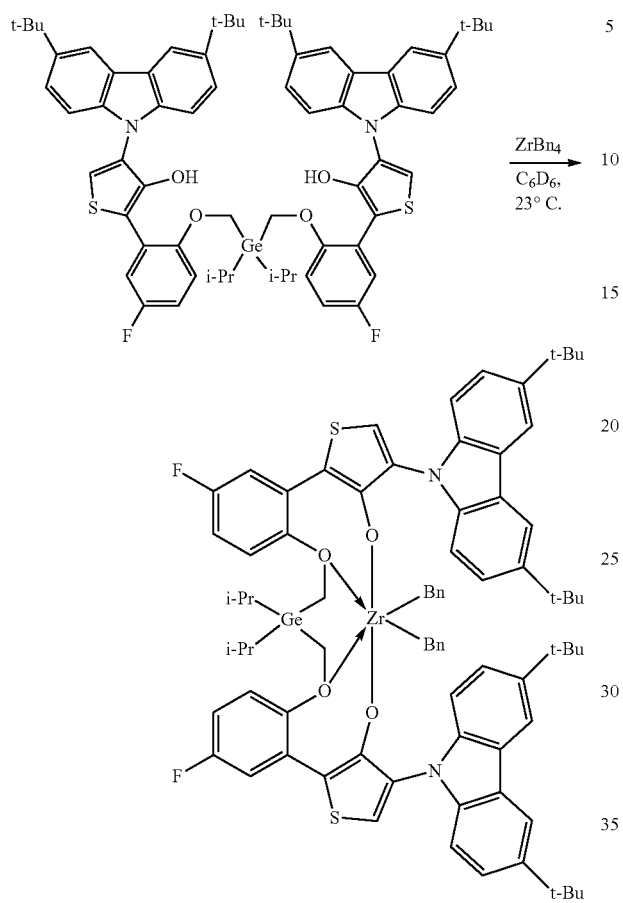

The thiophene ligand was azeotropically dried using PhMe (4×10 mL) prior to use. To a clear colorless solution of the thiophene (5.0 mg, 4.31 μmol, 1.00 eq) in anhydrous $C_6D_6$ (1.54 mL) in a nitrogen filled glovebox at 23° C. was added a solution of $ZrBn_4$ (2.2 mg, 4.74 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1H$ NMR (500 MHz, Benzene-$d_6$) δ 8.45 (dd, J=1.9, 0.6 Hz, 2H), 8.30 (dd, J=2.0, 0.6 Hz, 2H), 7.54 (dd, J=8.7, 1.9 Hz, 2H), 7.49 (dd, J=8.5, 1.9 Hz, 2H), 7.38 (dd, J=8.7, 0.6 Hz, 2H), 7.31 (dd, J=8.5, 0.6 Hz, 2H), 7.07-7.02 (m, 2H), 6.99-6.95 (m, 4H), 6.83 (s, 2H), 6.77 (tt, J=7.3, 1.2 Hz, 2H), 6.61 (ddd, J=9.0, 7.3, 3.2 Hz, 2H), 6.37-6.34 (m, 4H), 5.42 (dd, J=9.0, 4.7 Hz, 2H), 4.32 (d, J=13.0 Hz, 2H), 3.33 (d, J=13.0 Hz, 2H), 1.40 (s, 18H), 1.28 (s, 18H), 1.17 (d, J=12.5 Hz, 2H), 0.71 (dp, J=14.1, 6.9 Hz, 2H), 0.60 (d, J=7.2 Hz, 6H), 0.57 (d, J=12.5 Hz, 2H), 0.51 (d, J=7.3 Hz, 6H). $^{19}F$ NMR (470 MHz, Benzene-$d_6$) δ −115.87 (td, J=8.0, 4.8 Hz). $^{13}C$ NMR (126 MHz, Benzene-$d_6$) δ 159.44 (d, J=245.5 Hz), 154.21, 154.19, 152.80, 146.62, 143.27 (d, J=53.0 Hz), 139.67 (d, J=30.0 Hz), 130.56, 128.33, 128.16, 126.33, 125.24, 124.59, 122.81, 122.51, 121.20, 119.01, 116.58 (m), 116.35, 116.19 (d, J=17.8 Hz), 116.01 (d, J=16.9 Hz), 115.62, 112.27, 108.98, 76.05, 71.65, 34.53, 34.45, 31.89, 31.70, 19.18, 19.13, 13.59.

Example 26: Synthesis of Procatalyst 12

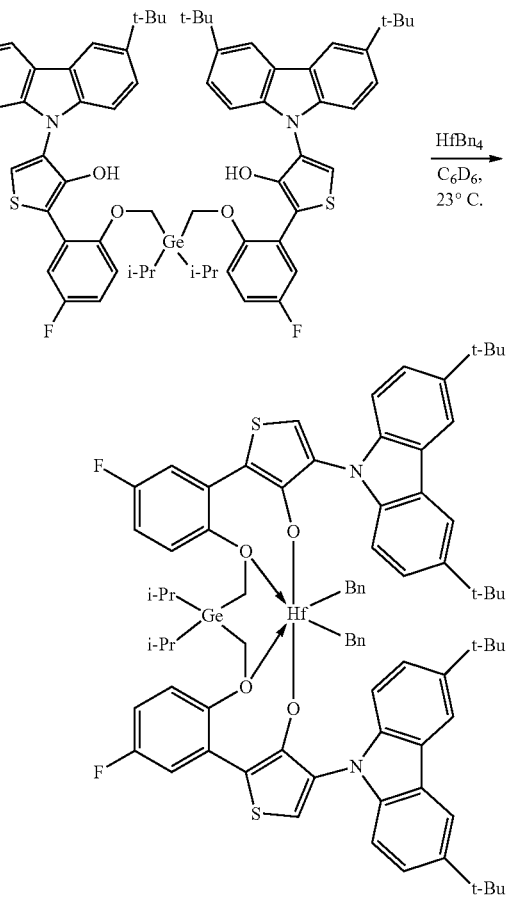

The thiophene ligand was azeotropically dried using PhMe (4×10 mL) prior to use. To a clear colorless solution of the thiophene (5.2 mg, 4.48 μmol, 1.00 eq) in anhydrous $C_6D_6$ (1.58 mL) in a nitrogen filled glovebox at 23° C. was added a solution of $HfBn_4$ (2.7 mg, 4.93 μmol, 1.10 eq) in $C_6D_6$ (0.22 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1H$ NMR (500 MHz, Benzene-$d_6$) δ 8.46 (dd, J=2.0, 0.6 Hz, 2H), 8.31 (dd, J=1.9, 0.6 Hz, 2H), 7.53 (dd, J=8.7, 1.9 Hz, 2H), 7.48 (dd, J=8.5, 1.9 Hz, 2H), 7.30 (ddd, J=11.7, 8.6, 0.6 Hz, 4H), 6.99-6.94 (m, 4H), 6.82 (s, 2H), 6.78-6.73 (m, 2H), 6.65 (ddd, J=9.0, 7.2, 3.1 Hz, 2H), 6.52-6.48 (m, 2H), 6.40-6.35 (m, 4H), 5.44 (dd, J=9.0, 4.8 Hz, 2H), 4.36 (d, J=13.0 Hz, 2H), 3.33 (d, J=13.1 Hz, 2H), 1.40 (s, 18H), 1.28 (s, 18H), 1.03 (d, J=13.5 Hz, 2H), 0.68 (dq, J=14.1, 7.2 Hz, 2H), 0.58 (d, J=7.3 Hz, 6H), 0.49 (d, J=7.3 Hz, 6H), 0.28 (d, J=13.7 Hz, 2H). $^{19}F$ NMR (470 MHz, Benzene-$d_6$) δ −114.35−−117.32 (m). $^{13}C$ NMR (126 MHz, Benzene-$d_6$) δ

159.63 (d, J=246.1 Hz), 153.86 (d, J=2.5 Hz), 152.93, 147.26, 143.32 (d, J=61.1 Hz), 139.67 (d, J=33.6 Hz), 129.89, 128.58, 128.18, 127.17, 126.70, 125.31, 124.49 (d, J=34.8 Hz), 123.03 (d, J=9.2 Hz), 122.78, 122.45, 121.24, 119.15, 116.32, 116.16 (d, J=13.5 Hz), 115.98 (d, J=13.4 Hz), 115.90, 115.88, 115.53, 112.32, 108.97, 83.00, 72.10, 34.53, 34.45, 31.88, 31.70, 19.13, 19.07, 13.67.

Example 27: Synthesis of Ligand 7

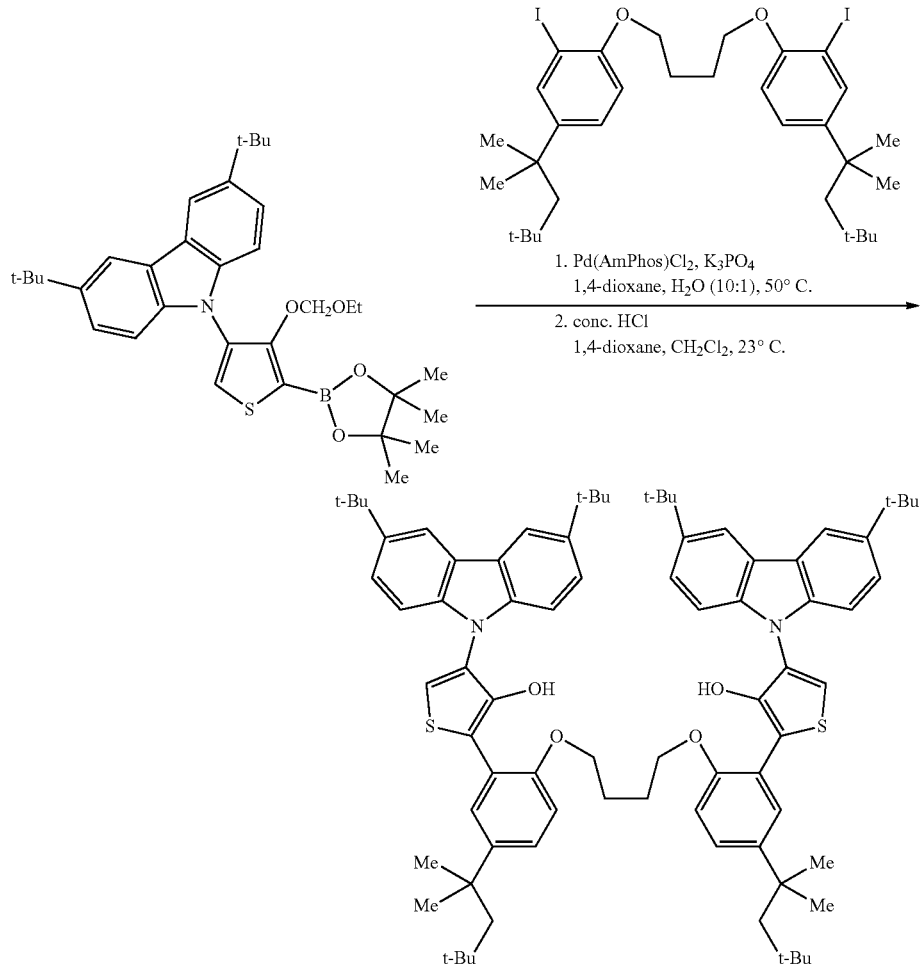

A mixture of the thiophene boropinacolate ester (0.605 g, 0.5387 mmol, 2.70 eq, 50% pure by NMR), $K_3PO_4$ (0.343 g, 1.616 mmol, 8.10 eq), Pd(AmPhos)Cl$_2$ (28.3 mg, 0.0399 mmol, 0.20 eq), and the bisphenyliodide (0.143 g, 0.2000 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as an off-white solid (0.168 g). NMR indicated product which contained minor impurities. The material was used in the subsequent deprotection without further purification.

To a solution of the impure coupled product in $CH_2Cl_2$-1,4-dioxane (8 mL, 1:1) under nitrogen at 23° C. was added conc. HCl (4 mL). The golden brown solution was stirred (500 rpm) for 20 hrs, diluted with 1N HCl (10 mL) and $CH_2Cl_2$ (10 mL), poured into separatory funnel, partitioned, organics were washed with 1N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-50% $CH_2Cl_2$ in hexanes to afford the bisthiophene as a light tan solid (80.0 mg, 0.0657 mmol, 33% two steps). NMR indicated pure product.

$^1$H NMR (400 MHz, Chloroform-d) δ 8.11 (d, J=1.9 Hz, 4H), 7.57 (d, J=2.3 Hz, 2H), 7.47 (s, 2H), 7.41 (dd, J=8.7, 1.9 Hz, 4H), 7.31 (s, 2H), 7.27-7.20 (m, 4H), 6.78 (d, J=8.6 Hz, 2H), 4.07-3.97 (m, 4H), 1.93-1.85 (m, 4H), 1.77 (s, 4H), 1.44 (s, 36H), 1.40 (s, 12H), 0.77 (s, 18H). $^{13}$C NMR (101 MHz, Chloroform-d) δ 151.42, 146.28, 144.75, 142.58, 139.67, 128.29, 127.66, 126.52, 123.39, 123.14, 121.99, 119.81, 116.16, 116.04, 113.38, 109.61, 69.95, 56.86, 38.19, 34.69, 32.41, 32.05, 31.91, 31.62, 25.90.

Example 28: Synthesis of Procatalyst 13

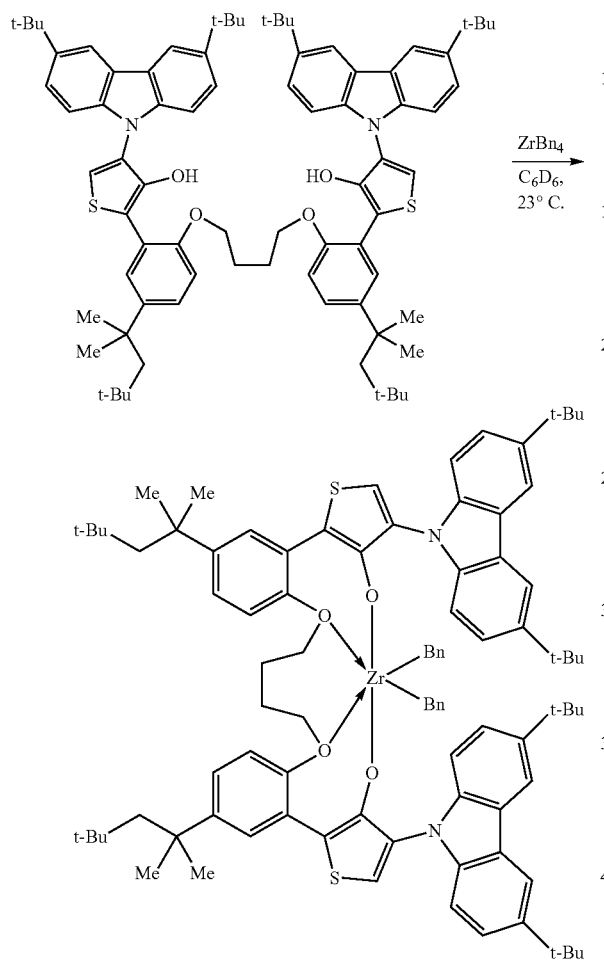

The thiophene ligand was azeotropically dried using PhMe (4×10 mL) prior to use. To a clear colorless solution of the thiophene (7.4 mg, 6.08 μmol, 1.00 eq) in anhydrous $C_6D_6$ (1.09 mL) in a nitrogen filled glovebox at 23° C. was added a solution of $ZrBn_4$ (3.0 mg, 6.69 μmol, 1.10 eq) in $C_6D_6$ (0.13 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.55 (d, J=1.9 Hz, 2H), 8.15-8.11 (m, 2H), 7.57 (d, J=2.5 Hz, 2H), 7.51 (dd, J=8.6, 1.9 Hz, 2H), 7.43 (dd, J=8.7, 1.9 Hz, 2H), 7.34 (d, J=8.4 Hz, 2H), 7.21 (dd, J=8.7, 0.6 Hz, 2H), 7.09-7.04 (m, 2H), 7.03-6.97 (m, 2H), 6.98-6.94 (m, 2H), 6.84 (s, 2H), 6.86-6.81 (m, 2H), 6.24-6.17 (m, 4H), 5.17 (d, J=8.7 Hz, 2H), 4.08-3.98 (m, 2H), 3.42-3.34 (m, 2H), 1.68 (d, J=14.6 Hz, 2H), 1.57 (s, 18H), 1.51 (d, J=14.6 Hz, 2H), 1.23 (s, 18H), 1.20 (s, 6H), 1.16 (s, 6H), 1.02 (d, J=12.3 Hz, 2H), 0.89 (q, J=11.9, 10.7 Hz, 2H), 0.70 (s, 18H), 0.64-0.56 (m, 2H), 0.52 (d, J=12.3 Hz, 2H). $^{13}$C NMR (101 MHz, Benzene-$d_6$) δ 153.93, 152.24, 148.83, 147.09, 142.92, 142.61, 139.23, 139.15, 130.55, 128.65, 128.35, 128.32, 126.79, 126.61, 124.62, 124.10, 122.79, 122.65, 122.26, 120.58, 74.94, 72.00, 56.54, 38.25, 34.66, 34.36, 32.13, 32.10, 31.71, 31.66, 30.04, 25.93.

Example 29: Synthesis of Procatalyst 14

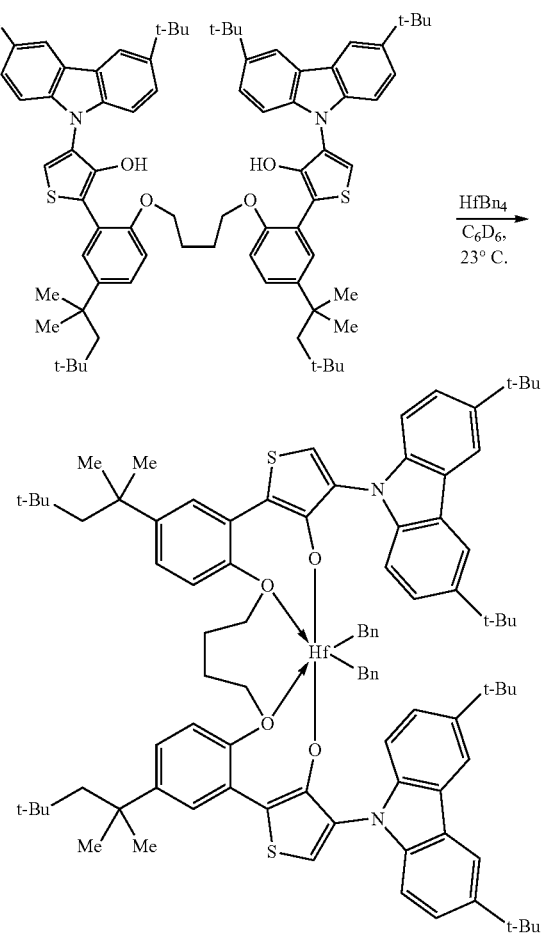

The thiophene ligand was azeotropically dried using PhMe (4×10 mL) prior to use. To a clear colorless solution of the thiophene (8.3 mg, 6.82 μmol, 1.00 eq) in anhydrous $C_6D_6$ (1.19 mL) in a nitrogen filled glovebox at 23° C. was added a solution of $HfBn_4$ (4.1 mg, 7.50 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.57 (dd, J=1.9, 0.6 Hz, 2H), 8.15 (dd, J=2.0, 0.7 Hz, 2H), 7.58 (d, J=2.5 Hz, 2H), 7.52 (dd, J=8.5, 1.9 Hz, 2H), 7.42 (dd, J=8.7, 1.9 Hz, 2H), 7.33 (dd, J=8.5, 0.6 Hz, 2H), 7.14-7.07 (m, 6H), 7.05-7.02 (m, 2H), 6.85 (s, 2H), 6.82 (tt, J=7.3, 1.2 Hz, 2H), 6.24-6.18 (m, 4H), 5.21 (d, J=8.7 Hz, 2H), 4.15-4.06 (m, 2H), 3.50-3.41 (m, 2H), 1.69 (d, J=14.6 Hz, 2H), 1.59 (s, 18H), 1.53 (d, J=14.7 Hz, 2H), 1.25 (s, 18H), 1.22 (s, 6H), 1.17 (s, 6H), 0.92 (t, J=9.5 Hz, 2H), 0.84 (d, J=13.2 Hz, 2H), 0.72 (s, 18H), 0.59-0.51 (m, 2H), 0.27 (d, J=13.2 Hz, 2H). $^{13}$C NMR (126 MHz, Benzene-d$_6$) δ 153.62, 152.32, 149.13, 147.76, 142.98, 142.63, 139.24, 139.11, 128.73, 128.66, 128.04, 127.05, 126.99, 126.92, 125.36, 124.67, 122.99, 122.61, 122.21, 120.63, 116.95, 116.79, 116.28, 115.61, 112.50, 108.93, 81.86, 77.99, 56.54, 38.31, 34.68, 34.37, 32.15, 32.12, 31.68, 31.65, 30.04, 26.03.

Example 30: Synthesis of bis-t-octyl-iodophenyl ether intermediate

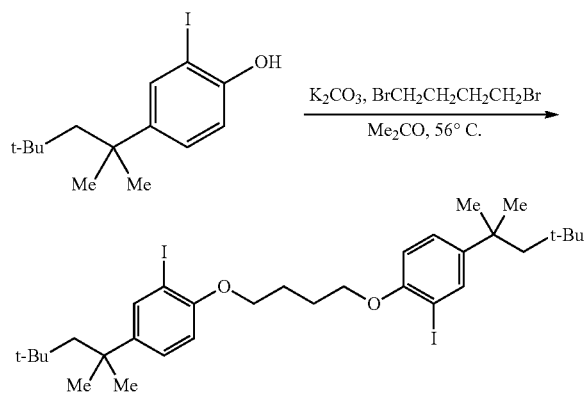

A white heterogeneous mixture of the iodophenol (3.240 g, 9.304 mmol, 2.00 eq), K$_2$CO$_3$ (3.858 g, 27.912 mmol, 6.00 eq), and 1,4-dibromobutane (0.56 mL, 4.652 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred for 2 mins, suction filtered over a pad of celite, rinsed with CH$_2$Cl$_2$ (4×20 mL), the resultant pale yellow filtrate was concentrated onto celite, and purified via silica gel chromatography using an ISCO chromatography purification system; hexanes-50% CH$_2$Cl$_2$ in hexanes to afford the iodophenyl ether as a white solid (3.180 g, 4.426 mmol, 95%). NMR indicated pure product.

$^1$H NMR (500 MHz, Chloroform-d) δ 7.73 (d, J=2.4 Hz, 2H), 7.28-7.24 (m, 2H), 6.73 (d, J=8.6 Hz, 2H), 4.14-4.06 (m, 4H), 2.14-2.06 (m, 4H), 1.68 (s, 4H), 1.32 (s, 12H), 0.73 (s, 18H). $^{13}$C NMR (126 MHz, Chloroform-d) δ 155.12, 144.49, 137.18, 127.03, 111.29, 86.27, 68.68, 56.87, 37.89, 32.35, 31.83, 31.57, 26.11.

Example 31: Synthesis of 4-t-octyl-2-iodophenol

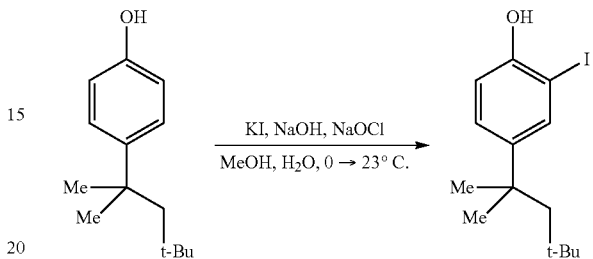

A clear colorless solution of the starting phenol (3.324 g, 16.110 mmol, 1.00 eq), KI (3.477 g, 20.943 mmol, 1.30 eq), and aqueous NaOH (21 mL, 20.943 mmol, 1.30 eq, 1 N) in methanol (100 mL) and water (50 mL) under nitrogen was placed in an ice bath and stirred vigorously for 1 hr, upon which precooled commercial aqueous bleach (26 mL, 20.943 mmol, 1.30 eq, 5.2% w/w) was added in a dropwise manner over 10 mins. The now pale opaque yellow mixture was stirred for 2 hrs at 0° C., the mixture was removed from the ice water bath, stirred at 23° C. for 3 hrs, solid NaH$_2$PO$_4$ (20 g) was added followed by a saturated aqueous mixture Na$_2$S$_2$O$_3$ (100 mL) to reduce residual iodine and water (100 mL), the mixture was stirred vigorously for 10 mins, diluted with CH$_2$Cl$_2$ (50 mL), the biphasic yellow mixture was poured into a separatory funnel, partitioned, organics were washed with aqueous Na$_2$S$_2$O$_3$ (2×50 mL), residual organics were extracted from the aqueous layer using CH$_2$Cl$_2$ (2×50 mL), combined, dried over solid Na$_2$SO$_4$, decanted, and concentrated onto celite, and purified via silica gel chromatography; hexanes-25% CH$_2$Cl$_2$ to afford the o-iodophenol as a clear colorless amorphous foam (3.240 g, 9.340 mmol, 58%). NMR indicated pure product.

$^1$H NMR (500 MHz, Chloroform-d) δ 7.60 (d, J=2.3 Hz, 1H), 7.24 (dd, J=8.5, 2.3 Hz, 1H), 6.90 (dd, J=8.6, 0.5 Hz, 1H), 5.11 (s, 1H), 1.68 (s, 2H), 1.32 (s, 6H), 0.73 (s, 9H). $^{13}$C NMR (126 MHz, Chloroform-d) δ 152.34, 144.65, 135.66, 128.14, 114.23, 85.38, 56.87, 37.93, 32.35, 31.81, 31.55.

Example 32: Synthesis of Ligand 8

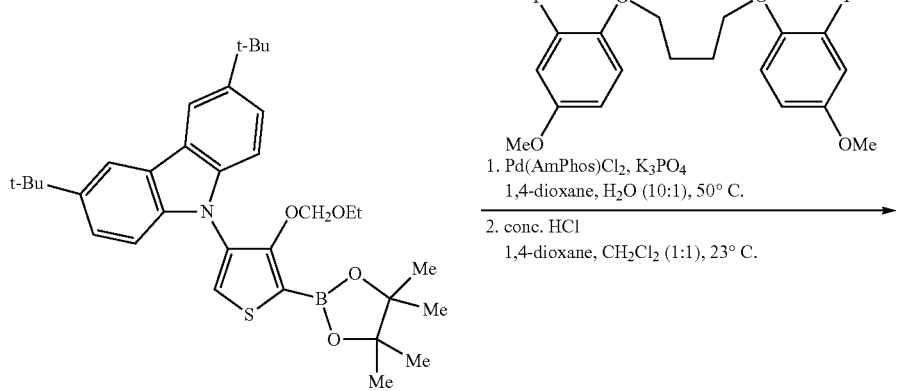

-continued

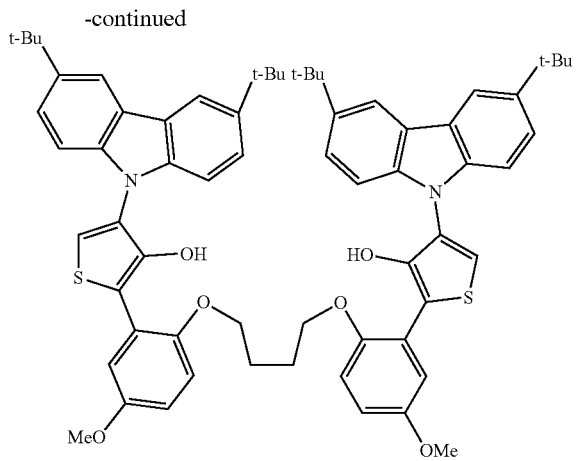

A mixture of the thiophene boropinacolate ester (2.017 g, 2.586 mmol, 3.00 eq, 72% pure by NMR), K$_3$PO$_4$ (1.647 g, 7.758 mmol, 9.00 eq), Pd(AmPhos)Cl$_2$ (122.0 mg, 0.1724 mmol, 0.20 eq), and the bisphenyliodide (0.478 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-50% CH$_2$Cl$_2$ in hexanes to afford the bisthiophene as a red amorphous oil (0.747 g, 0.6387 mmol, 74%). NMR indicated pure product.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a light tan solid (0.514 g, 0.4879 mmol, 76%, 57% two steps). NMR indicated pure product.

$^1$H NMR (500 MHz, Chloroform-d) δ 8.14 (d, J=1.9 Hz, 4H), 7.68 (s, 2H), 7.42 (dd, J=8.6, 1.9 Hz, 4H), 7.35 (s, 2H), 7.25 (d, J=8.6 Hz, 4H), 7.14 (d, J=2.9 Hz, 2H), 6.84 (d, J=9.0 Hz, 2H), 6.79 (dd, J=8.9, 2.9 Hz, 2H), 3.99 (q, J=3.5, 2.1 Hz, 4H), 3.84 (s, 6H), 1.83 (q, J=2.8 Hz, 4H), 1.46 (s, 36H). $^{13}$C NMR (126 MHz, Chloroform-d) δ 155.34, 147.83, 146.76, 142.68, 139.64, 127.76, 124.50, 123.45, 123.19, 120.26, 120.23, 116.56, 116.20, 115.24, 115.18, 113.95, 109.61, 71.38, 55.77, 34.71, 32.05, 25.85.

Example 33: Synthesis of Procatalyst 15

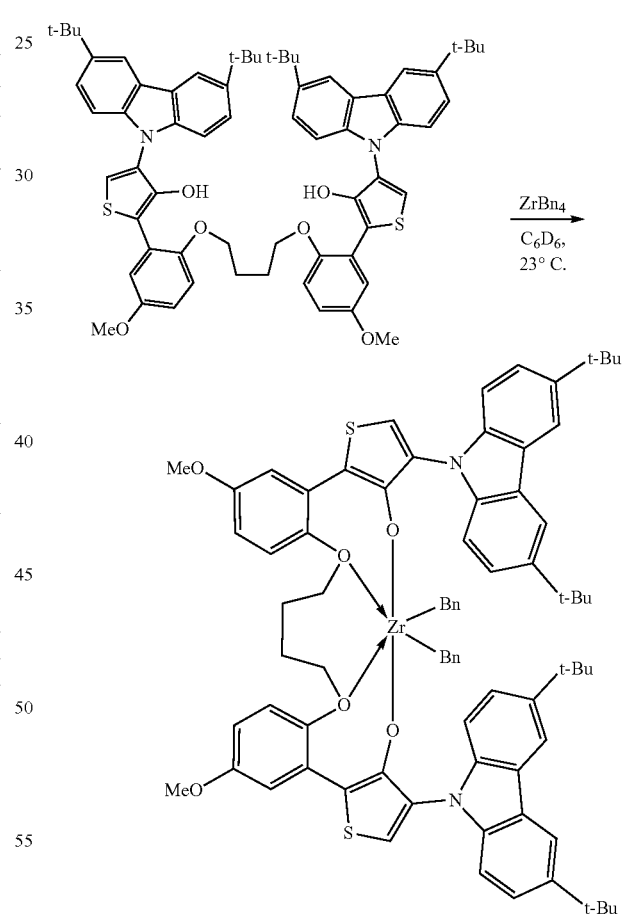

The thiophene ligand was azeotropically dried using PhMe (4×10 mL) prior to use. To a clear colorless solution of the thiophene (7.4 mg, 7.02 μmol, 1.00 eq) in anhydrous C$_6$D$_6$ (1.25 mL) in a nitrogen filled glovebox at 23° C. was added a solution of ZrBn$_4$ (3.7 mg, 7.72 μmol, 1.10 eq) in C$_6$D$_6$ (0.16 mL) in a dropwise manner. After stirring (500 rpm) for 30 mins the pale golden yellow solution was filtered using a 0.20 μm PTFE submicron filter to afford the zirconium complex as a 0.005 M solution in C$_6$D$_6$. NMR indicated product. The same procedure can be used with PhMe as the solvent to prepare the procatalyst solution (0.0025 M or 0.005 M) which is used directly after filtration for the polymerization experiments.

$^1$H NMR (400 MHz, Benzene-d$_6$) δ 8.47 (dd, J=2.0, 0.6 Hz, 2H), 8.24 (dd, J=1.9, 0.6 Hz, 2H), 7.49 (td, J=8.6, 1.9 Hz, 4H), 7.30 (ddd, J=8.5, 5.3, 0.6 Hz, 4H), 7.08-7.03 (m, 2H), 6.96 (dtd, J=6.9, 1.4, 0.7 Hz, 2H), 6.92 (d, J=3.1 Hz, 2H), 6.84 (s, 2H), 6.78 (tt, J=7.3, 1.3 Hz, 2H), 6.45 (dd, J=9.1, 3.1 Hz, 2H), 6.31-6.26 (m, 4H), 5.04 (d, J=9.1 Hz, 2H), 3.95-3.85 (m, 2H), 3.28-3.19 (m, 2H), 3.16 (s, 6H), 1.47 (s, 18H), 1.27 (s, 18H), 1.08 (d, J=12.3 Hz, 2H), 0.88-0.74 (m, 2H), 0.58 (d, J=12.3 Hz, 2H), 0.56-0.51 (m, 2H). $^{13}$C NMR (101 MHz, Benzene-d$_6$) δ 157.39, 152.38, 149.56, 147.35, 143.13, 142.70, 139.32, 139.16, 128.21, 128.19, 128.15, 126.46, 125.20, 124.57, 124.45, 122.63, 122.35, 120.62, 117.06, 116.85, 116.29, 115.68, 115.54, 114.96, 112.51, 108.91, 81.18, 75.06, 54.73, 34.55, 34.42, 31.99, 31.72, 25.92.

Example 34: Synthesis of Procatalyst 16

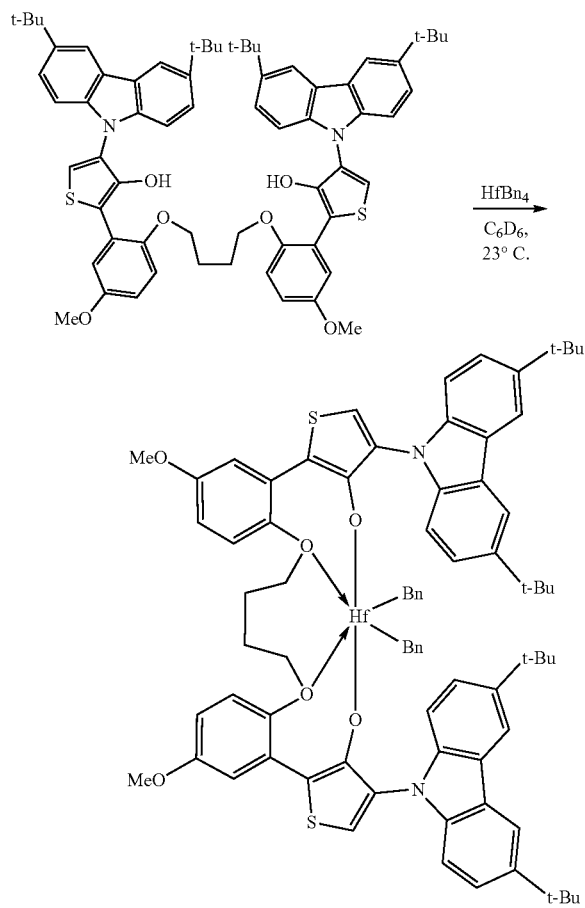

The thiophene ligand was azeotropically dried using PhMe (4×10 mL) prior to use. To a clear colorless solution of the thiophene (10.2 mg, 9.68 μmol, 1.00 eq) in anhydrous C$_6$D$_6$ (1.70 mL) in a nitrogen filled glovebox at 23° C. was added a solution of HfBn$_4$ (5.8 mg, 10.65 μmol, 1.10 eq) in C$_6$D$_6$ (0.24 mL) in a dropwise manner. After stirring (500 rpm) for 30 mins the pale golden yellow solution was filtered using a 0.20 μm PTFE submicron filter to afford the hafnium complex as a 0.005 M solution in C$_6$D$_6$. NMR indicated product. The same procedure can be used with PhMe as the solvent to prepare the procatalyst solution (0.005 M) which is used directly after filtration for the polymerization experiments.

$^1$H NMR (500 MHz, Benzene-d$_6$) δ 8.50 (dd, J=2.0, 0.6 Hz, 2H), 8.26 (dd, J=1.9, 0.6 Hz, 2H), 7.50 (dd, J=2.5, 1.9 Hz, 2H), 7.48 (t, J=2.1 Hz, 2H), 7.29 (dd, J=8.5, 0.6 Hz, 2H), 7.23 (dd, J=8.7, 0.6 Hz, 2H), 6.99-6.95 (m, 2H), 6.93 (d, J=3.1 Hz, 2H), 6.85 (s, 2H), 6.79-6.74 (m, 2H), 6.52-6.44 (m, 4H), 6.32-6.28 (m, 4H), 5.09 (d, J=9.0 Hz, 2H), 4.02-3.92 (m, 2H), 3.33-3.25 (m, 2H), 3.17 (s, 6H), 1.48 (s, 18H), 1.29 (s, 18H), 0.92 (d, J=13.3 Hz, 2H), 0.85-0.77 (m, 2H), 0.55 (m, 2H), 0.31 (d, J=13.3 Hz, 2H). $^{13}$C NMR (126 MHz, Benzene-d$_6$) δ 157.52, 152.44, 149.28, 148.02, 143.20, 142.73, 139.32, 139.12, 129.89, 128.60, 128.57, 128.03, 127.04, 126.83, 124.63, 124.35, 122.58, 122.30, 120.69, 117.13, 116.30, 115.70, 115.48, 114.96, 112.58, 108.91, 83.01, 78.24, 54.76, 34.57, 34.43, 32.00, 31.73, 26.04.

Example 35: Synthesis of bis-4-methoxy-2-iodophenyl ether

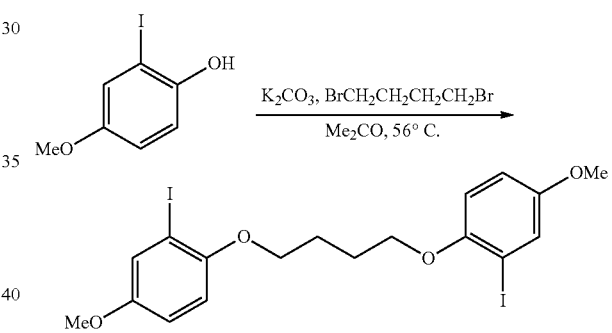

A white heterogeneous mixture of 2-iodophenol (1.890 g, 7.559 mmol, 2.00 eq), K$_2$CO$_3$ (3.134 g, 22.677 mmol, 6.00 eq), and 1,4-dibromobutane (0.45 mL, 3.779 mmol, 1.00 eq) in acetone (40 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred for 2 mins, suction filtered over a pad of celite, rinsed with CH$_2$Cl$_2$ (4×20 mL), the resultant pale yellow filtrate was concentrated onto celite, and purified via silica gel chromatography using an ISCO chromatography purification system; 50%-100% CH$_2$Cl$_2$ in hexanes to afford the iodophenyl ether as a white solid (1.945 g, 3.510 mmol, 93%). NMR indicated pure product.

$^1$H NMR (500 MHz, Chloroform-d) δ 7.32 (d, J=2.9 Hz, 2H), 6.84 (dd, J=8.9, 3.0 Hz, 2H), 6.76 (d, J=8.9 Hz, 2H), 4.11-3.99 (m, 4H), 3.75 (s, 6H), 2.13-2.01 (m, 4H). $^{13}$C NMR (126 MHz, Chloroform-d) δ 154.26, 152.05, 124.61, 114.78, 113.06, 86.94, 69.58, 55.92, 26.15.

Example 36: Synthesis of 4-methoxy-2-iodophenol

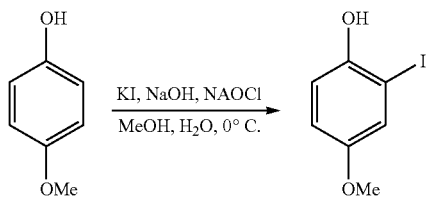 [SMILES: COc1ccc(O)cc1 ; COc1ccc(O)c(I)c1]

A clear colorless solution of the starting phenol (5.000 g, 40.277 mmol, 1.00 eq), KI (7.020 g, 42.291 mmol, 1.05 eq), and aqueous NaOH (201 mL, 201.39 mmol, 5.00 eq, 1 N) in methanol (300 mL) and water (200 mL) under nitrogen was placed in an ice bath and stirred vigorously for 1 hr, upon which precooled commercial aqueous bleach (61 mL, 42.291 mmol, 1.05 eq, 5.2% w/w) was added in a dropwise manner over 30 mins. The now dark orange mixture was stirred for 30 mins at 0° C., the mixture was removed from the ice water bath, solid $NaH_2PO_4$ (30 g) was added followed by aqueous $Na_2S_2O_3$ (200 mL) to reduce residual iodine and water (200 mL), the mixture was stirred vigorously for 10 mins, diluted with $CH_2Cl_2$ (50 mL), the biphasic dark red-orange mixture was poured into a separatory funnel, organics were partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, and concentrated to afford a red-brown viscous oil. NMR indicated starting phenol and observable product, albeit minor, with approx. 70:30 SM:product mixture, and there exists other adducts of decomposition. The crude mixture was dissolved in $CH_2Cl_2$, concentrated onto celite, and purified via silica gel chromatography; 25% $CH_2Cl_2$ in hexanes-100% $CH_2Cl_2$ to afford the o-iodophenol as a pale purple amorphous foam (0.877 g, 3.508 mmol, 9%) and recovered starting phenol (1.277 g, 10.287 mmol, 26%). NMR indicated pure product.

$^1$H NMR (500 MHz, Chloroform-d) δ 7.18 (d, J=2.9 Hz, 1H), 6.90 (d, J=8.9 Hz, 1H), 6.83 (dd, J=8.9, 2.9 Hz, 1H), 5.00 (s, 1H), 3.74 (s, 3H). $^{13}$C NMR (126 MHz, Chloroform-d) δ 153.93, 149.17, 122.66, 116.37, 115.13, 85.07, 55.99.

Example 37: Synthesis of Ligand 9

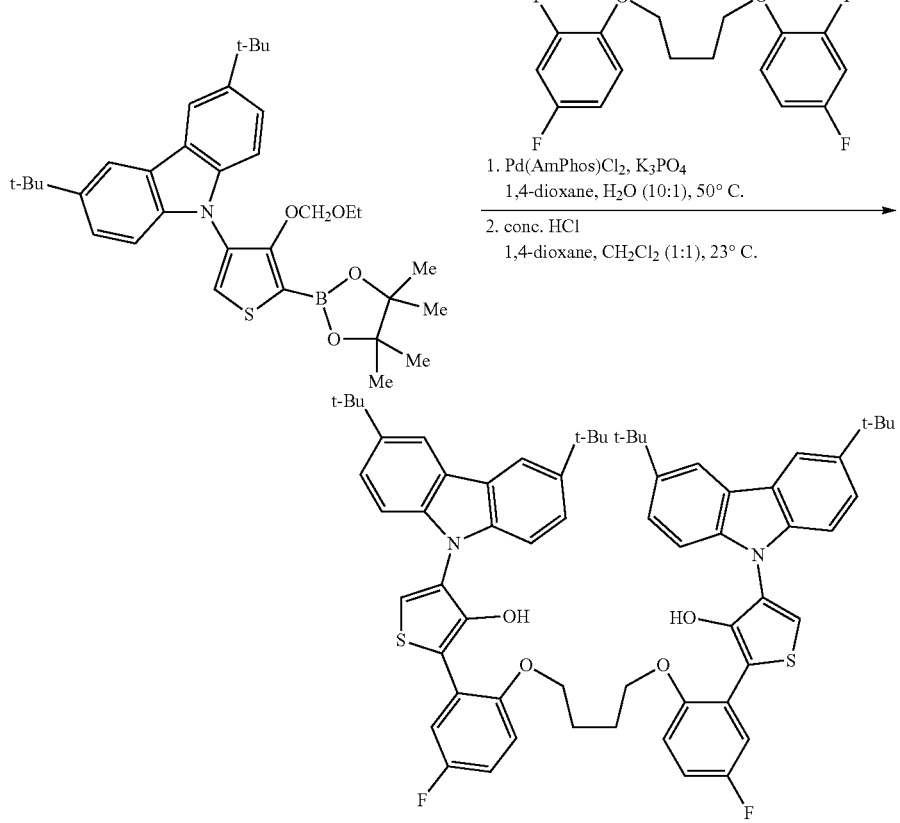

A mixture of the thiophene boropinacolate ester (0.605 g, 0.5387 mmol, 2.70 eq, 50% pure by NMR), $K_3PO_4$ (0.343 g, 1.616 mmol, 8.10 eq), Pd(AmPhos)Cl$_2$ (28.3 mg, 0.0399 mmol, 0.20 eq), and the bisphenyliodide (0.106 g, 0.1995 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as an off-white solid (0.101 g). NMR indicated product which contained minor impurities. The material was used in the subsequent deprotection without further purification.

To a solution of the impure coupled product in $CH_2Cl_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (52.0 mg, 0.05052 mmol, 25% two steps). NMR indicated pure product.

$^1$H NMR (400 MHz, Chloroform-d) δ 8.10 (d, J=1.9 Hz, 4H), 7.43-7.29 (m, 8H), 7.25 (d, J=10.3 Hz, 2H), 7.19 (d, J=8.6 Hz, 4H), 6.90 (td, J=8.2, 7.5, 3.0 Hz, 2H), 6.80 (dd, J=9.1, 4.6 Hz, 2H), 4.01 (d, J=4.8 Hz, 4H), 1.92-1.81 (m, 4H), 1.42 (s, 36H). $^{19}$F NMR (376 MHz, Chloroform-d) δ −120.34 (td, J=8.5, 4.7 Hz). $^{13}$C NMR (101 MHz, Chloroform-d) δ 158.08 (d, J=241.4 Hz), 149.83 (d, J=2.3 Hz), 146.99, 142.85, 139.52, 127.55, 124.80 (d, J=8.6 Hz), 123.50, 123.21, 120.82, 116.56 (d, J=24.7 Hz), 116.24, 115.69 (d, J=8.8 Hz), 114.72 (d, J=23.3 Hz), 114.00 (d, J=1.8 Hz), 109.47, 70.96, 34.68, 31.99, 25.83.

Example 38: Synthesis of Procatalyst 17

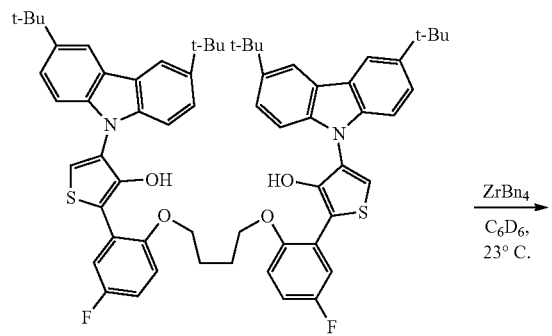

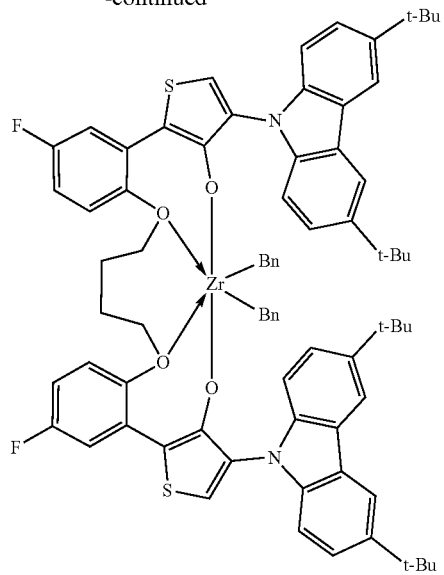

The thiophene ligand was azeotropically dried using PhMe (4×10 mL) prior to use. To a clear colorless solution of the thiophene (9.2 mg, 8.94 μmol, 1.00 eq) in anhydrous $C_6D_6$ (1.61 mL) in a nitrogen filled glovebox at 23° C. was added a solution of $ZrBn_4$ (4.5 mg, 9.83 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.42 (dd, J=2.0, 0.6 Hz, 2H), 8.28 (dd, J=1.9, 0.7 Hz, 2H), 7.51 (dd, J=8.7, 1.9 Hz, 2H), 7.44 (dd, J=8.5, 1.9 Hz, 2H), 7.33 (dd, J=8.7, 0.6 Hz, 2H), 7.21 (dd, J=8.5, 0.7 Hz, 2H), 7.01-6.95 (m, 2H), 6.83 (s, 2H), 6.79-6.74 (m, 2H), 6.50 (ddd, J=9.0, 7.4, 3.2 Hz, 4H), 6.36-6.32 (m, 2H), 6.27-6.23 (m, 4H), 4.99 (dd, J=9.0, 4.8 Hz, 2H), 3.87-3.75 (m, 2H), 3.11 (dd, J=11.8, 4.6 Hz, 2H), 1.43 (s, 18H), 1.30 (s, 18H), 1.02 (d, J=12.4 Hz, 2H), 0.98-0.82 (m, 2H), 0.75-0.63 (m, 2H), 0.52 (d, J=12.3 Hz, 2H). $^{19}$F NMR (470 MHz, Benzene-$d_6$) δ −114.74--117.39 (m). $^{13}$C NMR (126 MHz, Benzene-$d_6$) δ 159.84 (d, J=246.8 Hz), 152.62, 151.81 (d, J=2.6 Hz), 146.41, 143.19 (d, J=49.2 Hz), 139.19 (d, J=20.1 Hz), 130.56, 128.33, 128.06, 126.53, 125.18, 124.92 (d, J=8.9 Hz), 124.30 (d, J=47.3 Hz), 122.56 (d, J=38.4 Hz), 121.16, 118.06, 116.69 (d, J=47.1 Hz), 116.69, 115.98 (d, J=91.0 Hz), 115.83 (d, J=1.9 Hz), 112.30, 108.75, 74.98, 72.01, 34.52, 34.45, 31.94, 31.72, 25.71.

Example 39: Synthesis of Procatalyst 18

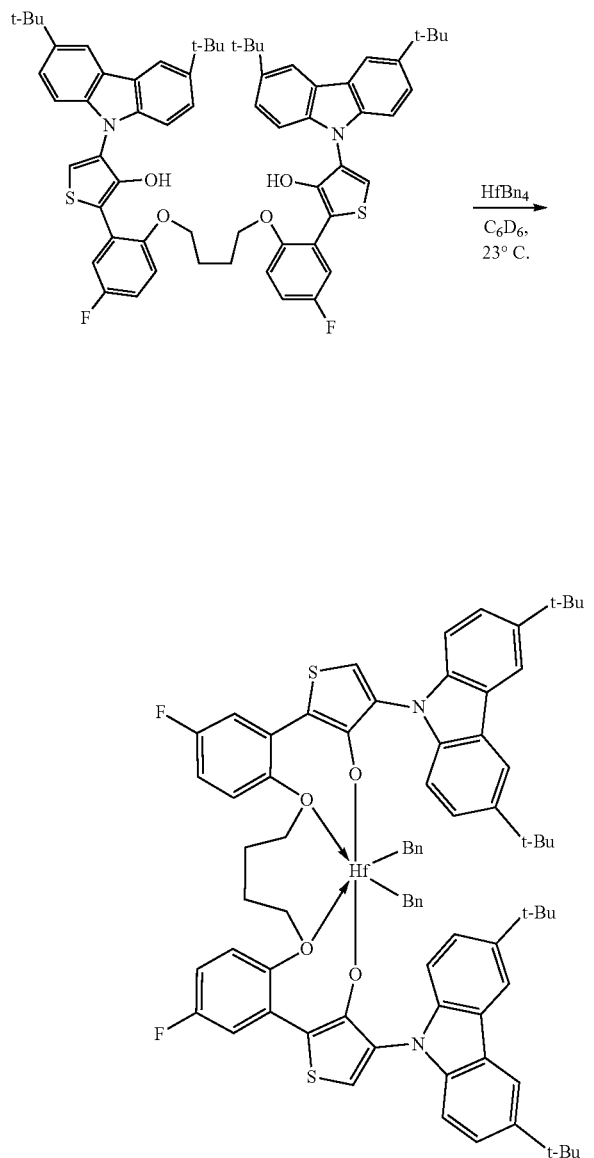

The thiophene ligand was azeotropically dried using PhMe (4×10 mL) prior to use. To a clear colorless solution of the thiophene (7.7 mg, 7.48 μmol, 1.00 eq) in anhydrous $C_6D_6$ (1.37 mL) in a nitrogen filled glovebox at 23° C. was added a solution of $HfBn_4$ (4.5 mg, 8.23 μmol, 1.10 eq) in $C_6D_6$ (0.19 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1H$ NMR (500 MHz, Benzene-$d_6$) δ 8.43 (dd, J=2.0, 0.6 Hz, 2H), 8.29 (dd, J=1.9, 0.6 Hz, 2H), 7.49 (dd, J=8.7, 1.9 Hz, 2H), 7.44 (dd, J=8.5, 1.9 Hz, 2H), 7.24 (dd, J=8.7, 0.6 Hz, 2H), 7.19 (dd, J=8.5, 0.6 Hz, 2H), 7.02-6.96 (m, 2H), 6.94-6.90 (m, 2H), 6.82 (s, 2H), 6.75 (tt, J=7.5, 1.3 Hz, 2H), 6.55-6.47 (m, 4H), 6.30-6.25 (m, 4H), 5.01 (dd, J=9.0, 4.8 Hz, 2H), 3.89-3.78 (m, 2H), 3.15 (dd, J=12.4, 4.7 Hz, 2H), 1.43 (s, 18H), 1.30 (s, 18H), 0.90 (d, J=13.4 Hz, 2H), 0.73-0.62 (m, 2H), 0.49-0.40 (m, 2H), 0.24 (d, J=14.0 Hz, 2H). $^{19}F$ NMR (470 MHz, Benzene-$d_6$) δ −115.11−−115.24 (m). $^{13}C$ NMR (126 MHz, Benzene-$d_6$) δ 159.97 (d, J=247.4 Hz), 152.66, 151.46 (d, J=2.7 Hz), 147.32, 143.24 (d, J=55.5 Hz), 139.14 (d, J=26.6 Hz), 138.52, 130.56, 128.38 (d, J=11.1 Hz), 127.15, 126.72, 124.55, 124.35, 122.64, 122.33, 121.13, 118.09, 116.76 (d, J=23.4 Hz), 116.46 (d, J=23.3 Hz), 116.32, 115.52, 115.27, 112.43, 108.74, 82.00, 78.84, 34.52, 34.46, 31.94, 31.72, 25.86.

Example 40: Synthesis of Ligand 10

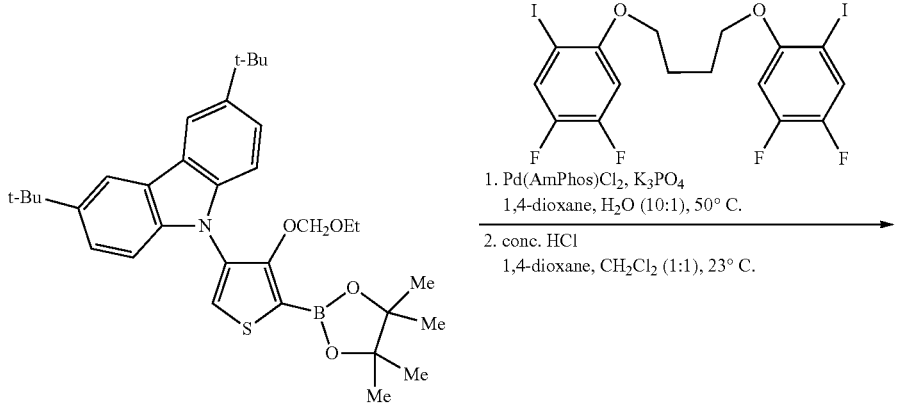

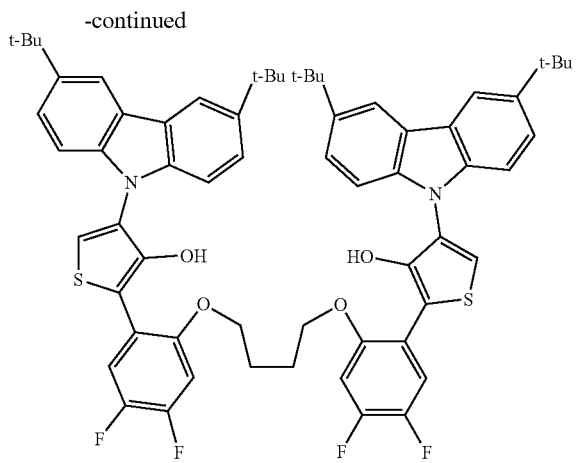

A mixture of the thiophene boropinacolate ester (0.605 g, 0.5387 mmol, 2.70 eq, 50% pure by NMR), K₃PO₄ (0.343 g, 1.616 mmol, 8.10 eq), Pd(AmPhos)Cl₂ (28.3 mg, 0.0399 mmol, 0.20 eq), and the bisphenyliodide (0.113 g, 0.1995 mmol, 1.00 eq). The mixture was evacuated, then back-filled with nitrogen, this process was repeated 3× more, then deoxygenated 1,4-dioxane (10.0 mL) and deoxygenated water (1.0 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-60% CH₂Cl₂ in hexanes to afford the impure bisthiophene as a pale red foam (0.154 g). NMR indicated product which contained impurities. The impure material was used in the subsequent reaction.

To a solution of the impure coupled product in CH₂Cl₂-1,4-dioxane (6 mL, 1:1) under nitrogen at 23° C. was added conc. HCl (3 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a clear amorphous foam (0.105 g, 0.09856 mmol, 49% two steps). NMR indicated pure product.

¹H NMR (400 MHz, Chloroform-d) δ 8.12 (dd, J=1.9, 0.6 Hz, 4H), 7.56 (dd, J=11.4, 8.8 Hz, 2H), 7.39 (dd, J=8.6, 1.9 Hz, 4H), 7.30 (s, 2H), 7.17 (dd, J=8.6, 0.6 Hz, 4H), 6.74 (dd, J=11.4, 6.8 Hz, 2H), 6.54 (s, 2H), 4.06-3.97 (m, 4H), 1.95 (p, J=2.5 Hz, 4H), 1.42 (s, 36H). ¹⁹F NMR (376 MHz, Chloroform-d) δ −135.22 (ddd, J=22.5, 11.5, 8.8 Hz), −144.91 (ddd, J=22.2, 11.2, 6.8 Hz). ¹³C NMR (101 MHz, Chloroform-d) δ 150.19-149.71 (m), 149.36 (dd, J=250.5, 13.9 Hz), 146.75-144.02 (m), 146.55, 143.08, 139.43, 127.14, 123.61, 123.29, 120.52, 119.32-118.89 (m), 118.15 (d, J=20.6 Hz), 116.34, 112.97, 109.37, 103.52 (d, J=20.8 Hz), 70.59, 34.70, 31.97, 25.83.

Example 41: Synthesis of Procatalyst 19

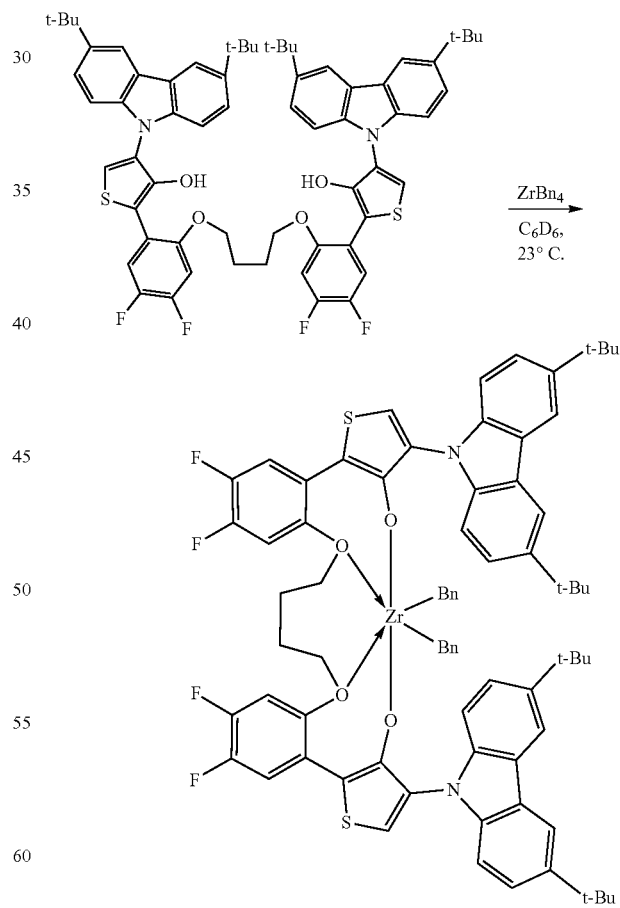

The thiophene ligand was azeotropically dried using PhMe (4×10 mL) prior to use. To a clear colorless solution of the thiophene (11.2 mg, 10.51 μmol, 1.00 eq) in anhydrous C₆D₆ (3.78 mL) in a nitrogen filled glovebox at 23° C.

was added a solution of ZrBn$_4$ (5.3 mg, 11.56 µmol, 1.10 eq) in C$_6$D$_6$ (0.42 mL) in a dropwise manner. After stirring (500 rpm) for 30 mins the pale golden yellow solution was filtered using a 0.20 µm PTFE submicron filter to afford the zirconium complex as a 0.0025 M solution in C$_6$D$_6$. NMR indicated product. The same procedure can be used with PhMe as the solvent to prepare the procatalyst solution (0.0025 M or 0.005 M) which is used directly after filtration for the polymerization experiments. Slow, gradual evaporation of the NMR solution afforded crystallization of the zirconium complex, crystals of which were evaluated using X-Ray diffraction to unambiguously confirm the structure.

$^1$H NMR (500 MHz, Benzene-d$_6$) δ 8.55 (d, J=1.9 Hz, 1H), 8.46 (d, J=1.9 Hz, 1H), 8.39 (t, J=1.3 Hz, 1H), 8.33 (dd, J=2.0, 0.7 Hz, 1H), 7.58 (d, J=1.3 Hz, 2H), 7.52 (ddd, J=8.5, 6.7, 1.9 Hz, 3H), 7.47 (dd, J=8.7, 0.7 Hz, 1H), 7.23-7.20 (m, 2H), 7.08-7.02 (m, 3H), 6.96-6.94 (m, 2H), 6.93 (s, 1H), 6.82 (s, 1H), 6.80-6.72 (m, 3H), 6.54-6.48 (m, 2H), 6.29-6.24 (m, 2H), 5.67 (dd, J=10.8, 6.9 Hz, 1H), 5.00-4.91 (m, 1H), 3.80-3.71 (m, 1H), 3.04 (dd, J=12.5, 3.7 Hz, 1H), 2.68 (dd, J=11.4, 7.2 Hz, 1H), 2.11 (d, J=10.1 Hz, 1H), 1.53 (s, 9H), 1.27 (d, J=1.2 Hz, 18H), 1.25 (s, 9H), 0.96 (d, J=12.0 Hz, 2H), 0.93-0.83 (m, 1H), 0.71-0.63 (m, 1H), 0.63-0.58 (m, 2H), 0.57-0.52 (m, 1H), 0.38-0.27 (m, 1H). $^{19}$F NMR (470 MHz, Benzene-d$_6$) δ −131.71 (dt, J=23.0, 9.6 Hz), −134.32 (dt, J=19.7, 9.7 Hz), −136.51−−137.09 (m), −138.80 (ddd, J=22.8, 10.4, 6.9 Hz).

Example 42: Synthesis of Procatalyst 20

The thiophene ligand was azeotropically dried using PhMe (4×10 mL) prior to use. To a clear colorless solution of the thiophene (8.6 mg, 8.07 µmol, 1.00 eq) in anhydrous C$_6$D$_6$ (2.85 mL) in a nitrogen filled glovebox at 23° C. was added a solution of HfBn$_4$ (4.8 mg, 8.88 µmol, 1.10 eq) in C$_6$D$_6$ (0.38 mL) in a dropwise manner. After stirring (500 rpm) for 30 mins the pale golden yellow solution was filtered using a 0.20 µm PTFE submicron filter to afford the hafnium complex as a 0.0025 M solution in C$_6$D$_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-d$_6$) δ 8.57 (d, J=1.9 Hz, 2H), 8.33 (dd, J=2.0, 0.6 Hz, 2H), 7.54-7.48 (m, 4H), 7.41 (dd, J=8.7, 0.6 Hz, 2H), 7.19 (dd, J=8.4, 0.6 Hz, 2H), 6.99-6.95 (m, 2H), 6.82 (s, 2H), 6.79 (dd, J=10.5, 8.6 Hz, 2H), 6.77-6.70 (m, 2H), 6.53-6.48 (m, 2H), 6.36-6.32 (m, 4H), 4.98 (dd, J=10.5, 7.0 Hz, 2H), 3.76-3.65 (m, 2H), 3.07-2.99 (m, 2H), 1.53 (s, 18H), 1.26 (s, 18H), 1.00 (d, J=13.5 Hz, 2H), 0.67-0.58 (m, 2H), 0.52-0.43 (m, 2H), 0.37-0.31 (m, 2H). $^{19}$F NMR (470 MHz, Benzene-d$_6$) δ −131.68 (dt, J=23.1, 9.5 Hz), −138.29 (ddd, J=23.0, 10.7, 7.2 Hz).

Example 43: Synthesis of bis-4,5-difluoro-2-iodophenyl ether

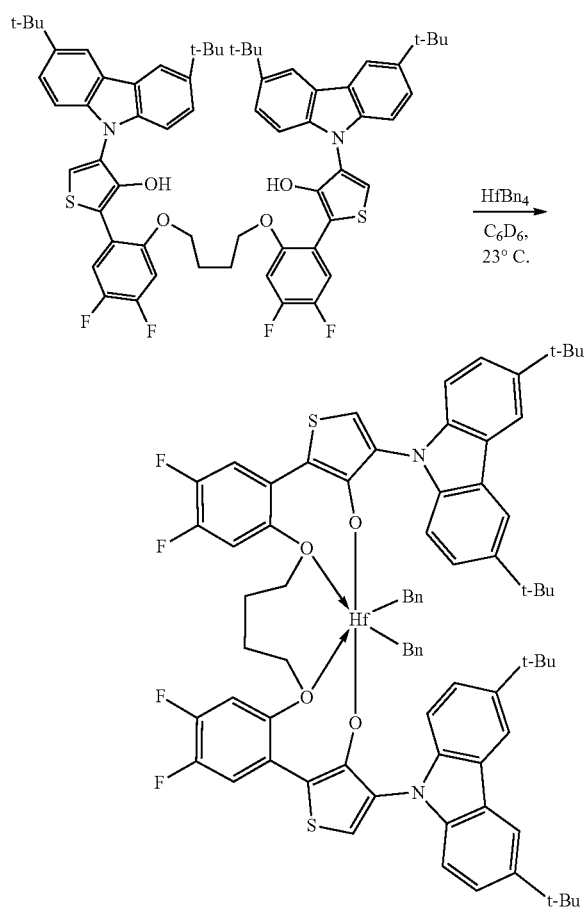

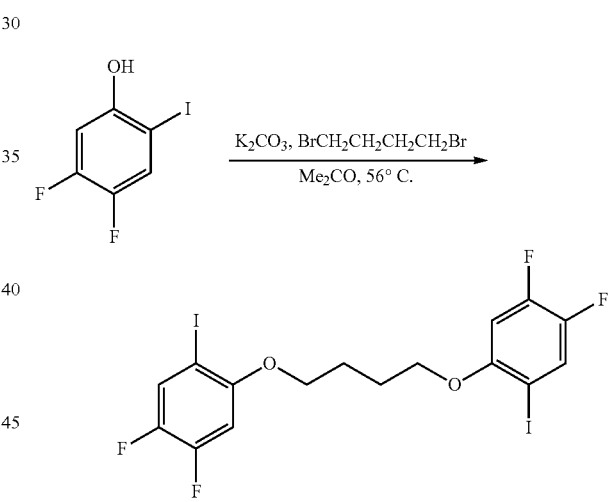

A white heterogeneous mixture of the iodophenol (5.700 g, 22.266 mmol, 2.00 eq), K$_2$CO$_3$ (9.232 g, 66.799 mmol, 6.00 eq), and 1,4-dibromobutane (1.33 mL, 11.133 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred vigorously (1000 rpm) for 5 mins, suction filtered over a pad of celite, rinsed with CH$_2$Cl$_2$ (3×25 mL), the resultant filtrate solution was concentrated onto celite, and purified via silica gel chromatography; 10% CH$_2$Cl$_2$ in hexanes-50% CH$_2$Cl$_2$ in hexanes to afford the bisiodophenyl ether as a white solid (5.798 g, 10.243 mmol, 92%). NMR indicated product.

$^1$H NMR (500 MHz, Chloroform-d) δ 7.57 (t, J=9.0 Hz, 2H), 6.67 (dd, J=11.9, 6.7 Hz, 2H), 4.05 (d, J=5.3 Hz, 4H), 2.10 (q, J=4.9, 3.7 Hz, 4H). $^{19}$F NMR (470 MHz, Chloroform-d) δ −134.17 (ddd, J=21.0, 12.1, 8.8 Hz), −145.86 (dt, J=21.0, 8.2 Hz). $^{13}$C NMR (126 MHz, Chloroform-d) δ 154.03 (dd, J=7.6, 2.4 Hz), 150.52 (dd, J=249.2, 13.5 Hz), 144.64 (dd, J=245.3, 13.1 Hz), 126.87 (d, J=20.4 Hz), 101.50 (d, J=21.5 Hz), 77.77 (dd, J=6.1, 4.0 Hz), 69.55, 25.86.

Example 44: Synthesis of 4,5-difluoro-2-iodophenol

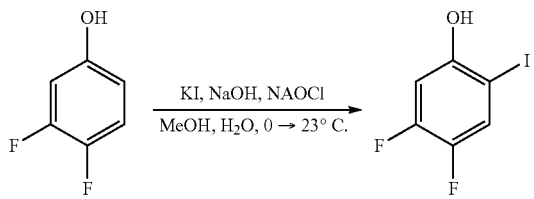 [SMILES: Oc1ccc(F)c(F)c1 ; Oc1cc(F)c(F)cc1I]

A clear colorless solution of the starting phenol (5.000 g, 38.434 mmol, 1.00 eq), KI (10.846 g, 65.337 mmol, 1.70 eq), and aqueous NaOH (65 mL, 65.337 mmol, 1.70 eq, 1 N) in methanol (200 mL) and water (50 mL) under nitrogen was placed in an ice bath and stirred vigorously (1000 rpm) for 1 hr, upon which precooled commercial aqueous bleach (84 mL, 65.337 mmol, 1.70 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid KH$_2$PO$_4$ (25 g) was added followed by a saturated aqueous mixture Na$_2$S$_2$O$_3$ (100 mL) to reduce residual iodine, water (100 mL) was added, the mixture was stirred vigorously for 10 mins, diluted with CH$_2$Cl$_2$ (50 mL), the biphasic yellow mixture was poured into a separatory funnel, partitioned, organics were washed with aqueous Na$_2$S$_2$O$_3$ (2×50 mL), residual organics were extracted from the aqueous layer using CH$_2$Cl$_2$ (2×25 mL), combined, dried over solid Na$_2$SO$_4$, decanted, and concentrated onto celite, and purified via silica gel chromatography; hexanes-50% CH$_2$Cl$_2$ in hexanes to afford the o-iodophenol as a clear pale brown viscous oil (5.742 g, 22.431 mmol, 58%). NMR indicated pure product.

$^1$H NMR (500 MHz, Chloroform-d) δ 7.45 (dd, J=9.2, 8.4 Hz, 1H), 6.86 (dd, J=11.3, 7.0 Hz, 1H), 5.16 (s, 1H). $^{19}$F NMR (470 MHz, Chloroform-d) δ −133.85 (dp, J=20.7, 10.3, 9.5 Hz), −145.38 (tq, J=20.8, 8.2, 7.7 Hz). $^{13}$C NMR (126 MHz, Chloroform-d) δ 151.61 (dd, J=9.9, 2.7 Hz), 151.13 (dd, J=249.5, 13.6 Hz), 144.79 (dd, J=245.8, 13.5 Hz), 125.24 (d, J=20.5 Hz), 103.94 (d, J=21.1 Hz), 76.65 (dd, J=6.6, 4.1 Hz).

Example 45: Synthesis of Ligand 11

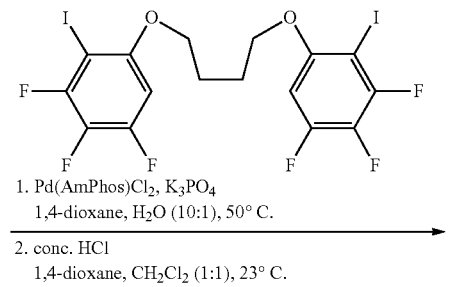

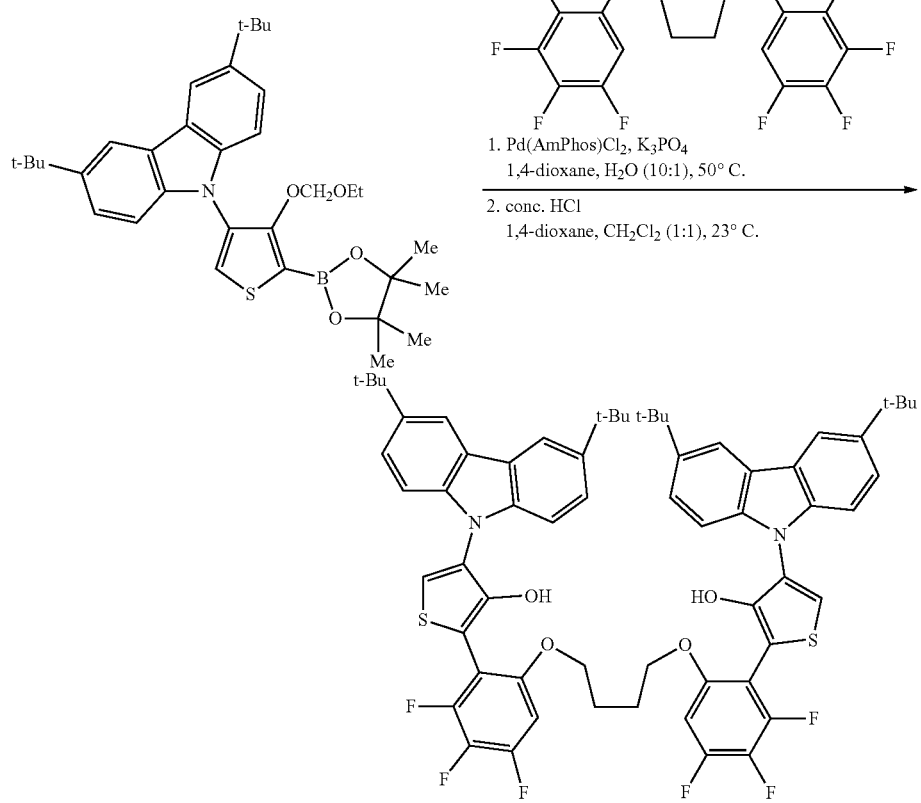

A mixture of the thiophene boropinacolate ester (0.605 g, 0.5387 mmol, 2.70 eq, 50% pure by NMR), K$_3$PO$_4$ (0.343 g, 1.616 mmol, 8.10 eq), Pd(AmPhos)Cl$_2$ (28.0 mg, 0.0399 mmol, 0.20 eq), and the bisphenyliodide (0.120 g, 0.1995 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-60% CH$_2$Cl$_2$ in hexanes to afford the impure bisthiophene as a golden yellow foam (0.201 g). NMR indicated product which contained impurities. The impure material was used in the subsequent reaction.

To a solution of the impure coupled product in CH$_2$Cl$_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a clear amorphous foam (0.107 g, 0.09716 mmol, 49% two steps). NMR indicated pure product.

$^1$H NMR (500 MHz, Chloroform-d) δ 8.13 (d, J=1.9 Hz, 4H), 7.44-7.36 (m, 6H), 7.18 (d, J=8.6 Hz, 4H), 6.52 (ddd, J=11.6, 6.1, 1.9 Hz, 2H), 5.57 (s, 2H), 3.93-3.88 (m, 4H), 1.84 (q, J=2.8, 2.3 Hz, 4H), 1.44 (s, 36H). $^{19}$F NMR (470 MHz, Chloroform-d) δ −130.70 (dd, J=22.3, 6.5 Hz), −132.47 (ddd, J=22.4, 11.5, 6.7 Hz), −167.89 (td, J=22.0, 6.2 Hz). $^{13}$C NMR (101 MHz, Chloroform-d) δ 152.20-150.50 (m), 151.18-150.88 (m), 148.81 (ddd, J=133.2, 10.8, 5.8 Hz), 147.48, 143.25, 139.32, 138.59-137.90 (m), 135.69 (dt, J=246.1, 16.1 Hz), 126.44, 123.69, 123.35, 121.40, 116.39, 109.27, 107.74 (dd, J=14.5, 3.8 Hz), 106.21, 97.67 (dd, J=21.2, 3.2 Hz), 69.89, 34.70, 31.95, 25.62.

Example 46: Synthesis of Procatalyst 21

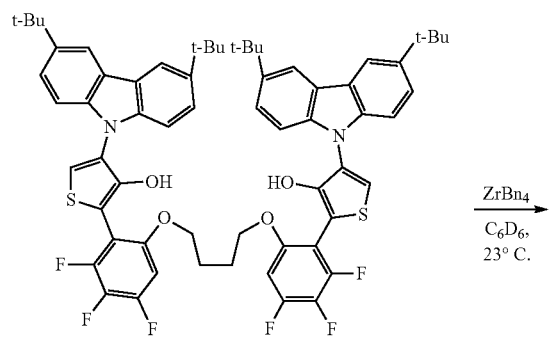

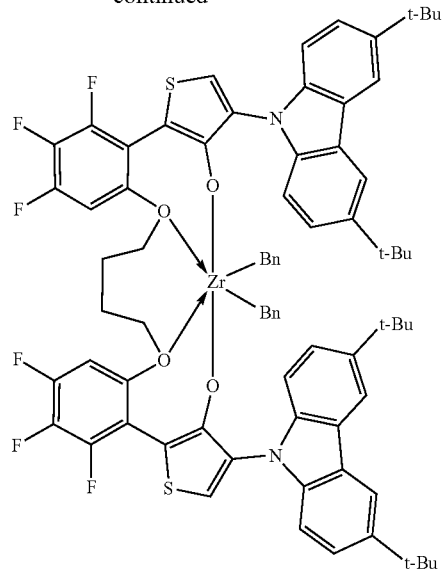

The thiophene ligand was azeotropically dried using PhMe (4×10 mL) prior to use. To a clear colorless solution of the thiophene (13.6 mg, 12.35 μmol, 1.00 eq) in anhydrous C$_6$D$_6$ (4.44 mL) in a nitrogen filled glovebox at 23° C. was added a solution of ZrBn$_4$ (6.2 mg, 13.58 μmol, 1.10 eq) in C$_6$D$_6$ (0.50 mL) in a dropwise manner. After stirring (500 rpm) for 30 mins the pale golden yellow solution was filtered using a 0.20 μm PTFE submicron filter to afford the zirconium complex as a 0.0025 M solution in C$_6$D$_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-d$_6$) δ 8.53 (d, J=1.9 Hz, 2H), 8.34 (dd, J=1.8, 0.7 Hz, 2H), 7.52-7.47 (m, 4H), 7.45 (dd, J=8.7, 0.7 Hz, 2H), 7.20 (dd, J=8.5, 0.6 Hz, 2H), 6.92 (ddd, J=8.1, 7.3, 1.6 Hz, 4H), 6.89 (s, 2H), 6.74-6.70 (m, 2H), 6.24-6.21 (m, 4H), 4.65 (dd, J=10.6, 6.3 Hz, 2H), 3.71 (dd, J=12.8, 7.7 Hz, 2H), 3.04 (dd, J=11.6, 4.6 Hz, 2H), 1.53 (s, 18H), 1.26 (s, 18H), 0.78 (d, J=11.8 Hz, 2H), 0.67 (dd, J=16.2, 7.2 Hz, 2H), 0.58-0.52 (m, 2H), 0.52 (d, J=12.0 Hz, 2H). $^{19}$F NMR (470 MHz, Benzene-d$_6$) δ −130.11 (ddd, J=23.0, 10.5, 5.8 Hz), −131.31--131.90 (m), −160.87 (td, J=23.0, 6.6 Hz).

Example 47: Synthesis of Procatalyst 24

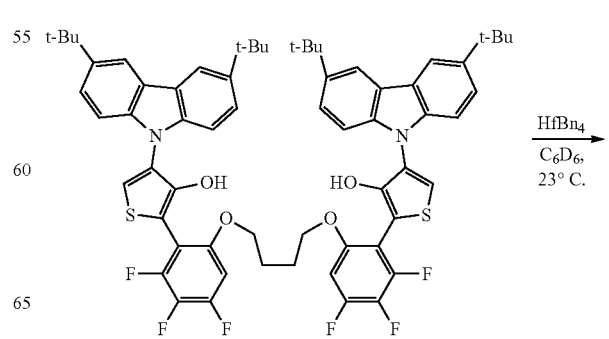

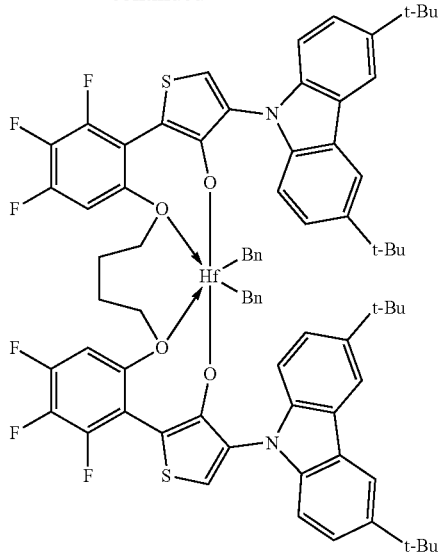

The thiophene ligand was azeotropically dried using PhMe (4×10 mL) prior to use. To a clear colorless solution of the thiophene (9.6 mg, 8.72 µmol, 1.00 eq) in anhydrous C$_6$D$_6$ (3.07 mL) in a nitrogen filled glovebox at 23° C. was added a solution of HfBn$_4$ (5.2 mg, 9.59 µmol, 1.10 eq) in C$_6$D$_6$ (0.42 mL) in a dropwise manner. After stirring (500 rpm) for 30 mins the pale golden yellow solution was filtered using a 0.20 µm PTFE submicron filter to afford the hafnium complex as a 0.0025 M solution in C$_6$D$_6$. NMR indicated product. The same procedure can be used with PhMe as the solvent to prepare the procatalyst solution (0.0025 M) which is used directly after filtration for the polymerization experiments.

$^1$H NMR (400 MHz, Benzene-d$_6$) δ 8.53 (d, J=1.9 Hz, 2H), 8.33 (dd, J=1.8, 0.7 Hz, 2H), 7.51-7.42 (m, 6H), 7.16 (dd, J=8.5, 0.6 Hz, 2H), 7.02-6.94 (m, 6H), 6.87 (s, 2H), 6.73-6.65 (m, 2H), 6.36-6.30 (m, 4H), 4.63 (dd, J=10.6, 6.3 Hz, 2H), 3.63-3.53 (m, 2H), 2.98 (dd, J=11.5, 4.6 Hz, 2H), 1.52 (s, 18H), 1.23 (s, 18H), 0.99 (d, J=13.5 Hz, 2H), 0.65-0.53 (m, 2H), 0.51-0.44 (m, 2H), 0.31 (d, J=13.5 Hz, 2H). $^{19}$F NMR (470 MHz, Benzene-d$_6$) δ −130.09 (ddd, J=23.0, 10.6, 6.0 Hz), −131.00--131.79 (m), −160.31 (td, J=22.8, 6.5 Hz).

Example 48: Synthesis of bis-3,4,5-trifluoro-2-iodophenyl ether

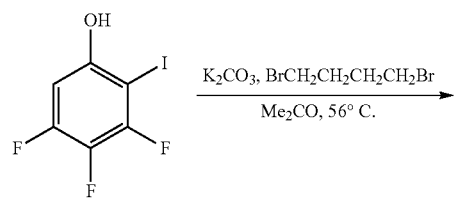

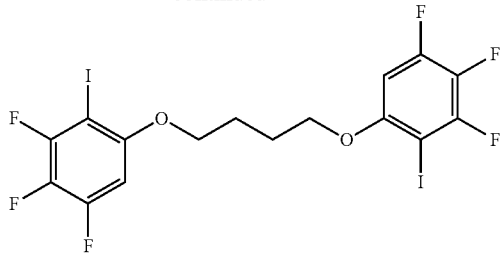

A white heterogeneous mixture of the iodophenol (5.444 g, 19.870 mmol, 2.00 eq), K$_2$CO$_3$ (8.238 g, 59.610 mmol, 6.00 eq), and 1,4-dibromobutane (1.10 mL, 9.935 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred vigorously (1000 rpm) for 5 mins, suction filtered over a pad of celite, rinsed with CH$_2$Cl$_2$ (3×25 mL), the resultant filtrate solution was concentrated onto celite, and purified via silica gel chromatography; 10% CH$_2$Cl$_2$ in hexanes-50% CH$_2$Cl$_2$ in hexanes to afford the bisiodophenyl ether as a white solid (5.086 g, mmol, 85%). NMR indicated product.

$^1$H NMR (500 MHz, Chloroform-d) δ 6.55 (ddd, J=11.8, 5.9, 2.3 Hz, 2H), 4.07 (h, J=2.6 Hz, 4H), 2.15-2.07 (m, 4H). $^{19}$F NMR (470 MHz, Chloroform-d) δ −111.26 (dd, J=23.3, 6.7 Hz), −132.95 (ddd, J=19.9, 11.8, 6.7 Hz), −166.63--167.33 (m). $^{13}$C NMR (126 MHz, Chloroform-d) δ 153.44 (m), 152.96-152.33 (m), 150.64 (m), 134.41 (ddd, J=248.0, 17.9, 15.8 Hz), 96.35 (dd, J=22.0, 2.8 Hz), 69.51, 25.75.

Example 49: Synthesis of 3,4,5-trifluoro-2-iodophenol

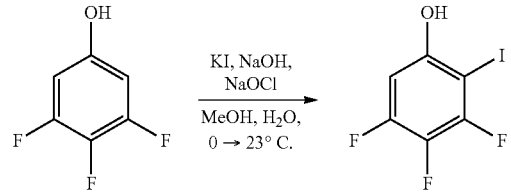 [SMILES: Oc1cc(F)c(F)c(F)c1 ; Oc1cc(F)c(F)c(F)c1I]

A clear colorless solution of the starting phenol (4.950 g, 33.428 mmol, 1.00 eq), KI (9.710 g, 58.500 mmol, 1.75 eq), and aqueous NaOH (100 mL, 100.30 mmol, 3.00 eq, 1 N) in methanol (150 mL) and water (200 mL) under nitrogen was placed in an ice bath and stirred vigorously (1000 rpm) for 1 hr, upon which precooled commercial aqueous bleach (84.0 mL, 58.500 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid NaH$_2$PO$_4$ (50 g) was added followed by a saturated aqueous mixture Na$_2$S$_2$O$_3$ (200 mL) to reduce residual iodine, water (100 mL) was added, the mixture was stirred vigorously for 10 mins, diluted with CH$_2$Cl$_2$ (50 mL), the biphasic yellow mixture was poured into a separatory funnel, partitioned, organics were washed with aqueous Na$_2$S$_2$O$_3$ (2×100 mL), residual organics were extracted from the aqueous layer using CH$_2$Cl$_2$ (2×25 mL), combined, dried over solid Na$_2$SO$_4$, decanted, and concentrated onto celite, and purified via silica gel chromatography; hexanes-50% CH$_2$Cl$_2$ in hexanes to afford the o-iodophenol as a clear colorless oil (5.444 g, 19.870 mmol, 60%). NMR indicated pure product.

$^1$H NMR (400 MHz, Chloroform-d) δ 6.80-6.63 (m, 1H), 5.33 (s, 1H). $^{19}$F NMR (376 MHz, Chloroform-d) δ −112.07 (ddd, J=22.3, 6.8, 2.6 Hz), −132.68 (ddd, J=21.1, 11.1, 6.8 Hz), −166.81 (td, J=21.7, 6.2 Hz). $^{13}$C NMR (101 MHz, Chloroform-d) δ 153.58-151.73 (m), 150.78 (dd, J=10.8, 5.5 Hz), 151.07-149.29 (m), 136.06-132.30 (m), 98.90 (ddd, J=21.8, 3.2, 1.3 Hz), 68.51 (d, J=26.4 Hz).

Example 50: Synthesis of Ligand 12

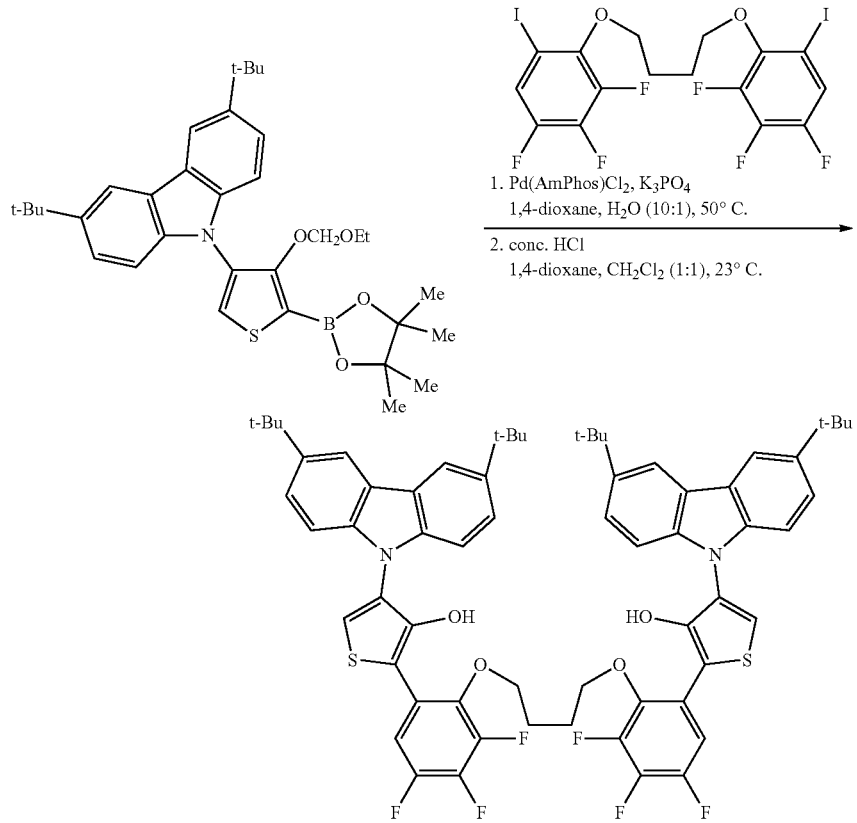

A mixture of the thiophene boropinacolate ester (1.000 g, 1.104 mmol, 2.70 eq, 62% pure by NMR), K$_3$PO$_4$ (0.703 g, 3.312 mmol, 8.10 eq), Pd(AmPhos)Cl$_2$ (58.0 mg, 0.0818 mmol, 0.20 eq), and the bisphenyliodide (0.246 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-60% CH$_2$Cl$_2$ in hexanes to afford the impure bisthiophene as a golden yellow foam (0.202 g). NMR indicated product which contained impurities. The impure material was used in the subsequent reaction.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a white foam (0.141 g, 0.1280 mmol, 31% two steps). NMR indicated pure product.

$^1$H NMR (500 MHz, Chloroform-d) δ 8.16-8.12 (m, 4H), 7.43 (ddd, J=8.7, 1.9, 0.9 Hz, 4H), 7.38 (d, J=0.9 Hz, 2H), 7.35 (ddd, J=10.6, 7.9, 2.1 Hz, 2H), 7.20 (d, J=8.6 Hz, 4H), 6.96 (d, J=1.5 Hz, 2H), 4.15-4.05 (m, 4H), 1.91 (q, J=3.2, 2.8 Hz, 4H), 1.45 (s, 36H). $^{19}$F NMR (470 MHz, Chloroform-d) δ −137.56 (ddd, J=21.7, 11.4, 3.9 Hz), −147.93 (d, J=19.3 Hz), −157.70 (td, J=20.7, 8.1 Hz). $^{13}$C NMR (126 MHz, Chloroform-d) δ 148.89-146.76 (m), 147.27, 146.77-144.58 (m), 143.19, 139.52 (ddd, J=254.7, 16.3, 14.1 Hz), 139.36, 139.25 (dd, J=10.1, 3.5 Hz), 127.64, 123.67, 123.38, 123.03 (dd, J=8.0, 3.0 Hz), 121.41, 116.39, 111.90, 111.46-111.11 (m), 109.34, 75.47 (d, J=3.5 Hz), 34.72, 31.98, 26.07.

Example 51: Synthesis of Procatalyst 23

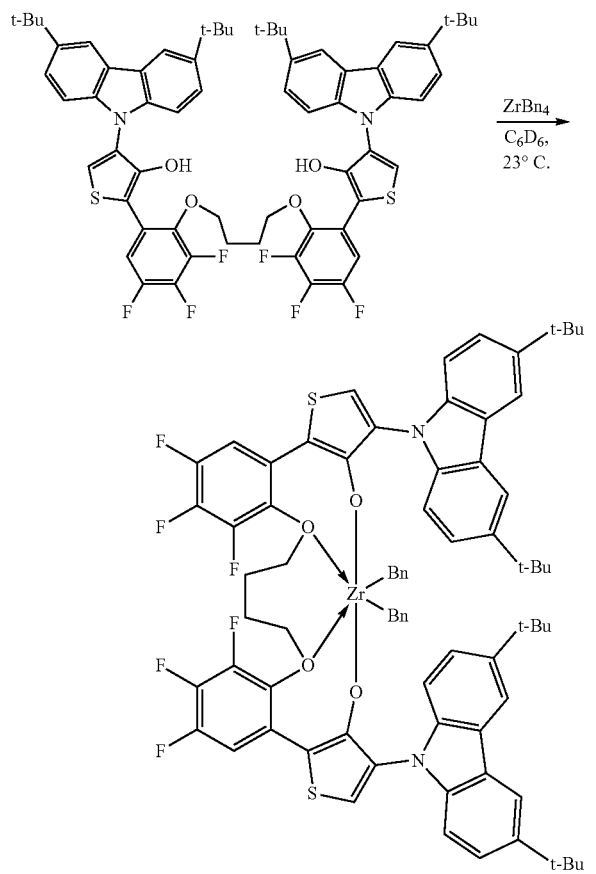

The thiophene ligand was azeotropically dried using PhMe (4×10 mL) prior to use. To a clear colorless solution of the thiophene (7.4 mg, 6.72 μmol, 1.00 eq) in anhydrous $C_6D_6$ (2.42 mL) in a nitrogen filled glovebox at 23° C. was added a solution of $ZrBn_4$ (3.4 mg, 7.39 μmol, 1.10 eq) in $C_6D_6$ (0.27 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (400 MHz, Benzene-$d_6$) δ 8.52-8.49 (m, 2H), 8.33 (dd, J=1.9, 0.7 Hz, 2H), 7.62 (dd, J=8.6, 1.9 Hz, 2H), 7.54 (dd, J=8.6, 0.7 Hz, 2H), 7.49 (dd, J=8.7, 1.9 Hz, 2H), 7.37 (dd, J=8.6, 0.6 Hz, 2H), 6.91-6.86 (m, 2H), 6.83 (s, 2H), 6.70 (t, J=7.3 Hz, 2H), 6.57-6.47 (m, 2H), 6.17-6.13 (m, 4H), 5.60-5.55 (m, 2H), 4.02-3.91 (m, 2H), 3.23-3.12 (m, 2H), 1.58 (s, 18H), 1.29 (s, 18H), 1.06 (d, J=11.5 Hz, 2H), 0.90-0.73 (m, 2H), 0.65-0.58 (m, 2H). $^{19}$F NMR (376 MHz, Benzene-$d_6$) δ −135.52 (ddd, J=22.5, 10.7, 6.3 Hz), −141.09 (d, J=20.9 Hz), −155.07 (td, J=21.2, 7.9 Hz).

Example 52: Synthesis of Procatalyst 24

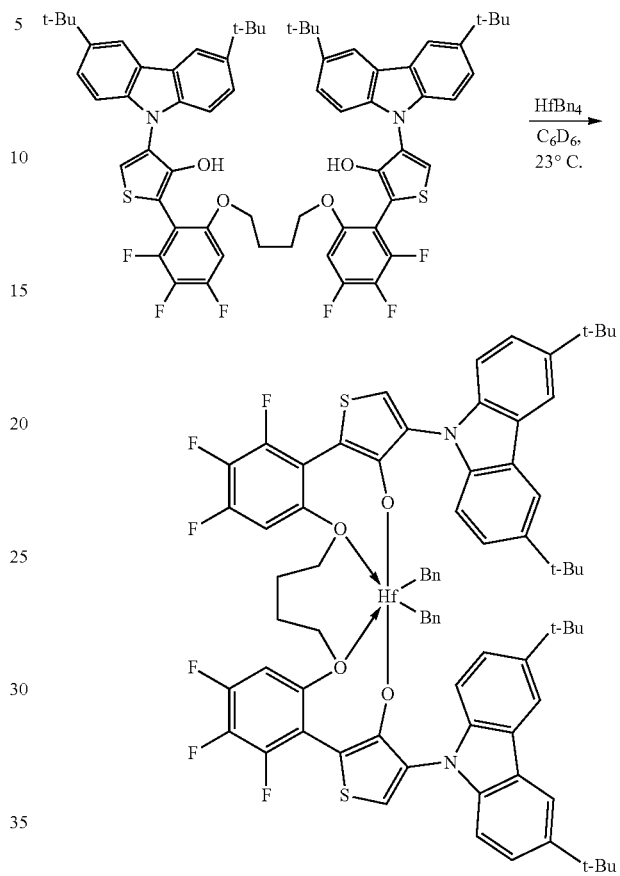

The thiophene ligand was azeotropically dried using PhMe (4×10 mL) prior to use. To a clear colorless solution of the thiophene (8.8 mg, 7.99 μmol, 1.00 eq) in anhydrous $C_6D_6$ (2.82 mL) in a nitrogen filled glovebox at 23° C. was added a solution of $HfBn_4$ (4.8 mg, 8.79 μmol, 1.10 eq) in $C_6D_6$ (0.38 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (400 MHz, Benzene-$d_6$) δ 8.53 (dd, J=2.0, 0.6 Hz, 2H), 8.32 (t, J=1.3 Hz, 2H), 7.61 (dd, J=8.5, 1.9 Hz, 2H), 7.48-7.45 (m, 2H), 7.35 (dd, J=8.5, 0.6 Hz, 2H), 6.98-6.93 (m, 6H), 6.83 (s, 2H), 6.74-6.66 (m, 2H), 6.57-6.49 (m, 2H), 6.25-6.19 (m, 4H), 6.08-5.98 (m, 2H), 4.00-3.91 (m, 2H), 3.20-3.11 (m, 2H), 1.58 (s, 18H), 1.32-1.27 (m, 2H), 1.28 (s, 18H), 0.83-0.76 (m, 2H), 0.76-0.68 (m, 2H), 0.58-0.46 (m, 2H). $^{19}$F NMR (376 MHz, Benzene-$d_6$) δ −134.93 (ddd, J=22.5, 10.5, 6.5 Hz), −140.74 (d, J=19.9 Hz), −154.84 (td, J=21.4, 7.9 Hz).

Example 53: Synthesis of bis-4,5,6-trifluoro-2-iodophenyl ether

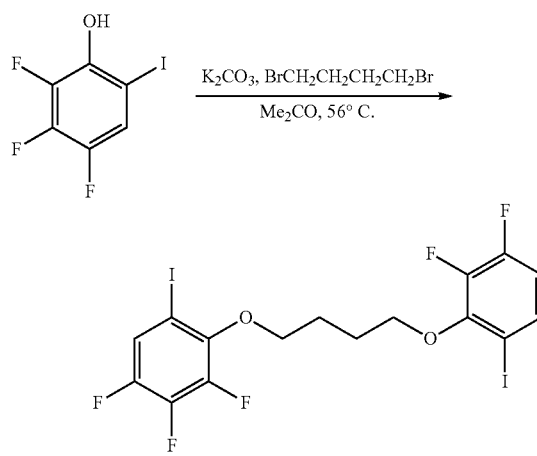

A white heterogeneous mixture of the iodophenol (1.550 g, 5.657 mmol, 2.00 eq), K₂CO₃ (2.346 g, 16.972 mmol, 6.00 eq), and 1,4-dibromobutane (0.34 mL, 2.829 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH₂Cl₂ (50 mL), stirred vigorously (1000 rpm) for 5 mins, suction filtered over a pad of celite, rinsed with CH₂Cl₂ (3×25 mL), the resultant filtrate solution was concentrated onto celite, and purified via silica gel chromatography; 10% CH₂Cl₂ in hexanes-50% CH₂Cl₂ in hexanes to afford the bisiodophenyl ether as a white solid (1.410 g, 2.342 mmol, 83%). NMR indicated product.

¹H NMR (400 MHz, Chloroform-d) δ 7.38 (td, J=8.5, 2.6 Hz, 2H), 4.20-4.09 (m, 4H), 2.09 (h, J=2.7 Hz, 4H). ¹⁹F NMR (376 MHz, Chloroform-d) δ −138.88 (ddd, J=20.5, 9.0, 3.2 Hz), −146.39 (dt, J=19.7, 2.8 Hz), −155.64 (td, J=20.0, 7.9 Hz). ¹³C NMR (126 MHz, Chloroform-d) δ 147.31 (ddd, J=250.6, 10.6, 2.7 Hz), 144.51 (dd, J=10.0, 3.9 Hz), 144.51 (ddd, J=254.7, 11.0, 4.1 Hz), 140.78 (ddd, J=254.1, 16.0, 14.1 Hz), 120.35 (dd, J=20.2, 3.7 Hz), 82.83 (dd, J=7.7, 4.2 Hz), 74.23 (d, J=4.5 Hz), 26.72.

Example 54: Synthesis of 4,5,6-trifluoro-2-iodophenyl ether

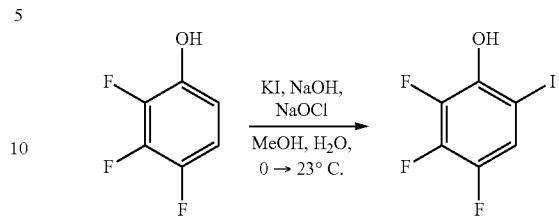

A clear colorless solution of the starting phenol (4.700 g, 31.740 mmol, 1.00 eq), KI (9.221 g, 55.544 mmol, 1.75 eq), and aqueous NaOH (95.2 mL, 95.208 mmol, 3.00 eq, 1 N) in methanol (200 mL) and water (100 mL) under nitrogen was placed in an ice bath and stirred vigorously (1000 rpm) for 1 hr, upon which precooled commercial aqueous bleach (80.0 mL, 55.544 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid KH₂PO₄ (25 g) was added followed by a saturated aqueous mixture Na₂S₂O₃ (100 mL) to reduce residual iodine, water (100 mL) was added, the mixture was stirred vigorously for 10 mins, diluted with CH₂Cl₂ (50 mL), the biphasic yellow mixture was poured into a separatory funnel, partitioned, organics were washed with aqueous Na₂S₂O₃ (2×50 mL), residual organics were extracted from the aqueous layer using CH₂Cl₂ (2×25 mL), combined, dried over solid Na₂SO₄, decanted, and concentrated onto celite, and purified via silica gel chromatography; hexanes-50% CH₂Cl₂ in hexanes to afford the o-iodophenol as a clear pale yellow oil (4.202 g, 15.337 mmol, 48%). NMR indicated pure product.

¹H NMR (400 MHz, Chloroform-d) δ 7.33 (tdd, J=8.8, 2.7, 0.9 Hz, 1H), 5.37 (s, 1H). ¹⁹F NMR (376 MHz, Chloroform-d) δ −143.20 (ddd, J=21.0, 9.5, 3.8 Hz), −152.54 (dt, J=19.4, 3.4 Hz), −156.04 (td, J=20.0, 7.6 Hz). ¹³C NMR (101 MHz, Chloroform-d) δ 145.31 (ddd, J=247.4, 10.7, 2.4 Hz), 142.06-141.31 (m), 139.45 (ddd, J=249.4, 12.7, 3.8 Hz), 139.64-139.11 (m), 119.82 (dd, J=20.6, 4.1 Hz), 75.21 (dd, J=8.0, 4.6 Hz).

Example 55: Synthesis of Ligand 13

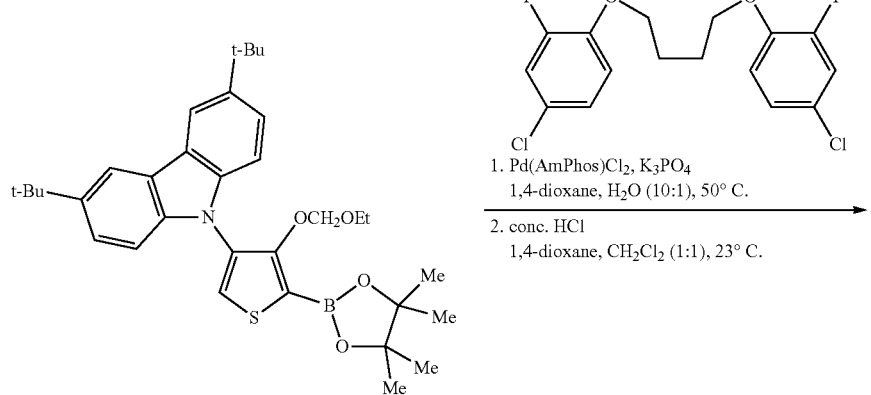

-continued

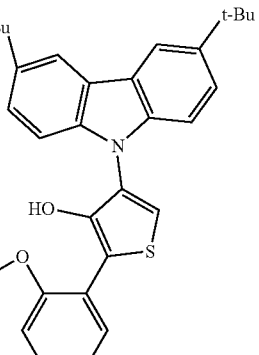

A mixture of the thiophene boropinacolate ester (1.000 g, 1.104 mmol, 2.70 eq, 62% pure by NMR), K$_3$PO$_4$ (0.703 g, 3.312 mmol, 8.10 eq), Pd(AmPhos)Cl$_2$ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-75% CH$_2$Cl$_2$ in hexanes to afford the impure bisthiophene as a pale red amorphous foam (0.232 g). NMR indicated product which contained impurities. The impure material was used in the subsequent reaction.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a white foam (0.143 g, 0.1346 mmol, 33% two steps). NMR indicated pure product.

$^1$H NMR (500 MHz, Chloroform-d) δ 8.15 (dd, J=1.9, 0.6 Hz, 4H), 7.66 (d, J=2.6 Hz, 2H), 7.42 (dd, J=8.6, 1.9 Hz, 4H), 7.35 (s, 2H), 7.24-7.20 (m, 4H), 7.18 (dd, J=8.7, 2.6 Hz, 2H), 7.04 (s, 2H), 6.79 (d, J=8.8 Hz, 2H), 4.04 (q, J=3.6, 2.8 Hz, 4H), 1.91 (q, J=2.8, 2.4 Hz, 4H), 1.47 (s, 36H). $^{13}$C NMR (126 MHz, Chloroform-d) δ 152.34, 146.98, 142.94, 139.54, 129.92, 128.19, 127.84, 127.46, 124.63, 123.58, 123.27, 120.85, 116.30, 115.08, 113.72, 109.51, 70.29, 34.74, 32.05, 25.81.

Example 56: Synthesis of Procatalyst 25

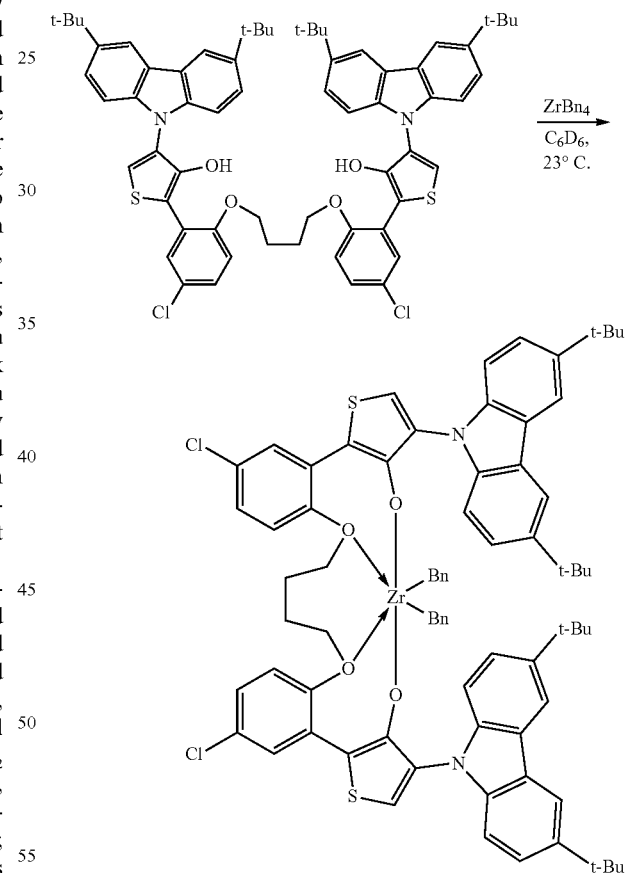

The thiophene ligand was azeotropically dried using PhMe (4×10 mL) prior to use. To a clear colorless solution of the thiophene (9.2 mg, 8.66 μmol, 1.00 eq) in anhydrous C$_6$D$_6$ (1.55 mL) in a nitrogen filled glovebox at 23° C. was added a solution of ZrBn$_4$ (4.3 mg, 9.53 μmol, 1.10 eq) in C$_6$D$_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in C$_6$D$_6$. NMR indicated product. The same procedure can be used with PhMe as the solvent to prepare the procatalyst solution (0.0025 M or 0.005 M) which is used directly after filtration for the polymerization experiments.

$^{1}$H NMR (500 MHz, Benzene-$d_6$) δ 8.43 (dd, J=2.0, 0.6 Hz, 2H), 8.29 (dd, J=1.9, 0.6 Hz, 2H), 7.53-7.48 (m, 4H), 7.45 (dd, J=8.5, 1.9 Hz, 2H), 7.34 (dd, J=8.7, 0.6 Hz, 2H), 7.31 (d, J=2.6 Hz, 2H), 7.22-7.19 (m, 2H), 6.91-6.86 (m, 2H), 6.83 (dd, J=8.7, 2.7 Hz, 2H), 6.81 (s, 2H), 6.79-6.74 (m, 2H), 6.24-6.19 (m, 4H), 4.98 (d, J=8.7 Hz, 2H), 3.88-3.78 (m, 2H), 3.12 (dd, J=11.9, 4.7 Hz, 2H), 1.44 (s, 18H), 1.29 (s, 18H), 0.98 (d, J=12.3 Hz, 2H), 0.71-0.64 (m, 2H), 0.53 (d, J=12.3 Hz, 2H), 0.53-0.47 (m, 2H). $^{13}$C NMR (126 MHz, Benzene-$d_6$) δ 154.32, 152.71, 146.13, 143.43, 143.02, 139.29, 139.12, 131.33, 130.56, 130.43, 129.56, 128.90, 128.33, 126.54, 126.07, 125.16, 124.69, 124.51, 124.12, 122.73, 122.43, 121.25, 118.17, 116.44, 115.69, 115.54, 112.22, 108.73, 74.66, 72.01, 34.54, 34.46, 31.94, 31.71, 25.77.

Example 57: Synthesis of Procatalyst 26

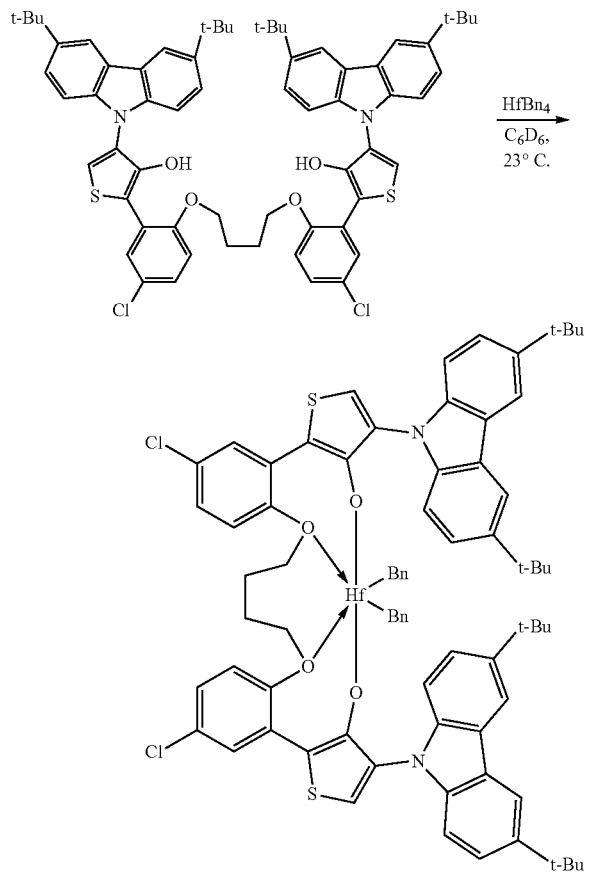

The thiophene ligand was azeotropically dried using PhMe (4×10 mL) prior to use. To a clear colorless solution of the thiophene (6.8 mg, 6.40 µmol, 1.00 eq) in anhydrous $C_6D_6$ (1.12 mL) in a nitrogen filled glovebox at 23° C. was added a solution of HfBn$_4$ (3.8 mg, 7.04 µmol, 1.10 eq) in $C_6D_6$ (0.16 mL) in a dropwise manner. After stirring (500 rpm) for 30 mins the pale golden yellow solution was filtered using a 0.20 µm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^{1}$H NMR (400 MHz, Benzene-$d_6$) δ 8.43 (d, J=1.9 Hz, 2H), 8.28 (d, J=1.8 Hz, 2H), 7.49 (dd, J=8.7, 1.9 Hz, 2H), 7.43 (dd, J=8.6, 2.0 Hz, 2H), 7.31 (d, J=2.6 Hz, 2H), 7.24 (d, J=8.7 Hz, 2H), 7.17 (d, J=8.6 Hz, 2H), 6.98-6.93 (m, 2H), 6.92-6.87 (m, 2H), 6.83 (dd, J=8.8, 2.7 Hz, 2H), 6.79 (s, 2H), 6.73 (tt, J=7.3, 1.3 Hz, 2H), 6.27-6.22 (m, 4H), 4.96 (d, J=8.8 Hz, 2H), 3.88-3.76 (t, J=10.8 Hz, 2H), 3.19-3.06 (m, 2H), 1.43 (s, 18H), 1.28 (s, 18H), 0.89 (d, J=13.4 Hz, 2H), 0.70-0.57 (m, 2H), 0.47-0.36 (m, 2H), 0.27-0.20 (m, 2H). $^{13}$C NMR (101 MHz, Benzene-$d_6$) δ 153.93, 152.73, 147.19, 143.50, 143.04, 139.24, 139.01, 138.50, 131.61, 130.40, 129.58, 129.05, 128.32, 126.62, 124.98, 124.56, 124.34, 122.64, 122.33, 121.16, 118.13, 116.39, 115.56, 114.96, 112.37, 108.72, 82.98, 78.97, 34.53, 34.45, 31.93, 31.70, 25.93.

Example 58: Synthesis of bis-4-chloro-2-iodophenyl ether

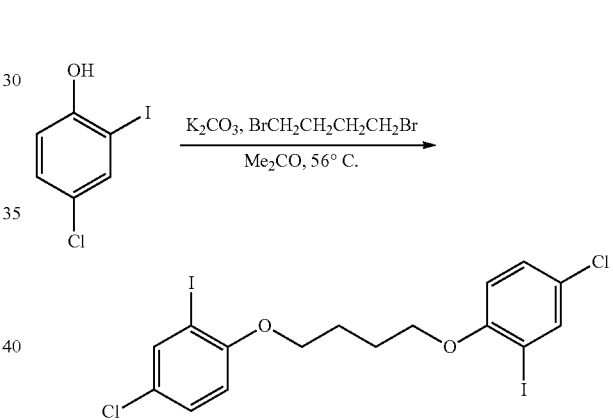

A white heterogeneous mixture of the iodophenol (1.604 g, 6.303 mmol, 2.00 eq), $K_2CO_3$ (2.613 g, 18.909 mmol, 6.00 eq), and 1,4-dibromobutane (0.38 mL, 3.151 mmol, 1.00 eq) in acetone (60 mL) equipped with a reflux condenser under nitrogen was placed in a mantle heated to 60° C., after stirring (500 rpm) for 48 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (1.712 g, 3.041 mmol, 97%). NMR indicated product.

$^{1}$H NMR (500 MHz, Chloroform-d) δ 7.73 (d, J=2.5 Hz, 2H), 7.27-7.23 (m, 2H), 6.73 (d, J=8.8 Hz, 2H), 4.14-4.04 (m, 4H), 2.10 (h, J=2.4 Hz, 4H). $^{13}$C NMR (126 MHz, Chloroform-d) δ 156.29, 138.50, 129.17, 126.28, 112.40, 86.72, 69.01, 25.92.

Example 59: Synthesis of Ligand 14

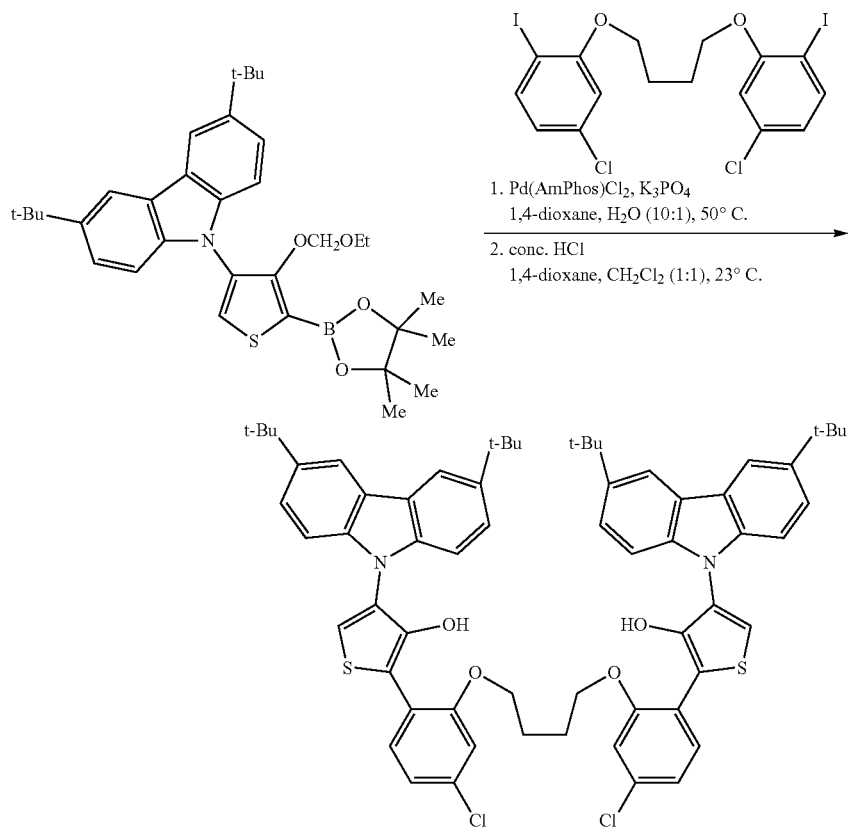

A mixture of the thiophene boropinacolate ester (1.000 g, 1.104 mmol, 2.70 eq, 62% pure by NMR), K₃PO₄ (0.703 g, 3.312 mmol, 8.10 eq), Pd(AmPhos)Cl₂ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-75% CH₂Cl₂ in hexanes to afford the impure bisthiophene as a pale red amorphous foam (0.161 g). NMR indicated product which contained impurities. The impure material was used in the subsequent reaction.

To a solution of the impure coupled product in CH₂Cl₂-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a white solid (0.121 g, 0.1139 mmol, 24% two steps). NMR indicated pure product.

¹H NMR (500 MHz, Chloroform-d) δ 8.13 (d, J=1.9 Hz, 4H), 7.60 (d, J=8.3 Hz, 2H), 7.39 (dd, J=8.6, 1.9 Hz, 4H), 7.31 (s, 2H), 7.20 (d, J=8.6 Hz, 4H), 7.10 (dd, J=8.4, 2.0 Hz, 2H), 6.94 (d, J=2.0 Hz, 2H), 6.70 (s, 2H), 4.09-4.02 (m, 4H), 1.99-1.90 (m, 4H), 1.44 (s, 36H). ¹³C NMR (126 MHz, Chloroform-d) δ 154.27, 146.45, 142.91, 139.52, 133.98, 131.08, 127.26, 123.54, 123.24, 122.78, 121.45, 120.37, 116.29, 114.09, 114.02, 109.48, 69.93, 34.70, 32.01, 25.84.

Example 60: Synthesis of Procatalyst 27

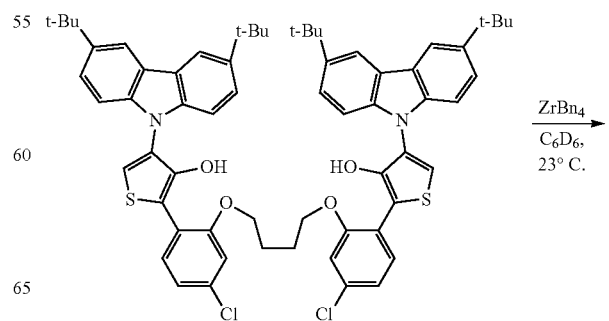

105

-continued

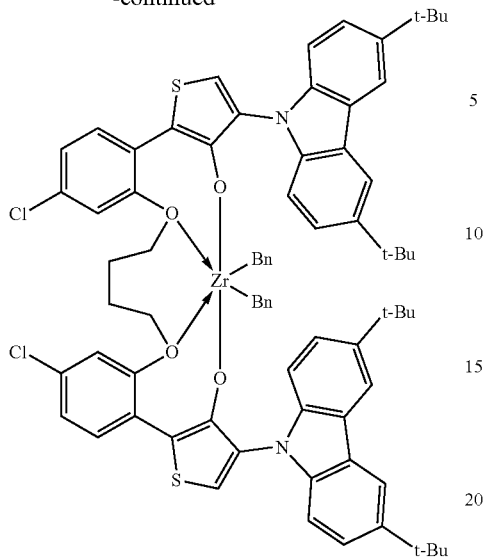

The thiophene ligand was azeotropically dried using PhMe (4×10 mL) prior to use. To a clear colorless solution of the thiophene (10.7 mg, 10.10 μmol, 1.00 eq) in anhydrous $C_6D_6$ (1.82 mL) in a nitrogen filled glovebox at 23° C. was added a solution of $ZrBn_4$ (5.0 mg, 11.10 μmol, 1.10 eq) in $C_6D_6$ (0.20 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.51-8.44 (m, 4H), 8.35-8.26 (m, 2H), 7.63-7.54 (m, 4H), 7.29-7.26 (m, 2H), 7.14 (d, J=8.3 Hz, 2H), 6.94 (s, 2H), 6.91 (dd, J=8.3, 2.1 Hz, 2H), 6.85-6.77 (m, 4H), 6.51-6.48 (m, 4H), 6.40-6.32 (m, 2H), 5.86 (d, J=2.1 Hz, 2H), 3.48-3.38 (m, 2H), 3.32 (m, 2H), 1.73 (d, J=13.1 Hz, 2H), 1.33 (s, 18H), 1.23 (s, 18H), 1.03-0.96 (m, 2H), 0.92-0.79 (m, 2H), 0.50 (d, J=13.1 Hz, 2H). $^{13}$C NMR (126 MHz, Benzene-$d_6$) δ 152.92, 151.61, 146.86, 146.45, 143.89, 143.60, 143.13, 142.96, 140.01, 138.84, 138.68, 134.86, 130.56, 126.63, 126.27, 124.11, 123.99, 123.63, 123.00, 122.36, 121.39, 116.78, 115.97, 75.66, 72.03, 34.54, 34.50, 34.47, 34.41, 31.82, 31.69.

Example 61: Synthesis of Procatalyst 28

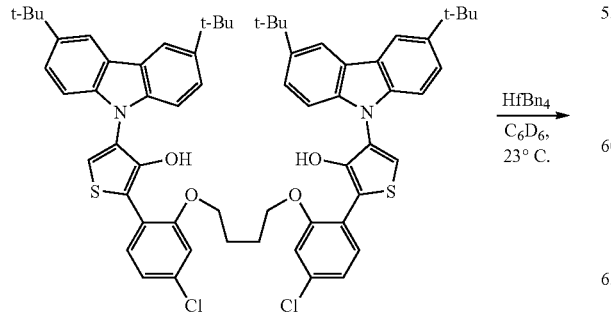

106

-continued

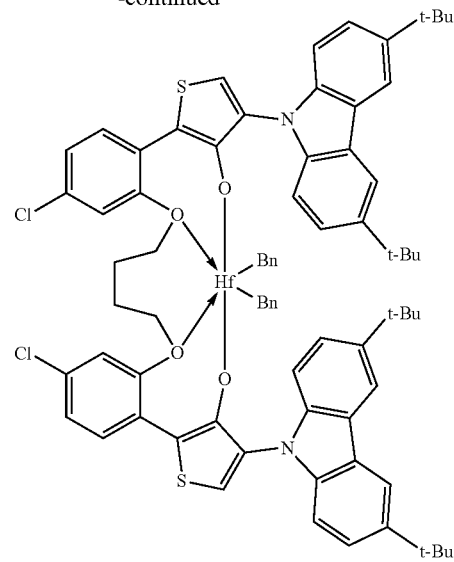

The thiophene ligand was azeotropically dried using PhMe (4×10 mL) prior to use. To a clear colorless solution of the thiophene (12.0 mg, 11.30 μmol, 1.00 eq) in anhydrous $C_6D_6$ (1.99 mL) in a nitrogen filled glovebox at 23° C. was added a solution of $HfBn_4$ (6.8 mg, 12.43 μmol, 1.10 eq) in $C_6D_6$ (0.27 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.57 (d, J=1.9 Hz, 2H), 8.43-8.38 (m, 2H), 7.60-7.43 (m, 4H), 7.18 (d, J=8.6 Hz, 2H), 6.96 (ddq, J=7.4, 1.4, 0.7 Hz, 4H), 6.91-6.85 (m, 2H), 6.81 (s, 2H), 6.82-6.79 (m, 2H), 6.75 (tt, J=7.3, 1.2 Hz, 2H), 6.66 (dd, J=8.4, 2.1 Hz, 2H), 6.50-6.45 (m, 4H), 5.54 (d, J=2.1 Hz, 2H), 3.66-3.53 (m, 2H), 2.90-2.83 (m, 2H), 1.33 (s, 18H), 1.22 (s, 18H), 1.05 (dd, J=13.4, 5.9 Hz, 2H), 0.91-0.71 (m, 2H), 0.55-0.40 (m, 2H), 0.34 (d, J=13.6 Hz, 2H).

Example 62: Synthesis of bis-5-chloro-2-iodophenyl ether

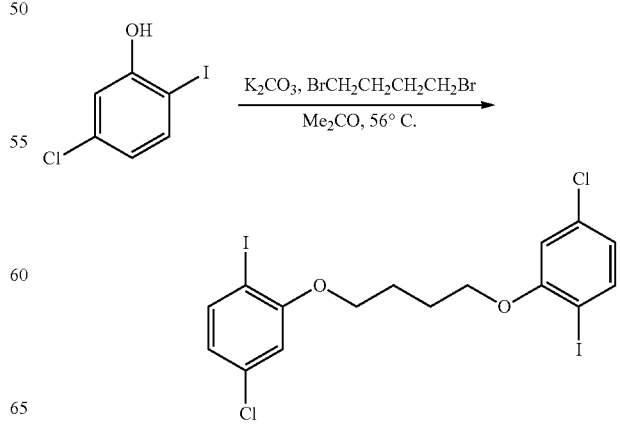

A white heterogeneous mixture of the iodophenol (2.475 g, 9.727 mmol, 2.00 eq), K$_2$CO$_3$ (4.033 g, 29.180 mmol, 6.00 eq), and 1,4-dibromobutane (0.58 mL, 4.864 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred vigorously (1000 rpm) for 5 mins, suction filtered over a pad of celite, rinsed with CH$_2$Cl$_2$ (3×25 mL), the resultant filtrate solution was concentrated onto celite, and purified via silica gel chromatography; 10% CH$_2$Cl$_2$ in hexanes-50% CH$_2$Cl$_2$ in hexanes to afford the bisiodophenyl ether as a white solid (2.456 g, 4.362 mmol, 90%). NMR indicated product.

$^1$H NMR (400 MHz, Chloroform-d) δ 7.64 (d, J=8.3 Hz, 2H), 6.79 (d, J=2.2 Hz, 2H), 6.70 (dd, J=8.3, 2.2 Hz, 2H), 4.16-4.03 (m, 4H), 2.15-2.04 (m, 4H). $^{13}$C NMR (101 MHz, Chloroform-d) δ 158.00, 139.68, 135.13, 122.49, 112.66, 83.83, 68.90, 25.86.

Example 63: Synthesis of Ligand 15 was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-100% CH$_2$Cl$_2$ in hexanes to afford the impure bisthiophene as a pale red amorphous foam (0.271 g). NMR indicated product which contained impurities. The impure material was used in the subsequent reaction.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$

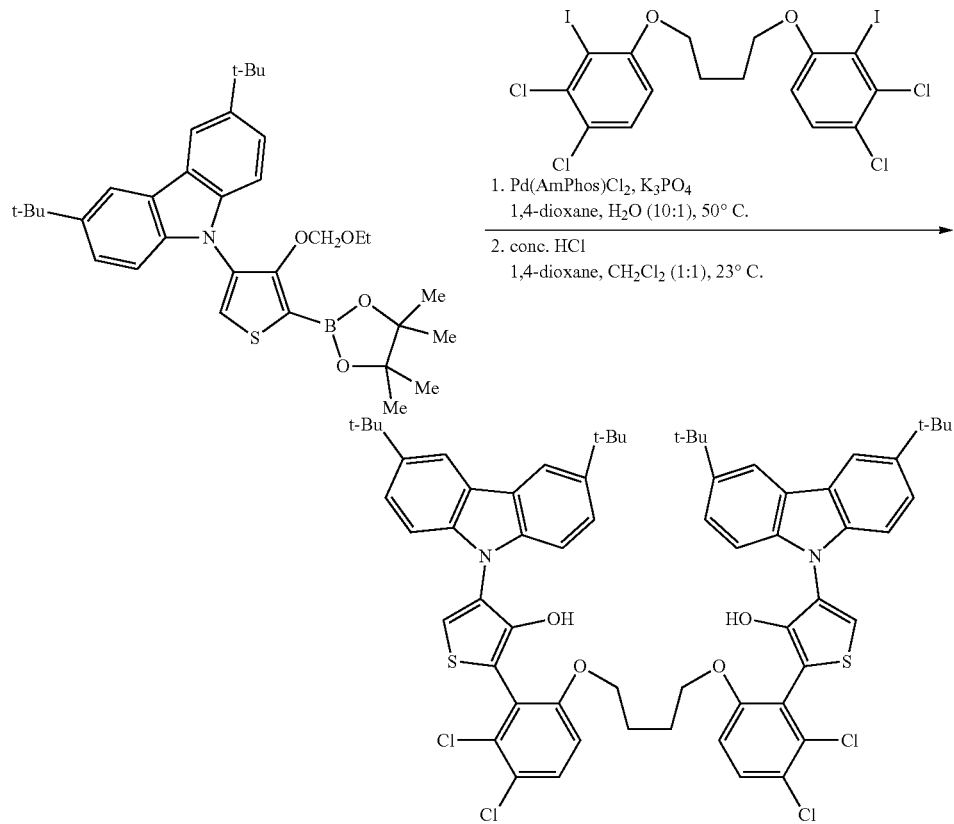

A mixture of the thiophene boropinacolate ester (1.000 g, 1.104 mmol, 2.70 eq, 62% pure by NMR), K$_3$PO$_4$ (0.703 g, 3.312 mmol, 8.10 eq), Pd(AmPhos)Cl$_2$ (58.0 mg, 0.0818 mmol, 0.20 eq), and the bisphenyliodide (0.258 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture (2×10 mL), combined, dried over solid Na$_2$SO$_4$, decanted, concentrated onto celite, and purified via silica gel chromatography via an ISCO chromatography purification system; 25%-100% CH$_2$Cl$_2$ in hexanes to afford the bisthiophene as a white solid (0.126 g, 0.1114 mmol, 27% two steps). NMR indicated pure product.

$^1$H NMR (500 MHz, Chloroform-d) δ 8.13 (d, J=1.9 Hz, 4H), 7.41 (h, J=8.6, 7.4 Hz, 4H), 7.37 (s, 2H), 7.27 (d, J=9.4 Hz, 2H), 7.22 (d, J=8.6 Hz, 4H), 6.64 (d, J=9.0 Hz, 2H), 4.84 (s, 2H), 3.95-3.85 (m, 4H), 1.81-1.73 (m, 4H), 1.44 (s, 36H).

$^{13}$C NMR (126 MHz, Chloroform-d) δ 156.55, 146.38, 143.30, 139.26, 134.56, 130.70, 125.87, 125.62, 123.84, 123.40, 122.00, 120.38, 116.38, 111.87, 111.71, 109.32, 69.13, 34.74, 32.00, 25.74.

Example 64: Synthesis of Procatalyst 29

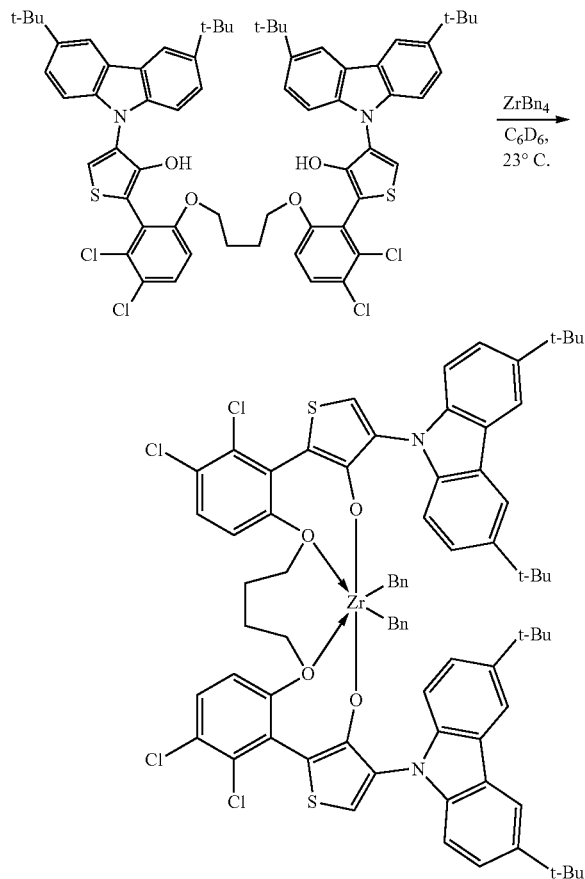

The thiophene ligand was azeotropically dried using PhMe (4×10 mL) prior to use. To a clear colorless solution of the thiophene (10.3 mg, 9.11 μmol, 1.00 eq) in anhydrous C$_6$D$_6$ (1.64 mL) in a nitrogen filled glovebox at 23° C. was added a solution of ZrBn$_4$ (4.6 mg, 10.02 μmol, 1.10 eq) in C$_6$D$_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in C$_6$D$_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-d$_6$) δ 8.42 (d, J=1.9 Hz, 2H), 8.26 (d, J=1.9 Hz, 2H), 7.47 (ddd, J=8.5, 6.3, 1.9 Hz, 2H), 7.38 (d, J=8.7 Hz, 2H), 7.25 (d, J=8.5 Hz, 2H), 6.99-6.95 (m, 6H), 6.94 (s, 2H), 6.86 (d, J=8.8 Hz, 2H), 6.80 (d, J=7.4 Hz, 2H), 6.37-6.32 (m, 2H), 6.09 (m, 2H), 4.91 (d, J=8.8 Hz, 2H), 3.79 (t, J=10.1 Hz, 2H), 3.20-3.13 (m, 2H), 1.47 (s, 18H), 1.27 (s, 18H), 0.95-0.78 (m, 2H), 0.73 (d, J=11.6 Hz, 2H), 0.63-0.55 (m, 2H), 0.35 (d, J=11.7 Hz, 2H).

Example 65: Synthesis of Procatalyst 30

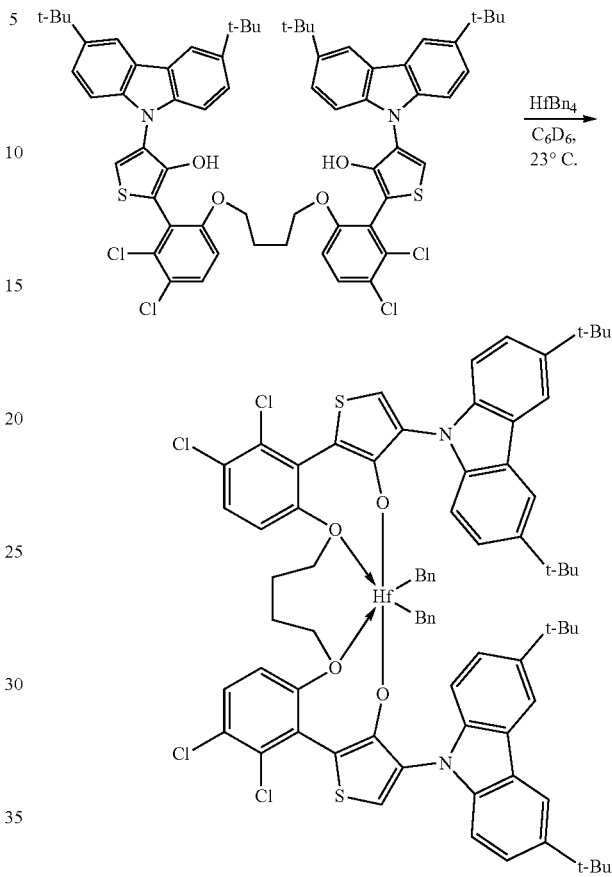

The thiophene ligand was azeotropically dried using PhMe (4×10 mL) prior to use. To a clear colorless solution of the thiophene (7.6 mg, 6.72 μmol, 1.00 eq) in anhydrous C$_6$D$_6$ (1.18 mL) in a nitrogen filled glovebox at 23° C. was added a solution of HfBn$_4$ (4.0 mg, 7.40 μmol, 1.10 eq) in C$_6$D$_6$ (0.16 mL) in a dropwise manner. After stirring (500 rpm) for 30 mins the pale golden yellow solution was filtered using a 0.20 μm PTFE submicron filter to afford the hafnium complex as a 0.005 M solution in C$_6$D$_6$. NMR indicated product which exists as a complex rotomeric mixture. The same procedure can be used with PhMe as the solvent to prepare the procatalyst solution (0.005 M) which is used directly after filtration for the polymerization experiments.

Example 66: Synthesis of bis-3,4-dichloro-2-iodophenyl ether

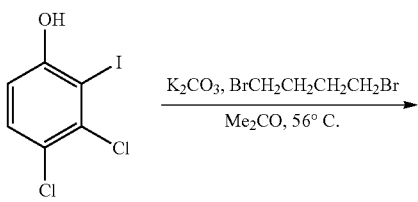

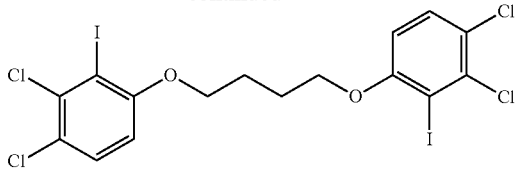

A white heterogeneous mixture of the iodophenol (4.112 g, 14.234 mmol, 2.20 eq), $K_2CO_3$ (5.902 g, 42.702 mmol, 6.60 eq), and 1,4-dibromobutane (0.77 mL, 6.470 mmol, 1.00 eq) in acetone (65 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2Cl_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (3.813 g, 6.034 mmol, 93%). NMR (at 60° C. and 100° C.) indicated product.

VT NMR @ 60° C.:
$^1$H NMR (400 MHz, Chloroform-d) δ 7.38 (d, J=8.8 Hz, 2H), 6.65 (d, J=8.9 Hz, 2H), 4.11 (q, J=4.3, 3.2 Hz, 4H), 2.11 (dt, J=5.4, 3.3 Hz, 4H).

VT NMR @ 100° C.:
$^1$H NMR (400 MHz, DMSO-$d_6$) δ 7.54 (dd, J=8.9, 1.5 Hz, 2H), 6.96 (dd, J=8.9, 1.8 Hz, 2H), 4.16 (ddt, J=5.9, 3.6, 2.2 Hz, 4H), 1.97 (dq, J=5.9, 2.6 Hz, 4H). $^{13}$C NMR (101 MHz, DMSO-$d_6$) δ 158.69, 136.57, 130.92, 130.75, 123.17, 93.97, 70.20, 25.87.

Example 67: Synthesis of bis-4,5-dichloro-2-iodophenyl ether

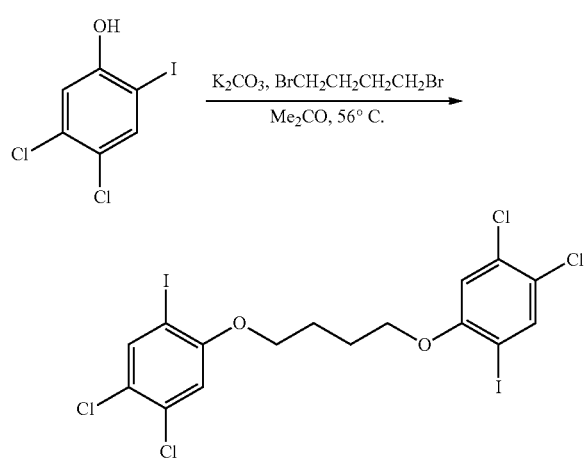

A white heterogeneous mixture of the iodophenol (2.454 g, 8.494 mmol, 2.00 eq), $K_2CO_3$ (3.522 g, 25.483 mmol, 6.00 eq), and 1,4-dibromobutane (0.50 mL, 4.247 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2Cl_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (2.272 g, 3.596 mmol, 85%). NMR (at 55° C.) indicated product.

NMR Spectra attained at 55° C.:
$^1$H NMR (500 MHz, Chloroform-d) δ 7.80 (s, 2H), 6.88 (s, 2H), 4.12 (qd, J=5.6, 3.7, 3.3 Hz, 4H), 2.11 (dq, J=5.7, 2.9 Hz, 4H). $^{13}$C NMR (126 MHz, Chloroform-d) δ 156.81, 139.43, 133.07, 125.07, 113.61, 84.17, 69.50, 25.82.

Example 68: Synthesis of 4,5-dichloro-2-iodophenol & 3,4-dichloro-2-iodophenol

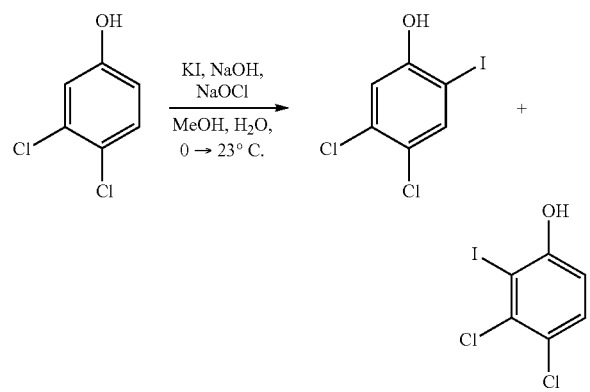

A clear colorless solution of the starting phenol (5.020 g, 30.798 mmol, 1.00 eq), KI (8.947 g, 53.896 mmol, 1.75 eq), and aqueous NaOH (92 mL, 92.394 mmol, 3.00 eq, 1 N) in methanol (250 mL) and water (125 mL) under nitrogen was placed in an ice bath and stirred vigorously (1000 rpm) for 1 hr, upon which precooled commercial aqueous bleach (77 mL, 53.896 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid $KH_2PO_4$ (25 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×25 mL), combined, dried over solid $Na_2SO_4$, decanted, and concentrated onto celite, and purified via silica gel chromatography; hexanes-50% $CH_2Cl_2$ in hexanes to afford the 2-iodo-4,5-dichlorophenol as a clear pale yellow amorphous foam (2.738 g, 9.478 mmol, 31%) and the 2-iodo-3,4-dichlorophenol as a clear pale yellow foam (3.325 g, 11.509 mmol, 37%). NMR indicated pure products.

Characterization of the 2-iodo-4,5-dichlorophenol:
¹H NMR (500 MHz, Chloroform-d) δ 7.71 (s, 1H), 7.10 (s, 1H), 5.27 (s, 1H).

Characterization of the 2-iodo-3,4-dichlorophenol:
¹H NMR (400 MHz, Chloroform-d) δ 7.32 (d, J=8.9 Hz, 1H), 6.86 (d, J=8.8 Hz, 1H), 5.44 (s, 1H). ¹³C NMR (101 MHz, Chloroform-d) δ 155.15, 136.20, 130.76, 123.74, 113.74, 91.99.

Example 69: Synthesis of Ligand 16

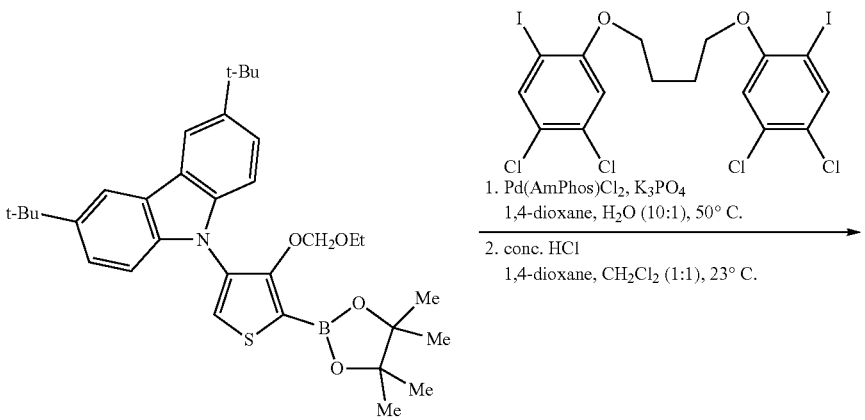

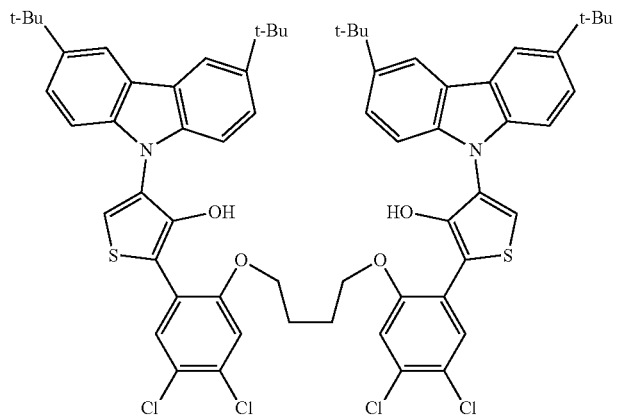

A mixture of the thiophene boropinacolate ester (1.000 g, 1.104 mmol, 2.70 eq, 62% pure by NMR), K₃PO₄ (0.703 g, 3.312 mmol, 8.10 eq), Pd(AmPhos)Cl₂ (58.0 mg, 0.0818 mmol, 0.20 eq), and the bisphenyliodide (0.258 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-100% CH₂Cl₂ in hexanes to afford the impure bisthiophene as a pale red amorphous foam (0.212 g). NMR indicated product which contained impurities. The impure material was used in the subsequent reaction.

To a solution of the impure coupled product in CH₂Cl₂-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 25%-100% CH₂Cl₂ in hexanes to afford the bisthiophene as a white solid (0.113 g, 0.0999 mmol, 24% two steps). NMR indicated pure product.

¹H NMR (500 MHz, Chloroform-d) δ 8.13 (d, J=1.9 Hz, 4H), 7.85 (s, 2H), 7.40 (dd, J=8.6, 1.9 Hz, 4H), 7.32 (s, 2H), 7.18 (d, J=8.6 Hz, 4H), 7.03 (s, 2H), 6.46 (s, 2H), 4.11-4.05 (m, 4H), 2.04-1.96 (m, 4H), 1.44 (s, 36H). ¹³C NMR (126 MHz, Chloroform-d) δ 152.71, 146.95, 143.16, 139.40, 131.51, 130.92, 127.07, 125.84, 123.68, 123.34, 122.96, 120.92, 116.36, 115.20, 112.57, 109.39, 70.17, 34.72, 32.00, 25.85.

Example 70: Synthesis of Procatalyst 31

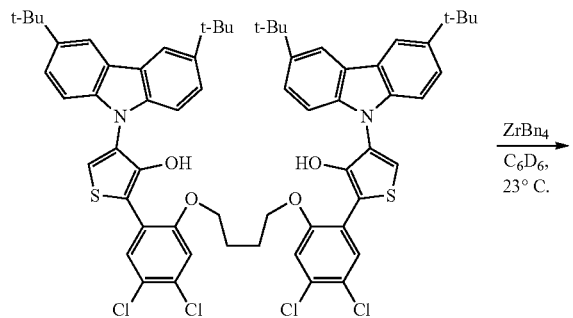

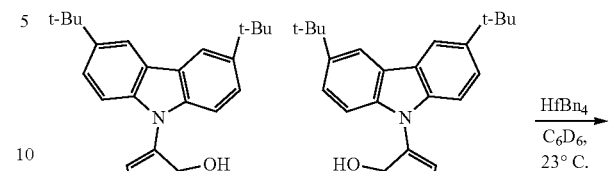

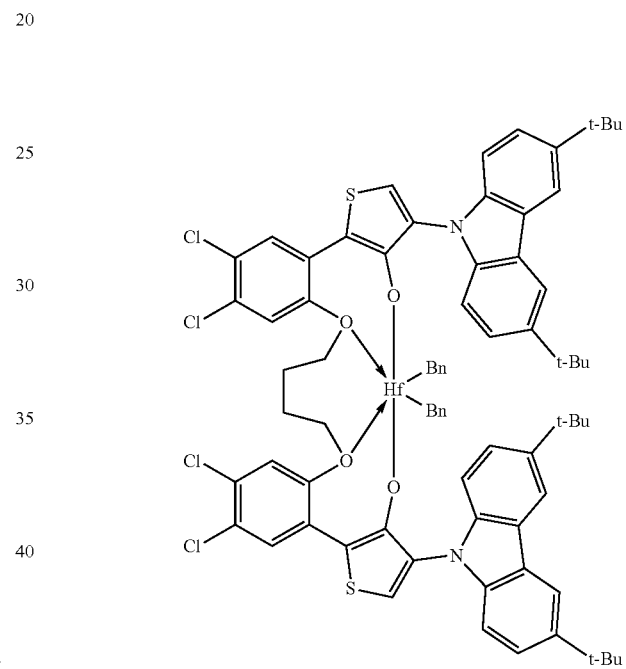

Example 71: Synthesis of Procatalyst 32

The thiophene ligand was azeotropically dried using PhMe (4×10 mL) prior to use. To a clear colorless solution of the thiophene (8.8 mg, 7.78 μmol, 1.00 eq) in anhydrous $C_6D_6$ (1.40 mL) in a nitrogen filled glovebox at 23° C. was added a solution of $ZrBn_4$ (3.9 mg, 8.56 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotomeric mixture. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.54 (dd, J=1.9, 0.7 Hz, 2H), 8.42 (dd, J=1.8, 0.8 Hz, 2H), 7.62-7.56 (m, 4H), 7.47 (dd, J=8.6, 1.9 Hz, 2H), 7.18 (dd, J=8.5, 0.7 Hz, 2H), 6.99-6.96 (m, 6H), 6.94-6.90 (m, 2H), 6.77 (s, 2H), 6.38-6.32 (m, 4H), 5.58 (s, 2H), 3.58-3.50 (m, 2H), 2.85-2.79 (m, 2H), 1.48 (s, 18H), 1.30 (s, 18H), 0.92-0.83 (m, 2H), 0.72 (d, 2H), 0.59-0.54 (m, 4H).

The thiophene ligand was azeotropically dried using PhMe (4×10 mL) prior to use. To a clear colorless solution of the thiophene (8.0 mg, 7.07 μmol, 1.00 eq) in anhydrous $C_6D_6$ (1.24 mL) in a nitrogen filled glovebox at 23° C. was added a solution of $HfBn_4$ (4.2 mg, 7.78 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product which exists as a rotomeric mixture. The same procedure can be used with PhMe as the solvent to prepare the procatalyst solution (0.005 M) which is used directly after filtration for the polymerization experiments.

$^1$H NMR (500 MHz, Benzene-$d_6$) δ 8.56 (dd, J=2.0, 0.6 Hz, 2H), 8.44 (dd, J=1.7, 0.8 Hz, 2H), 7.62-7.53 (m, 4H), 7.46 (dd, J=8.6, 1.9 Hz, 2H), 7.16-7.13 (m, 2H), 6.99-6.84 (m, 4H), 6.77 (s, 2H), 6.52-6.47 (m, 6H), 6.42 (dd, J=8.1, 1.3 Hz, 2H), 5.60 (s, 2H), 3.55-3.45 (m, 2H), 2.83-2.77 (m, 2H), 1.48 (s, 18H), 1.30 (s, 18H), 1.06-0.98 (m, 2H), 0.55-0.48 (m, 4H), 0.45 (d, J=13.7 Hz, 2H).

Example 75: Synthesis of Procatalyst 31

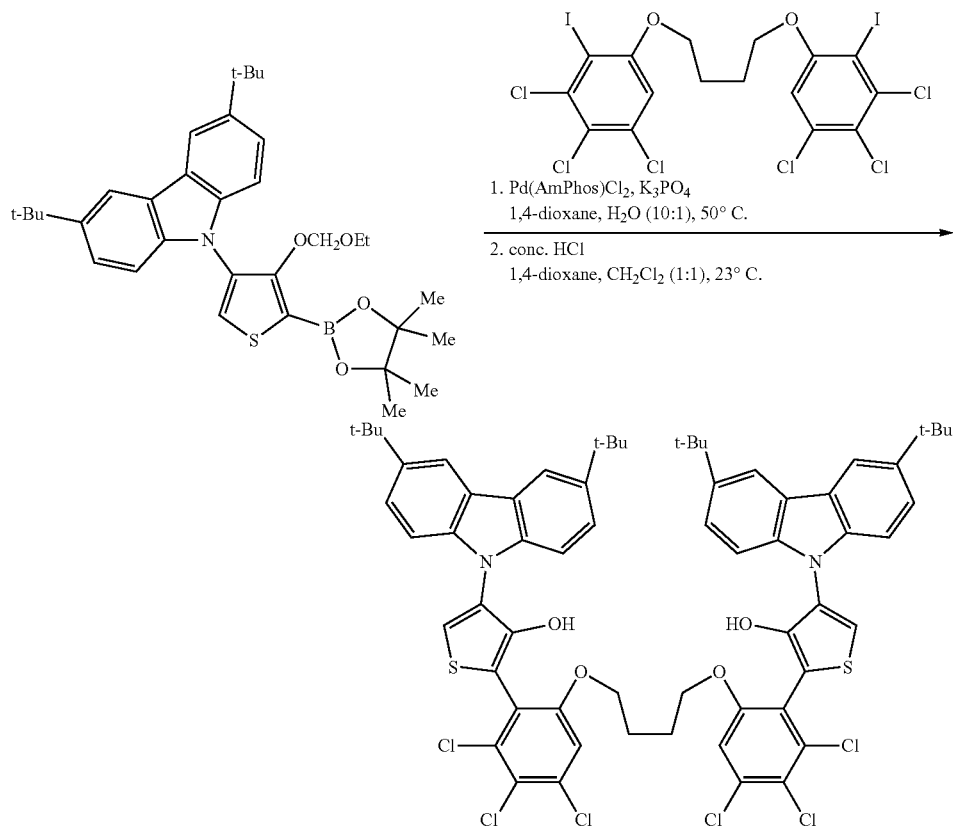

A mixture of the thiophene boropinacolate ester (2.017 g, 2.586 mmol, 3.00 eq, 72% pure by NMR), K₃PO₄ (1.647 g, 7.758 mmol, 9.00 eq), Pd(AmPhos)Cl₂ (122.0 mg, 0.1724 mmol, 0.20 eq), and the bisphenyliodide (0.604 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-50% CH₂Cl₂ in hexanes to afford the bisthiophene as a red amorphous oil (0.162 g). NMR indicated product which exists as a mixture of rotomers, and contains minor impurities. The material was used in the subsequent reaction without further purification To a solution of the impure coupled product in CH₂Cl₂-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a light tan solid (0.115 g, 0.09583 mmol, 11% two steps). NMR indicated pure product.

¹H NMR (500 MHz, Chloroform-d) δ 8.13 (d, J=1.9 Hz, 4H), 7.44-7.38 (m, 4H), 7.39 (s, 2H), 7.21 (d, J=8.6 Hz, 4H), 6.98 (s, 2H), 3.96-3.91 (m, 4H), 1.85-1.80 (m, 4H), 1.44 (s, 36H). ¹³C NMR (126 MHz, Chloroform-d) δ 156.24, 146.49, 143.49, 139.20, 136.25, 134.68, 125.81, 124.47, 123.91, 123.49, 120.80, 120.64, 116.49, 112.77, 110.93, 109.20, 69.04, 34.75, 31.98, 25.60.

Example 76: Synthesis of Procatalyst 33

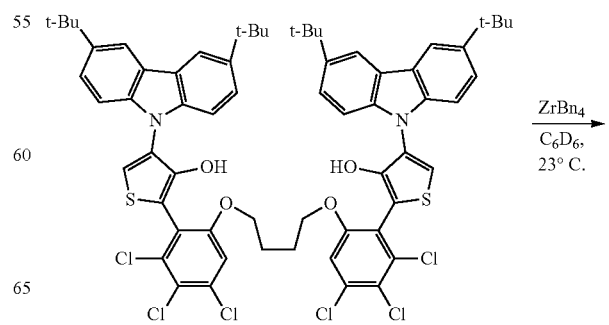

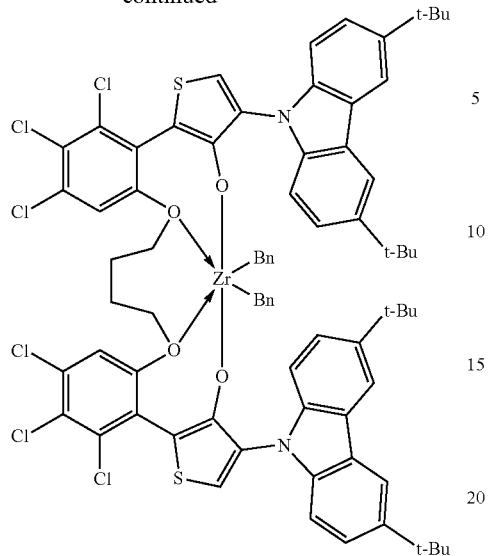

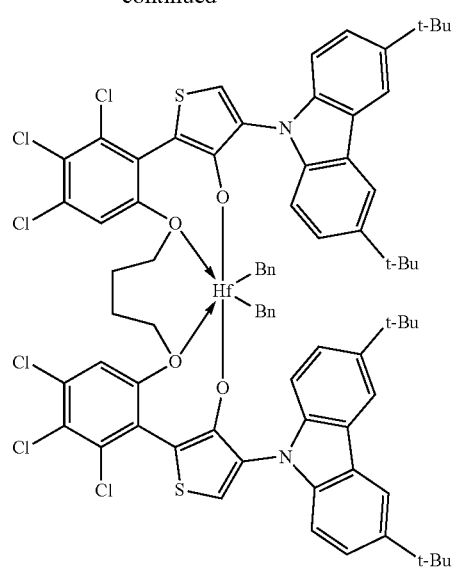

The thiophene ligand was azeotropically dried using PhMe (4×10 mL) prior to use. To a clear colorless solution of the thiophene (10.2 mg, 8.50 μmol, 1.00 eq) in anhydrous C₆D₆ (1.53 mL) in a nitrogen filled glovebox at 23° C. was added a solution of ZrBn₄ (4.3 mg, 9.35 μmol, 1.10 eq) in C₆D₆ (0.17 mL) in a dropwise manner. After stirring (500 rpm) for 30 mins the pale golden yellow solution was filtered using a 0.20 μm PTFE submicron filter to afford the zirconium complex as a 0.005 M solution in C₆D₆. NMR indicated product which exists as a rotomeric mixture. The same procedure can be used with PhMe as the solvent to prepare the procatalyst solution (0.0025 M or 0.005 M) which is used directly after filtration for the polymerization experiments.

¹H NMR (400 MHz, Benzene-d₆) δ 8.48 (d, J=1.9 Hz, 2H), 8.36 (d, J=1.8 Hz, 2H), 7.59 (d, J=8.7 Hz, 2H), 7.50 (ddd, J=8.8, 3.8, 1.9 Hz, 4H), 7.23 (d, J=8.6 Hz, 2H), 6.98-6.94 (m, 4H), 6.89 (s, 2H), 6.74 (t, J=7.3 Hz, 2H), 6.27-6.21 (m, 4H), 5.41 (s, 2H), 3.60-3.50 (m, 2H), 2.97-2.90 (m, 2H), 1.49 (s, 18H), 1.28 (s, 18H), 1.16 (d, J=13.9 Hz, 2H), 0.90-0.80 (m, 2H), 0.68-0.60 (m, 2H).

The thiophene ligand was azeotropically dried using PhMe (4×10 mL) prior to use. To a clear colorless solution of the thiophene (8.0 mg, 6.67 μmol, 1.00 eq) in anhydrous C₆D₆ (1.17 mL) in a nitrogen filled glovebox at 23° C. was added a solution of HfBn₄ (4.0 mg, 7.33 μmol, 1.10 eq) in C₆D₆ (0.16 mL) in a dropwise manner. After stirring (500 rpm) for 30 mins the pale golden yellow solution was filtered using a 0.20 μm PTFE submicron filter to afford the hafnium complex as a 0.005 M solution in C₆D₆. NMR indicated product which exists as a rotomeric mixture. The same procedure can be used with PhMe as the solvent to prepare the procatalyst solution (0.005 M) which is used directly after filtration for the polymerization experiments.

¹H NMR (400 MHz, Benzene-d₆) δ 8.51 (d, J=1.9 Hz, 2H), 8.39 (d, J=1.8 Hz, 2H), 7.61 (d, J=9.0 Hz, 2H), 7.50 (ddd, J=21.9, 8.7, 1.9 Hz, 4H), 7.19 (d, J=8.6 Hz, 2H), 6.98-6.94 (m, 4H), 6.90 (s, 2H), 6.75 (t, J=7.5 Hz, 2H), 6.41-6.36 (m, 4H), 5.31 (s, 2H), 3.43-3.35 (m, 2H), 2.87-2.79 (m, 2H), 1.49 (s, 18H), 1.29 (s, 18H), 1.06 (d, J=14.1 Hz, 2H), 0.95-0.82 (m, 2H), 0.59-0.48 (m, 2H), 0.41 (d, J=14.0 Hz, 2H).

Example 77: Synthesis of Procatalyst 34

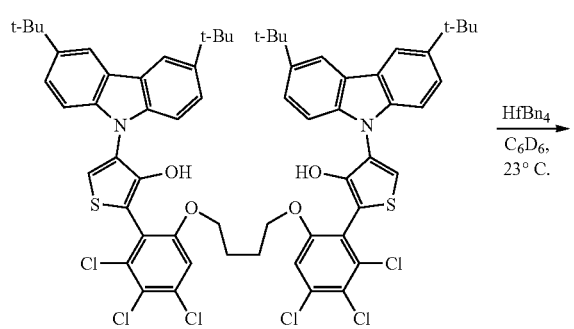

Example 78: Synthesis of bis-3,4,5-trichloro-2-iodophenyl ether

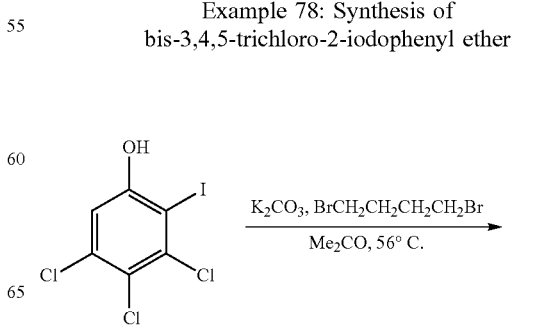

-continued

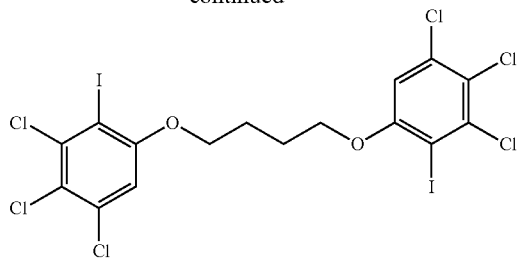

A white heterogeneous mixture of the iodophenol (1.315 g, 4.067 mmol, 2.00 eq), $K_2CO_3$ (1.686 g, 12.201 mmol, 6.00 eq), and 1,4-dibromobutane (0.24 mL, 2.034 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2Cl_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (1.300 g, 1.855 mmol, 91%). NMR (at 60° C.) indicated product.

NMR Spectra attained at 60° C.:
$^1H$ NMR (500 MHz, Chloroform-d) δ 6.87 (s, 2H), 4.21-4.08 (m, 4H), 2.13 (dq, J=5.3, 3.4, 2.7 Hz, 4H). $^{13}C$ NMR (126 MHz, Chloroform-d) δ 157.26, 139.11, 134.26, 123.39, 111.64, 91.01, 69.80, 25.82.

Example 79: Synthesis of 3,4,5-trichlorophenol-2-iodophenol

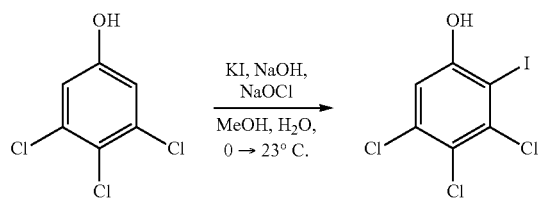 [SMILES: Oc1cc(Cl)c(Cl)c(Cl)c1 ; Oc1cc(Cl)c(Cl)c(Cl)c1I]

A clear colorless solution of the starting phenol (3.600 g, 18.233 mmol, 1.00 eq), KI (5.297 g, 31.909 mmol, 1.75 eq), and aqueous NaOH (55.0 mL, 54.699 mmol, 3.00 eq, 1 N) in methanol (100 mL) and water (100 mL) under nitrogen was placed in an ice bath and stirred vigorously (1000 rpm) for 1 hr, upon which precooled commercial aqueous bleach (46.0 mL, 31.909 mmol, 1.75 eq, 5.2% w/w) was added in a dropwise manner over 10 mins. The now pale opaque yellow mixture was stirred for 2 hrs at 0° C., the mixture was removed from the ice water bath, stirred at 23° C. for 4 hrs, solid $NaH_2PO_4$ (10 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×25 mL), combined, dried over solid $Na_2SO_4$, decanted, and concentrated onto celite, and purified via silica gel chromatography; 35% $CH_2Cl_2$ in hexanes-100% $CH_2Cl_2$ in hexanes to afford the o-iodophenol as a white solid (1.497 g, 4.630 mmol, 25%) and recovered starting phenol as a white solid (2.544 g, 12.885 mmol, 71%). NMR indicated pure product.

$^1H$ NMR (500 MHz, Chloroform-d) δ 7.11 (s, 1H), 5.52 (s, 1H).

Example 80: Polymers Yielded from Procatalysts

Catalyst efficiency (g polymer yield/g Metal) and resulting polymer characteristics were assessed for Procatalysts 1-34 using a parallel pressure reactor (PPR) as well as a semi-batch reactor. The batch reactor polymerization reactions were carried out in a 2-L semi-batch reactor initially without diethyl zinc (DEZ), and then with three different loadings of DEZ added (0, 50, and 200 μmol). The activator was bis(hydrogenated tallow alkyl)methylammonium tetrakis(pentafluorophenyl)borate in amounts of 1.5 molar equivalents.

The procatalysts are capable of producing polymer at temperatures up to 150° C. All procatalysts, except for procatalysts 1 and 2, are highly active as indicated by the low quench times in the PPR, and most showcase high efficiency (>200,000 g polymer/g metal) in the semi-batch reactor experiments under these reactor conditions. The linker unit (bridge) directly impacts the catalyst activity and efficiency, and leads to producing polymer with higher comonomer incorporation (up to 23 mol %), where procatalysts 3 and 4, linked by a four carbon alkyl n-butyl chain, produce polymers with lower 1-octene incorporation (10-12 mol %), but disubstituted silyl and germanyl dimethylene as well as trans-1,2-methylenedicyclohexyl bridges, procatalysts 5-12, lead to higher catalyst activity, efficiency (up to 29 MM g polymer/g metal), and 1-octene incorporation (up to 23 mol %). Also, the functional group and substitution positioning on the neutral phenyl ether donor (i.e. procatalysts 13-34) directly impacts the catalyst activity and efficiency (up to 32 MM g polymer/g metal), leads to producing polymer with higher comonomer incorporation (up to 21 mol %) as well as higher molecular weight (up to 774,000 g/mol) under these reactor conditions, where procatalysts 3 and 4, possessing a non-substituted neutral, non-anionic phenyl ether donor, produce polymers with lower 1-octene incorporation (10-12 mol %) and can lead to lower catalyst efficiency at temperatures up to 150° C. depending on the procatalyst comparison under these reactor conditions.

TABLE 1

Polymerization Data from PPR Experiments

| Procatalyst No. | Temp. (° C.) | Loading (nmoles) | Quench Time (seconds) | Yield (mg) | Mw (g/mol) | PDI (Mw/Mn) | Mol % Octene |
|---|---|---|---|---|---|---|---|
| 1 | 120 | 50 | 1,801 | 20 | N.D. | N.D. | N.D. |
| 2 | 120 | 50 | 1,802 | 15 | N.D. | N.D. | N.D. |
| 3 | 120 | 20 | 31 | 321 | 283,377 | 10.3 | 17.6 |
| 4 | 120 | 20 | 69 | 394 | 466,377 | 4.0 | 15.0 |
| 5 | 120 | 20 | 31 | 382 | 72,796 | 6.4 | 23.0 |
| 6 | 120 | 20 | 98 | 368 | 342,542 | 4.0 | 22.8 |
| 7 | 120 | 20 | 26 | 513 | 27,664 | 5.6 | 21.1 |
| 7 | 120 | 50 | 22 | 654 | 28,864 | 4.8 | 22.8 |
| 8 | 120 | 20 | 74 | 517 | 316,315 | 6.8 | 22.3 |
| 8 | 120 | 50 | 51 | 652 | 297,056 | 7.9 | 24.2 |
| 9 | 120 | 20 | 31 | 620 | 29,614 | 3.2 | 25.2 |
| 9 | 120 | 50 | 26 | 714 | 29,151 | 3.4 | 27.9 |
| 10 | 120 | 20 | 206 | 441 | 395,211 | 5.1 | 20.9 |
| 10 | 120 | 50 | 65 | 689 | 436,462 | 6.1 | 23.8 |
| 11 | 120 | 20 | 32 | 638 | 54,813 | 3.2 | 25.3 |
| 12 | 120 | 20 | 190 | 501 | 574,000 | 4.9 | 21.8 |
| 12 | 120 | 50 | 71 | 697 | 536,715 | 5.6 | 26.5 |
| 13 | 120 | 20 | 27 | 488 | 67,850 | 2.9 | 18.9 |
| 14 | 120 | 20 | 93 | 427 | 436,723 | 3.4 | 16.0 |
| 15 | 120 | 20 | 50 | 373 | 196,713 | 5.2 | 17.3 |
| 15 | 120 | 50 | 30 | 144 | 547,412 | 6.3 | 18.9 |
| 16 | 120 | 20 | 81 | 376 | 589,408 | 4.0 | 13.9 |
| 16 | 120 | 50 | 60 | 452 | 533,385 | 5.3 | 18.1 |
| 17 | 120 | 20 | 36 | 316 | 161,085 | 5.0 | 18.4 |
| 18 | 120 | 20 | 197 | 233 | 520,980 | 3.4 | 11.9 |
| 19 | 120 | 20 | 47 | 381 | 233,768 | 5.9 | 17.6 |
| 20 | 120 | 20 | 670 | 155 | 557,611 | 3.7 | 12.7 |
| 21 | 120 | 20 | 62 | 465 | 102,099 | 2.9 | 21.3 |
| 22 | 120 | 50 | 386 | 319 | 525,907 | 4.6 | 16.7 |
| 23 | 120 | 20 | 1,801 | 51 | 82,227 | 29.4 | 9.6 |
| 24 | 120 | 20 | 1,802 | 21 | 54,587 | 11.9 | 13.4 |
| 26 | 120 | 20 | 214 | 297 | 471,167 | 3.2 | 13.6 |
| 27 | 120 | 20 | 74 | 312 | 716,550 | 5.2 | 12.6 |
| 28 | 120 | 20 | 565 | 23 | 847,094 | 5.9 | 10.2 |
| 29 | 120 | 20 | 51 | 509 | 48,225 | 2.9 | 22.7 |
| 30 | 120 | 20 | 753 | 227 | 316,166 | 3.5 | 16.9 |
| 31 | 120 | 20 | 66 | 280 | 339,017 | 3.3 | 14.1 |
| 32 | 120 | 20 | 940 | 125 | 922,480 | 3.9 | 11.0 |
| 33 | 120 | 20 | 78 | 520 | 253,185 | 3.2 | 19.7 |
| 34 | 120 | 20 | 1,604 | 143 | 785,728 | 4.6 | 15.5 |
| 34 | 120 | 50 | 389 | 316 | 781,947 | 4.3 | 16.5 |

*Standard PPR reactor conditions: 120° C.-150 psi ethylene, 838 uL 1-octene, [C8]:[C2] = 2.24, 10% CO quench, Run time = 30 mins or until 50 psi conversion at 120° C. MMAO-3A = 500 moles.
Activator = bis(hydrogenated tallow alkyl)methylammonium tetrakis(pentafluorophenyl)borate (1.50 eq).
*Mol % Octene or C8/olefin is defined as: (moles 1-octene/(total moles 1-octene and ethylene)) × 100 N.D. = Not Determined.

TABLE 2

Polymerization Data from Semi-Batch Reactor Experiments

| Procatalyst No. | Temp. (° C.) | Efficiency (g poly/g Metal) | Mw (g/mol) | PDI (Mw/Mn) | Mol % Octene | $T_M$ (° C.) |
|---|---|---|---|---|---|---|
| 3 | 120 | 5,678,330 | 92,493 | 2.9 | 10.8 | N.D. |
| 3 | 150 | 774,650 | 99,217 | 3.2 | 10.6 | N.D. |
| 4 | 120 | 364,166 | 458,028 | 4.7 | 12.7 | N.D. |
| 4 | 150 | 127,458 | 376,097 | 2.8 | 12.7 | N.D. |
| 5 | 120 | 17,013,067 | 125,567 | 7.5 | 19.0 | 37.4 |
| 5 | 150 | 4,330,001 | 82,432 | 5.8 | 17.2 | 22.0 |
| 6 | 120 | 197,023 | 211,862 | 10.2 | 19.7 | 35.7 |
| 6 | 150 | 165,836 | 256,441 | 5.2 | 21.6 | −7.5 |
| 7 | 120 | 11,115,496 | 27,103 | 11.9 | 15.3 | 22.4 |
| 7 | 150 | 2,822,722 | 16,343 | 9.8 | 15.3 | 12.6 |
| 8 | 120 | 2,941,341 | 246,637 | 10.3 | 20.6 | −3.7 |
| 8 | 150 | 79,556 | 170,240 | 13.2 | 20.8 | −11.6 |
| 9 | 120 | 21,485,574 | 29,529 | 3.7 | 20.6 | −14.0 |
| 9 | 150 | 1,877,247 | 26,090 | 4.4 | 18.2 | 0.3 |
| 10 | 120 | 408,986 | 182,983 | 8.3 | 22.6 | −20.8 |
| 10 | 150 | 243,711 | 236,546 | 7.8 | 21.6 | −17.6 |
| 11 | 120 | 29,312,462 | 56,248 | 2.7 | 19.6 | N.D. |
| 11 | 150 | 9,361,572 | 45,346 | 2.7 | 14.8 | 45.4 |
| 12 | 120 | 599,473 | 203,542 | 6.9 | 17.5 | 35.8 |

TABLE 2-continued

Polymerization Data from Semi-Batch Reactor Experiments

| Procatalyst No. | Temp. (° C.) | Efficiency (g poly/g Metal) | Mw (g/mol) | PDI (Mw/Mn) | Mol % Octene | $T_M$ (° C.) |
|---|---|---|---|---|---|---|
| 12 | 150 | 347,358 | 363,054 | 5.4 | 19.2 | −0.9 |
| 13 | 120 | 31,526,791 | 85,989 | 2.2 | 9.8 | 71.8 |
| 13 | 150 | 3,595,545 | 60,262 | 2.2 | 10.7 | 67.2 |
| 14 | 120 | 761,947 | 389,278 | 5.0 | 11.7 | 62.6 |
| 14 | 150 | 156,872 | 261,242 | 3.9 | 11.1 | 51.4 |
| 15 | 120 | 12,211,699 | 281,510 | 4.5 | 10.4 | 66.6 |
| 15 | 150 | 2,288,323 | 113,398 | 2.4 | 9.7 | 68.8 |
| 16 | 120 | 1,299,793 | 710,559 | 3.8 | 12.4 | N.D. |
| 16 | 150 | 252,115 | 497,795 | 2.6 | 12.2 | N.D. |
| 17 | 120 | 5,042,533 | 149,196 | 2.8 | 11.2 | 62.2 |
| 17 | 150 | 869,654 | 84,119 | 2.2 | 12.2 | 59.2 |
| 18 | 120 | 173,679 | 389,517 | 6.1 | 15.0 | 49.0 |
| 18 | 150 | 52,524 | 406,182 | 3.1 | 14.2 | 43.6 |
| 19 | 120 | 1,753,924 | 123,754 | 2.4 | 14.2 | 56.9 |
| 19 | 150 | 712,532 | 102,455 | 2.4 | 13.3 | 51.7 |
| 20 | 120 | 134,461 | 219,500 | 4.0 | 16.6 | 53.5 |
| 20 | 150 | 32,215 | 297,148 | 4.4 | 14.6 | 43.7 |
| 21 | 120 | 1,140,051 | 107,622 | 2.3 | 17.6 | 36.7 |
| 21 | 150 | 657,722 | 80,284 | 2.2 | 18.9 | 31.1 |
| 25 | 120 | 5,437,166 | 88,886 | 2.1 | 14.9 | 58.5 |
| 25 | 150 | 767,342 | 68,351 | 2.2 | 13.7 | 55.6 |
| 26 | 120 | 257,718 | 366,966 | 4.9 | 16.9 | 42.7 |
| 26 | 150 | 64,990 | 346,870 | 3.5 | 16.5 | 36.3 |
| 27 | 120 | 7,147,242 | 477,034 | 2.4 | 11.6 | 68.1 |
| 27 | 150 | 5,042,533 | 387,440 | 2.7 | 11.0 | 61.6 |
| 29 | 120 | 1,490,836 | 67,232 | 2.3 | 21.0 | 18.3 |
| 29 | 150 | 1,764,886 | 43,247 | 2.2 | 21.3 | 16.1 |
| 31 | 120 | 430,260 | 273,348 | 2.7 | 12.5 | 57.7 |
| 31 | 150 | 709,791 | 291,773 | 2.4 | 12.9 | 56.5 |
| 33 | 120 | 2,587,038 | 369,636 | 2.6 | 17.7 | 35.7 |
| 33 | 150 | 1,344,675 | 245,466 | 2.4 | 18.2 | 31.8 |

*Standard PPR reactor conditions: 120° C.-46 g ethylene, 303 g 1-octene, in 611 g of IsoparE, 150° C.-43 g ethylene and 303 g 1-octene in 547 g of IsoparE, and 190° C.-46 g ethylene and 292 g of 1-octene in 515 g of IsoparE.
*Mol % Octene or C8/olefin is defined as: (moles 1-octene/(total moles 1-octene and ethylene)) × 100 N.D. = not determined.

TABLE 3

Polymerization Data from Semi-Batch Reactor Experiments w/ $Et_2Zn$ (DEZ)

| Procatalyst No. | Temp. (° C.) | DEZ (μmol) | Efficiency (g poly/g Metal) | Mw (g/mol) | PDI (Mw/Mn) | Mol % Octene | $T_M$ (° C.) |
|---|---|---|---|---|---|---|---|
| 3 | 150 | 0 | 360,833 | 142,634 | 4.3 | 10.0 | N.D. |
| 3 | 150 | 50 | 226,092 | 77,127 | 3.1 | 11.4 | N.D. |
| 3 | 150 | 200 | 157,122 | 44,969 | 3.2 | 12.1 | N.D. |
| 4 | 150 | 0 | 84,038 | 384,172 | 2.4 | 11.6 | N.D. |
| 4 | 150 | 50 | 71,232 | 211,586 | 2.6 | 11.3 | N.D. |
| 4 | 150 | 200 | 60,639 | 84,703 | 2.6 | 12.2 | N.D. |
| 5 | 150 | 0 | 1,205,823 | 61,781 | 4.4 | 16.2 | 27.4 |
| 5 | 150 | 50 | 1,059,663 | 54,278 | 4.1 | 16.0 | 24.0 |
| 5 | 150 | 200 | 929,580 | 40,728 | 3.4 | 16.4 | 22.1 |
| 6 | 150 | 0 | 99,445 | 225,865 | 4.0 | 20.4 | 21.0 |
| 6 | 150 | 50 | 86,139 | 169,645 | 6.8 | 20.9 | N.D. |
| 6 | 150 | 200 | 69,472 | 84,999 | 2.6 | 20.0 | N.D. |
| 7 | 150 | 0 | 657,722 | 18,513 | 8.8 | 14.6 | 20.2 |
| 7 | 150 | 50 | 469,175 | 19,521 | 6.8 | 15.7 | 18.3 |
| 7 | 150 | 200 | 379,455 | 17,054 | 6.0 | 17.1 | 8.0 |
| 8 | 150 | 0 | 90,761 | 173,994 | 9.7 | 17.4 | 20.2 |
| 8 | 150 | 50 | 25,772 | 159,072 | 7.4 | 17.3 | 19.9 |
| 8 | 150 | 200 | 277,542 | 96,923 | 4.6 | 17.6 | 19.4 |
| 9 | 150 | 0 | 2,009,705 | 25,840 | 4.5 | 16.4 | 11.0 |
| 9 | 150 | 50 | 1,661,843 | 26,245 | 4.3 | 16.9 | 6.5 |
| 9 | 150 | 200 | 1,509,106 | 26,124 | 3.6 | 16.7 | 12.2 |
| 10 | 150 | 0 | 124,937 | 252,470 | 71.9 | 18.9 | −8.0 |
| 10 | 150 | 50 | 25,211 | 139,585 | 6.8 | 19.6 | −9.9 |
| 10 | 150 | 200 | 14,006 | 66,802 | 4.9 | 19.0 | −6.8 |
| 11 | 150 | 0 | 3,085,028 | 47,900 | 2.4 | 13.7 | 52.1 |
| 11 | 150 | 50 | 2,146,730 | 46,442 | 2.4 | 13.6 | 53.8 |
| 11 | 150 | 200 | 2,137,595 | 40,966 | 2.3 | 13.9 | 53.3 |
| 12 | 150 | 0 | 159,673 | 431,493 | 3.4 | 18.4 | 24.8 |
| 12 | 150 | 50 | 31,654 | 233,986 | 4.0 | 17.3 | 7.1 |
| 12 | 150 | 200 | 13,259 | 109,393 | 7.0 | 15.9 | 27.9 |

TABLE 3-continued

Polymerization Data from Semi-Batch Reactor Experiments w/ Et$_2$Zn (DEZ)

| Procatalyst No. | Temp. (° C.) | DEZ (μmol) | Efficiency (g poly/g Metal) | Mw (g/mol) | PDI (Mw/Mn) | Mol % Octene | T$_M$ (° C.) |
|---|---|---|---|---|---|---|---|
| 13 | 150 | 0 | 1,183,899 | 66,142 | 2.2 | 7.6 | 82.8 |
| 13 | 150 | 50 | 1,227,747 | 56,679 | 2.0 | 7.5 | 84.7 |
| 13 | 150 | 200 | 1,161,975 | 32,840 | 2.2 | 9.2 | 79.4 |
| 14 | 150 | 0 | 100,846 | 268,932 | 3.4 | 9.7 | 64.0 |
| 14 | 150 | 50 | 82,918 | 111,759 | 2.6 | 9.5 | 66.8 |
| 14 | 150 | 200 | 84,038 | 56,857 | 2.6 | 8.9 | 78.7 |
| 15 | 150 | 0 | 612,047 | 121,233 | 2.6 | 9.7 | N.D. |
| 15 | 150 | 50 | 516,129 | 81,833 | 2.5 | 10.8 | N.D. |
| 15 | 150 | 200 | 422,821 | 57,348 | 2.9 | 11.1 | N.D. |
| 16 | 150 | 0 | 93,002 | 472,636 | 2.5 | 10.6 | N.D. |
| 16 | 150 | 50 | 92,936 | 214,149 | 2.7 | 11.3 | N.D. |
| 16 | 150 | 200 | 87,604 | 83,733 | 2.6 | 11.4 | N.D. |
| 17 | 150 | 0 | 328,861 | 86,877 | 2.3 | 10.9 | N.D. |
| 17 | 150 | 50 | 280,902 | 70,934 | 2.3 | 11.4 | N.D. |
| 17 | 150 | 200 | 235,361 | 51,056 | 2.5 | 12.0 | N.D. |
| 18 | 150 | 0 | 38,888 | 400,140 | 2.4 | 13.2 | 49.7 |
| 18 | 150 | 50 | 38,844 | 182,395 | 2.5 | 13.2 | 50.2 |
| 18 | 150 | 200 | 35,016 | 73,481 | 2.7 | 13.1 | 54.0 |
| 19 | 150 | 0 | 361,747 | 101,410 | 2.3 | 12.6 | 53.6 |
| 19 | 150 | 50 | 389,152 | 83,638 | 2.2 | 12.6 | 56.8 |
| 19 | 150 | 200 | 420,211 | 51,302 | 2.3 | 12.8 | 56.2 |
| 20 | 150 | 0 | 21,290 | 408,401 | 3.6 | 14.5 | 41.0 |
| 20 | 150 | 50 | 11,579 | 122,189 | 2.6 | 13.9 | 43.1 |
| 20 | 150 | 200 | 6,723 | 41,285 | 2.6 | 13.8 | 52.9 |
| 21 | 150 | 0 | 400,114 | 84,141 | 2.2 | 16.6 | 34.1 |
| 21 | 150 | 50 | 380,017 | 73,498 | 2.2 | 16.2 | 35.3 |
| 21 | 150 | 200 | 369,055 | 49,814 | 2.1 | 14.3 | 49.4 |
| 25 | 150 | 0 | 292,321 | 66,882 | 2.2 | 12.6 | 57.0 |
| 25 | 150 | 50 | 274,051 | 53,911 | 2.2 | 12.0 | 59.7 |
| 25 | 150 | 200 | 285,013 | 34,647 | 2.3 | 12.8 | 60.7 |
| 26 | 150 | 0 | 39,918 | 335,371 | 2.7 | 15.0 | 42.0 |
| 26 | 150 | 50 | 115,674 | 140,068 | 2.5 | 13.9 | 45.9 |
| 26 | 150 | 200 | 28,293 | 61,446 | 2.5 | 14.1 | 52.2 |
| 27 | 150 | 0 | 460,405 | 401,969 | 2.8 | 10.4 | 61.7 |
| 27 | 150 | 50 | 91,350 | 248,698 | 4.2 | 9.4 | 66.1 |
| 27 | 150 | 200 | 292,321 | 154,430 | 5.2 | 10.8 | 67.2 |
| 29 | 150 | 0 | 997,545 | 48,583 | 2.3 | 19.0 | 23.4 |
| 29 | 150 | 50 | 770,082 | 49,429 | 2.4 | 20.0 | 38.1 |
| 29 | 150 | 200 | 599,623 | 43,348 | 2.4 | 20.7 | 51.1 |
| 31 | 150 | 0 | 287,936 | 292,106 | 2.4 | 12.8 | N.D. |
| 31 | 150 | 50 | 90,619 | 220,451 | 2.6 | 12.1 | N.D. |
| 31 | 150 | 200 | 115,101 | 115,198 | 2.9 | 12.7 | N.D. |
| 33 | 150 | 0 | 840,422 | 267,150 | 2.5 | 13.6 | 52.3 |
| 33 | 150 | 50 | 650,414 | 180,579 | 2.3 | 13.9 | 51.5 |
| 33 | 150 | 200 | 449,443 | 77,749 | 2.3 | 14.2 | 54.4 |

*Standard Semi-batch reactor conditions using Et$_2$Zn as CSA: 120° C.-11 g ethylene and 59 g 1-octene in 610 g of IsoparE, 150° C.-12 g ethylene and 59 g 1-octene in 531 g of IsoparE.
*Mol % Octene or C8/olefin is defined as: (moles 1-octene/(total moles 1-octene and ethylene)) × 100 N.D. = Not Determined.

TABLE 4

Chain Transfter Constants from Semi-Batch Reactor Experiments w/ Et$_2$Zn

| Procatalyst No. | Temperature. (° C.) | Chain Transfer Constant (Ca) | ΔPDI with ΔDEZ (0, 50, 200 μmoles) |
|---|---|---|---|
| 3 | 150 | 1.3 | 4.3, 3.1, 3.2 |
| 4 | 150 | 0.81 | 2.4, 2.6, 2.6 |
| 5 | 150 | 0.41 | 4.4, 3.4, 3.1 |
| 6 | 150 | 0.25 | 4.0, 6.8, 2.6 |
| 7 | 150 | 0.19 | 8.8, 6.8, 6.0 |
| 8 | 150 | 0.15 | 9.7, 7.4, 4.6 |
| 9 | 150 | 0.00 | 4.5, 4.3, 3.6 |
| 10 | 150 | 0.44 | 71.9, 6.8, 4.9 |
| 11 | 150 | 0.24 | 2.4, 2.3, 2.3 |
| 12 | 150 | 1.4 | 3.4, 4.0, 7.0 |
| 13 | 150 | 0.93 | 2.2, 2.0, 2.2 |
| 14 | 150 | 1.2 | 3.4, 2.6, 2.6 |
| 15 | 150 | 0.99 | 2.6, 2.5, 2.9 |
| 16 | 150 | 0.91 | 2.5, 2.7, 2.6 |
| 17 | 150 | 0.71 | 2.3, 2.3, 2.5 |
| 18 | 150 | 1.0 | 2.4, 2.5, 2.7 |
| 19 | 150 | 0.68 | 2.3, 2.2, 2.3 |
| 20 | 150 | 1.7 | 3.6, 2.6, 2.6 |
| 21 | 150 | 0.58 | 2.2, 2.2, 2.1 |
| 25 | 150 | 1.0 | 2.2, 2.2, 2.3 |
| 26 | 150 | 1.3 | 2.7, 2.5, 2.5 |
| 27 | 150 | 1.2 | 2.8, 4.2, 5.2 |
| 29 | 150 | 0.32 | 2.3, 2.4, 2.4 |
| 31 | 150 | 0.51 | 2.4, 2.6, 2.9 |
| 33 | 150 | 0.59 | 2.5, 2.3, 2.3 |

The modest-to-high chain transfer constants (Ca≤0.6) for procatalysts 3, 4, 13-20, 25 and 26 at 150° C. indicates that these catalysts have a high sensitivity to chain transfer agents and rapidly undergo chain transfer with these agents.

Overall, either a decrease in or a relative sustained narrow PDI is observed for these procatalysts as the amount of Et$_2$Zn (DEZ) is increased; evidence that these specific procatalysts undergo reversible chain transfer with a CSA as opposed to irreversible chain transfer. These behaviors are not observed with the other procatalysts which have much lower Ca's and/or a large increase or broadening in PDI. Procatalysts 12 and 27 have a high Ca, however, the increase in PDI suggests irreversible chain transfer with DEZ.

The invention claimed is:

1. A catalyst system comprising:
   a metal-ligand complex according to formula (I):

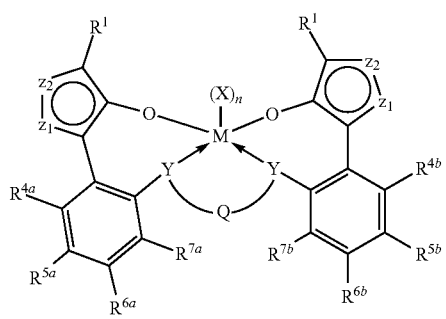

where:
   M is a metal chosen from titanium, zirconium, or hafnium, the metal having a formal oxidation state of +2, +3, or +4;

each X is a monodentate or bidentate ligand independently chosen from unsaturated (C$_2$-C$_{20}$)hydrocarbon, unsaturated (C$_2$-C$_{50}$)heterohydrocarbon, (C$_1$-C$_{50}$)hydrocarbyl, (C$_6$-C$_{50}$)aryl, (C$_6$-C$_{50}$)heteroaryl, cyclopentadienyl, substituted cyclopentadienyl, (C$_4$-C$_{12}$)diene, halogen, —OR$^C$, —N(R$^N$)$_2$, and —NCOR$^C$;

n is 1 or 2;

Y is oxygen, sulfur, or —N(R$^N$)—;

each R$^1$ is independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, radicals having formula (II), radicals having formula (III), and radicals having formula (IV):

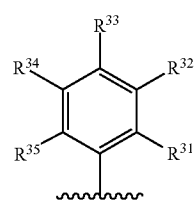

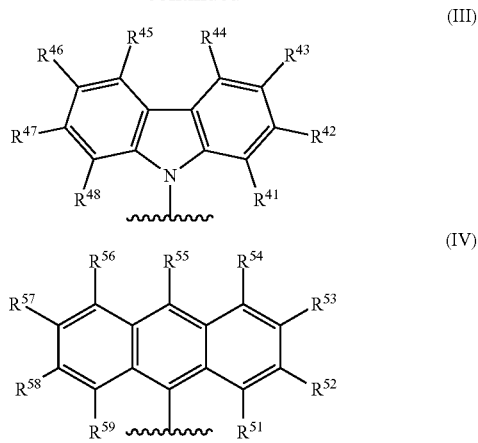

where each of R$^{31-35}$, R$^{41-48}$ and R$^{51-59}$ is independently chosen from (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, or —H, provided at least one R$^1$ in formula (I) is a radical having formula (II), a radical having formula (III), or a radical having formula (IV);

Q is (C$_1$-C$_{12}$)alkylene, (C$_1$-C$_{12}$)heteroalkylene, (—CH$_2$Si(R$_Q$)$_2$CH$_2$—), (—CH$_2$CH$_2$Si(R$_Q$)$_2$CH$_2$CH$_2$—), (—CH$_2$Ge(R$_Q$)$_2$CH$_2$—), or (—CH$_2$CH$_2$Ge(R$_Q$)$_2$CH$_2$CH$_2$—), where each R$_Q$ is (C$_1$-C$_{20}$)hydrocarbyl;

each z$_1$ and z$_2$ is independently selected from the group consisting of sulfur, oxygen, —N(R$^C$)—, and —C(R$^C$)—, provided at least one of z$_1$ and z$_2$ in each individual ring containing groups z$_1$ and z$_2$ is sulfur;

R$^{4a}$, R$^{5a}$, R$^{6a}$, R$^{7a}$, R$^{4b}$, R$^{5b}$, R$^{6b}$, and R$^{7b}$ are independently chosen from (C$_1$-C$_{50}$)hydrocarbyl, (C$_1$-C$_{50}$)heterohydrocarbyl, (C$_6$-C$_{50}$)aryl, (C$_4$-C$_{50}$)heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, —P(O)(R$^P$)$_2$, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, and —H, in which optionally R$^{4a}$ and R$^{5a}$, or R$^{5a}$ and R$^{6a}$, or R$^{6a}$ and R$^{7a}$, or R$^{4b}$ and R$^{5b}$, or R$^{5b}$ and R$^{6b}$, or R$^{6b}$ and R$^{7b}$ are covalently connected to form an aromatic ring or a non-aromatic ring;

each R$^C$, R$^N$, and R$^P$ in formula (I) is independently selected from the group consisting of (C$_1$-C$_{20}$)hydrocarbyl, (C$_1$-C$_{20}$)heterohydrocarbyl, and —H; and provided that when Q is —CH$_2$CH$_2$CH$_2$CH$_2$—:
   (1) when each R$^1$ is 3,6-di-tert-butylcarbazol-9-yl and z$_2$ is sulfur and each X is benzyl, R$^{5a}$ and R$^{5b}$ are not —OMe, fluorine, or tert-octyl; or
   (2) at least one of R$^{4a}$, R$^{5a}$, R$^{6a}$, and R$^{7a}$ is halogen, and at least one of R$^{4b}$, R$^{5b}$, R$^{6b}$, and R$^{7b}$ is halogen; or
   (3) at least one of R$^{4a}$, R$^{5a}$, R$^{6a}$, R$^{7a}$, R$^{4b}$, R$^{5b}$, R$^{6b}$, and R$^{7b}$ is selected from the group consisting of (C$_1$-C$_{50}$)hydrocarbyl, (C$_1$-C$_{50}$)heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $-P(O)(R^P)_2$, $R^CS(O)_2-$, $(R^C)_2C=N-$, $R^CC(O)O-$, $R^COC(O)-$, $R^CC(O)N(R)-$, and $(R^C)_2NC(O)-$.

2. The catalyst system of claim 1, wherein each $z_1$ is sulfur.

3. The catalyst system of claim 1, wherein each $z_2$ is sulfur.

4. The catalyst system of claim 1, wherein each Y is oxygen.

5. The catalyst system of claim 1, further comprising one or more cocatalysts.

6. The catalyst system of claim 1, wherein each $R^1$ is a radical having formula (III), in which at least one of $R^{41-48}$ is chosen from $(C_1-C_{40})$hydrocarbyl, $(C_1-C_{40})$heterohydrocarbyl, $-Si(R^C)_3$, $OR^C$ $-SR^C$, $-NO_2$, $-CN$, $-CF_3$, or halogen.

7. The catalyst system of claim 1, wherein each $R^1$ is a radical having formula (III), in which:
(1) $R^{42}$ and $R^{47}$ are independently chosen from $(C_1-C_{20})$ alkyl, $-Si(R^C)_3$, $-CF_3$, or halogen and $R^{43}$ and $R^{46}$ are $-H$; or
(2) $R^{43}$ and $R^{46}$ are independently chosen from $(C_1-C_{20})$ alkyl, $-Si(R^C)_3$, $-CF_3$, or halogen and $R^{42}$ and $R^{47}$ are $-H$.

8. The catalyst system of claim 1, wherein each $R^1$ is a radical having formula (IV), in which at least one of $R^{51-59}$ is chosen from $(C_1-C_{40})$hydrocarbyl, $(C_1-C_{40})$heterohydrocarbyl, $-Si(R^C)_3$, $-OR^C$, $-SR^C$, $-NO_2$, $-CN$, $-CF_3$, or halogen.

9. The catalyst system of claim 1, wherein each $R^1$ is a radical having formula (IV), in which $R^{51-59}$ are $-H$.

10. The catalyst system of claim 1, wherein when Q is $(C_3-C_4)$alkylene, at least two of $R^{4a}$, $R^{1a}$, $R^{6a}$, $R^{7a}$, $R^{4b}$, $R^{5b}$, $R^{6b}$, and $R^{7b}$ are selected from the group consisting of $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $-P(O)(R^P)_2$, $R^CS(O)_2-$, $(R^C)_2C=N-$, $R^CC(O)O-$, $R^COC(O)-$, $R^CC(O)N(R^N)-$, $(R^C)_2NC(O)-$, and halogen.

11. The catalyst system of claim 1, wherein at least one of $R^{4a}$, $R^{5a}$, $R^{6a}$, $R^{7a}$ is halogen and at least one of $R^{4b}$, $R^{5b}$, $R^{6b}$, and $R^{7b}$ is halogen.

12. The catalyst system of claim 1, wherein at least two of $R^{4a}$, $R^{5a}$, $R^{6a}$, $R^{7a}$ are halogen and at least two of $R^{4b}$, $R^{5b}$, $R^{6b}$, and $R^{7b}$ are halogen.

13. The catalyst system of claim 1, wherein Q is $(-CH_2Si(R_Q)_2CH_2-)$, $(-CH_2CH_2Si(R_Q)_2CH_2CH_2-)$, $(-CH_2Ge(R_Q)_2CH_2-)$, or $(-CH_2CH_2Ge(R_Q)_2CH_2CH_2-)$, where $R_Q$ is $(C_1-C_5)$alkyl.

14. The catalyst system of claim 1, wherein Q is benzene-1,2-diyl or cyclohexane-1,2-diyl.

15. The catalyst system of claim 1, wherein Q is $(-CH_2Si(R_Q)_2CH_2-)$ or $(-CH_2Si(R_Q)_2CH_2-)$, where $R_Q$ is ethyl or 2-propyl.

16. The catalyst system of claim 1, wherein Q is benzene-1,2-diyldimethyl.

17. The catalyst system of claim 1, wherein the catalyst system further comprises a chain transfer agent.

18. A process for polymerizing olefins, the process comprising: contacting ethylene, or a combination of ethylene and one or more $(C_3-C_{12})\alpha$-olefins with a catalyst system according to claim 1.

19. The process of claim 18, wherein the catalyst system further comprises a chain transfer agent.

20. A catalyst system comprising:
a metal-ligand complex according to formula (I):

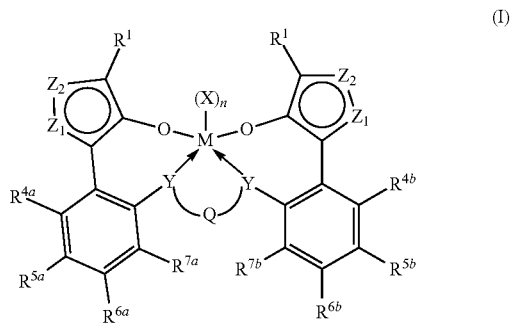

where:
M is a metal chosen from zirconium or hafnium, the metal having a formal oxidation state of +2, +3, or +4;
each X is a monodentate or bidentate ligand independently chosen from $(C_1-C_{50})$hydrocarbyl;
n is 1 or 2;
Y is oxygen or sulfur;
each $R^1$ is independently selected from the group consisting of radicals having formula (II), radicals having formula (III), and radicals having formula (IV):

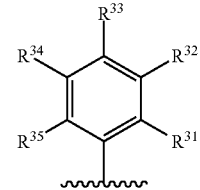

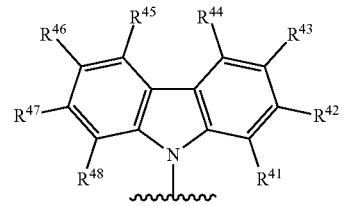

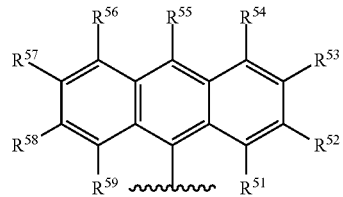

where each of $R^{31-35}$, $R^{41-48}$ and $R^{51-59}$ is independently chosen from $(C_1-C_2M)$ hydrocarbyl, $(C_1-C_{20})$ heterohydrocarbyl, $-CN$, $-CF_3$, halogen, or $-H$, provided at least one $R^1$ in formula (I) is a radical having formula (II), a radical having formula (III), or a radical having formula (IV);
Q is $-CH_2CH_2CH_2CH_2-$, benzene-1,2-diyl, benzene-1,2-diyldimethyl, cyclohexane-1,2-diyl, or cyclohexane-1,2-diyldimethyl;

each $z_1$ and $z_2$ is independently selected from the group consisting of sulfur and —C($R^C$)—, provided at least one of $z_1$ and $z_2$ in each individual ring containing groups $z_1$ and $z_2$ is sulfur;

$R^{4a}$, $R^{5a}$, $R^{6a}$, $R^{7a}$, $R^{4b}$, $R^{5b}$, $R^{6b}$, and $R^{7b}$ are independently chosen from ($C_1$-$C_{50}$)hydrocarbyl, —$CF_3$, halogen, and —H, in which optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{7b}$ are covalently connected to form an aromatic ring or a non-aromatic ring;

each $R^C$ in formula (I) is independently selected from the group consisting of ($C_1$-$C_{20}$)hydrocarbyl and —H; and provided that when Q is —$CH_2CH_2CH_2CH_2$—:
(1) when each $R^1$ is 3,6-di-tert-butylcarbazol-9-yl and $z_2$ is sulfur and each X is benzyl, $R^{5a}$ and $R^{5b}$ are not —OMe, fluorine, or tert-octyl; or
(2) at least one of $R^{4a}$, $R^{5a}$, $R^{6a}$, and $R^{7a}$ is halogen, and at least one of $R^{4b}$, $R^{5b}$, $R^{6b}$, and $R^{7b}$ is halogen; or
(3) at least one of $R^{4a}$, $R^{5a}$, $R^{6a}$, $R^{7a}$, $R^{4b}$, $R^{5b}$, $R^{6b}$, and $R^{7b}$ is selected from the group consisting of ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —Si($R^C$)$_3$, —CN, and —$CF_3$.

\* \* \* \* \*